US006700766B2

(12) United States Patent
Sato

(10) Patent No.: US 6,700,766 B2
(45) Date of Patent: Mar. 2, 2004

(54) OVERVOLTAGE PROTECTION CIRCUIT WITH THERMAL FUSE, ZENER DIODE, AND POSISTOR

(75) Inventor: Bunya Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 09/951,322

(22) Filed: Sep. 13, 2001

(65) Prior Publication Data

US 2002/0039270 A1 Apr. 4, 2002

(30) Foreign Application Priority Data

Sep. 14, 2000 (JP) ..................................... P2000-280765
Oct. 5, 2000 (JP) ..................................... P2000-305782

(51) Int. Cl.[7] ................................................. H02H 3/08
(52) U.S. Cl. ....................................................... 361/93.1
(58) Field of Search ................................. 320/134, 136; 361/93.1, 93.2, 93.4

(56) References Cited

U.S. PATENT DOCUMENTS 3,798,470 A * 3/1974 Burns et al. ................. 327/469
4,594,631 A * 6/1986 Iwaki ........................... 361/20
6,242,870 B1 * 6/2001 Koyanagi et al. ........... 315/291

* cited by examiner

Primary Examiner—Adolf D. Berhane
(74) Attorney, Agent, or Firm—Jay H. Maioli

(57) ABSTRACT

An electronic device protection circuit inhibits a voltage exceeding the rated voltage of the electronic device, which may include a secondary battery, from being applied and includes a positive temperature characteristic device and a diode that are connected in series and arranged in proximity to each other. The thermal fuse, the posistor, and the zener diode are arranged to conduct heat to each other, so that applying an overvoltage greater than the rated voltage to input terminals of the electronic device causes the current resulting from the overvoltage to flow through the zener diode that causes it to generate heat that accelerates the fusion of the thermal fuse.

35 Claims, 30 Drawing Sheets

OVERVOLTAGE PROTECTION CIRCUIT WITH THERMAL FUSE, ZENER DIODE, AND POSISTOR

BACKGROUND OF THE INVENTION

1. Field of the Invention

The present invention relates to an electronic device protection circuit for inhibiting an overvoltage exceeding the rated voltage of an electronic device such as a lithium-ion secondary battery and a semiconductor device from being applied thereto so as to protect the electronic device from performance degradation, damage and so on.

Further, the present invention relates to an electronic device protection circuit for protecting an electronic device such as a semiconductor integrated circuit included in, for example, a lithium-ion secondary battery or a cellular phone apparatus from damage resulting from overvoltage or overcurrent.

2. Description of the Related Art

When an overvoltage greater than the rated voltage of an electronic device is applied thereto, it may result in performance degradation in or damage to the electronic device. In order to protect the electronic device from the application of such overvoltage, various protection circuits have been proposed.

Conventionally, as an electronic device protection circuit of this kind, a protection circuit in which, for example, the power source terminals of a semiconductor integrated circuit or input/output terminals (cathode and anode) of a secondary battery are connected in parallel to a zener diode, and a fixed resistor device is provided between the semiconductor integrated circuit or the secondary battery, and external connection terminals where a voltage is externally supplied is typically used.

In recent years, as mobile electronic apparatuses and cellular phones have been developed, lithium-ion secondary batteries have been used as thin secondary batteries which are compact and capable of long-duration discharge. In general, the lithium-ion secondary battery is charged with a voltage slightly greater than its rated discharge voltage. When an excessive charge voltage greater than the rated voltage is applied to the lithium-ion secondary battery, for example, because an abnormal condition in a charger is encountered or a user accidentally connects the battery to an out-of-specification charger, a battery/cell in the battery may generate heat, which may lead degradation or damage therein due to a rise in gas pressure. In order to protect the lithium-ion secondary battery from such degradation and damage, a protection circuit for preventing an overvoltage from being applied to the lithium-ion secondary battery is required.

In accordance with such conventional electronic device protection circuit, when an overvoltage exceeding the breakdown voltage of the zener diode is applied to the external connection terminals of the semiconductor integrated circuit or the secondary battery, the zener diode enters in a state that a current flows therethrough, so that an larger amount of the overcurrent resulting from the overvoltage can flow through the zener diode than through the semiconductor integrated circuit or the secondary battery, and due to the breakdown voltage characteristics of the zener diode, a voltage between terminals of the semiconductor integrated circuit or the secondary battery can be set not to exceed the rated voltage. At this time, as the passage of a large current through a fixed resistor results in a voltage drop, the voltage applied to the semiconductor integrated circuit or the secondary battery can be reduced to the amount determined by the subtraction of the voltage drop by the fixed resistor from the voltage applied to the external connection terminals.

As a technology of the protection circuit for the lithium-ion secondary battery, there is a protection circuit proposed in, for example, Japanese patent laid-open publication Hei 2-87935 (Japanese Patent No. 2720988). In this technology, a zener diode is connected in parallel to a battery/cell in the secondary battery, and a thermal fuse is connected in series to the battery/cell, so that when an overvoltage is applied to the secondary battery, a current flows through the zener diode, which thereby generates heat. As the heat and heat generated in the thermal fuse result in a fusion of the thermal fuse, the overvoltage is prevented from being applied to the battery/cell.

Further, in Japanese utility model publication Hei 6-31345, a technology that in a case where a voltage between a positive terminal and a negative terminal of a secondary battery is detected by a voltage detection circuit, when the voltage detection circuit detects that the voltage rises to become an overvoltage greater than the rated voltage, a heat generation switching device turns on to generate heat, which is applied to a thermal sensitive interrupting device to be brought into an interrupting state, so that the overvoltage is prevented from being applied to the secondary battery has been proposed.

Further, other various technologies such that a charge voltage is applied to a secondary battery through a protection circuit with a complicated circuit configuration using a thermistor or a digital circuit device, and that a bimetal is used instead of a fuse have been proposed.

However, the foregoing technologies which have conventionally proposed have some problems such that when a further overvoltage is applied, the protection circuit itself may be damaged so as to become inoperable, or may generate heat which thereby causes degradation or damage in the battery/cell.

Further, there is a problem that in the foregoing conventional electronic device protection circuit. When an overvoltage is continuously applied to the external connection terminals, or when an overvoltage which may result in an increase in current to greater than the maximum allowable current of the zener diode is applied, the zener diode abnormally generates heat, which may damage circuit devices or semiconductor integrated circuits on its periphery, or the zener diode itself due to overheating.

In the technology proposed in Japanese patent laid-open publication Hei 2-87935, for example, when a user accidentally connects the secondary battery to the out-of-specification charger, and an excessive charge voltage which is much greater than the rated voltage is applied to the secondary battery, the thermal fuse generates heat, resulting in the fusion of the thermal fuse, so that the overvoltage can be prevented from being applied to the secondary battery. However, when an overcurrent much higher than the rated current due to the overvoltage continuously flows through the zener diode, the zener diode itself will be overheated, which may result in the degradation in or damage to the battery/cell.

Moreover, before the fusion of the thermal fuse, when the zener diode is damaged and fixedly bypasses a current, so that the battery/cell may be useless as a secondary battery because the battery/cell may not be charged permanently, or the positive and negative terminals of the battery/cell may be always short-circuited. Alternatively, when the zener diode is damaged so as to become an electrical resistor, the current continuously flows through the damaged zener diode. As a result, the zener diode itself is overheated, which thereby may result in degradation in or damage to the battery/cell.

In the technology proposed in Japanese utility model publication No. Hei 6-31345, for example, in a case where the excessive charge voltage which is much greater than the rated voltage is accidentally applied to the secondary battery, at the moment when the excessive charge voltage is applied, a returnable type thermal sensitive device has not been brought into an interrupting state yet, so an overcurrent flows through at the moment, resulting in damage to a heat generation switching device. Thereby, even if the excessive charge voltage is applied, the excessive charge voltage cannot be detected and the thermal sensitive device does not function. Accordingly, as the excessive charge voltage is continuously applied to the secondary battery, the secondary battery generates heat, which thereby may result in degradation in or damage to the secondary battery. Alternatively, when the heat generation switching device is damaged and brought into an constant on state due to the application of excessive charge voltage, the current continuously flows through, therefore, the heat generation switching device is overheated, which thereby may result in degradation in or damage to the battery/cell.

In order to prevent the foregoing protection circuits which have been conventionally proposed from being damaged, it is deemed effective to set the rated current (allowable current capacity) of the heat generation switching device or the zener diode larger. However, when the rated current becomes larger, it is difficult to detect the application of a charge voltage greater than the rated voltage or to reliably carry out an interruption or fusion in response to the voltage.

Alternatively, in the case of a configuration that only the thermal fuse is connected in series to the secondary battery without using any protection circuit, there is a problem that as an overcurrent due to an overvoltage continuously flows through the secondary battery before the fusion of the thermal fuse, the secondary battery may be degraded or generate heat in the meantime. Likewise, in a case where the bimetal is used instead of the fuse, there is a problem that as an overcurrent continuously flows through the secondary battery until the bimetal interrupts the current, the secondary battery may be degraded or generate heat.

Further, in order to prevent overheating or damage resulting from the overcurrent flow through the zener diode, the electrical resistance of a fixed resistor device can be set to be larger so as to inhibit the overcurrent flow in spite of the application of the overvoltage. However, due to a voltage drop by the larger electrical resistance, even if a normal voltage less than the rated voltage is applied to the external connection terminals, a low voltage less than a practical allowable range is applied to the semiconductor integrated circuit. Thus, even if the normal voltage is applied, the semiconductor integrated circuit does not operate properly.

Therefore, there is a problem that the voltage range that the protection circuit effectively functions is limited to a predetermined small range, so that the protection circuit cannot work effectively in a wider range other than the small predetermined range.

For example, in the case of a conventional electronic device protection circuit designed to protect a semiconductor integrated circuit with the rated voltage of 5 V from the application of a voltage up to 20 V, if an overvoltage greater than 32 V is applied to the semiconductor integrated circuit, the zener diode is overheated, which thereby may result in damage to the zener diode itself or circuits on its periphery. On the other hand, in a case where a fixed resistor device with larger resistance is replaced in order not to overheat the zener diode in spite of the application of an overvoltage exceeding 20 V such as 32 V, even though the rated voltage of 5 V is externally applied, due to a voltage drop in the fixed resistor device by the consumed current of the semiconductor integrated circuit, a low voltage substantially less than the rated voltage is applied to the semiconductor integrated circuit, which thereby does not operate properly.

Further, in the case of a protection circuit using a thermistor or a digital circuit device, its circuit configuration tends to be complicated, so it is difficult to downsize the protection circuit or reduce its cost.

Moreover, it is considered to use a constant-voltage circuit as an electronic device protection circuit, but as in the above case, there is a problem that since the voltage range that the constant-voltage circuit can effectively function as a protection circuit is limited to a predetermined small range, and the electrical parts used in the circuit are semiconductor integrated circuits or devices which are comparatively weak against the application of overvoltage, another protection circuit is required for protecting the electronic device protection circuit, so that the circuit configuration becomes complex.

Still further, there is the same problem as described above in a protection circuit used for preventing an overvoltage from being applied not only to the secondary battery on charge, but also to, for example, a semiconductor device or a liquid crystal display device.

SUMMARY OF THE INVENTION

The present invention has been achieved in view of above problems, and it is an object of the present invention to provide an electronic device protection circuit which can reliably inhibit an overvoltage from being applied to a secondary battery, a semiconductor device or any other electronic device, and can prevent the protection circuit itself from being degraded or damaged.

An electronic device protection circuit according to the present invention for inhibiting a voltage exceeding the rated voltage of an electronic device from being applied positive and negative voltage input terminals of the electronic device comprises a device having characteristics of making an increase in current when a voltage set to greater than the rated voltage is applied thereto, such as a zener diode, a device having characteristics of inhibiting a current by an increase in its electrical resistance in response to at least either of an increase in current or a rise in temperature, such as a posistor, and a configuration in which the devices connected in series are connected in parallel to a battery on the protection circuit.

An electronic device protection circuit according to a first invention comprises a posistor having characteristics of making an increase in its electrical resistance in response to an increase in current, of which an end is connected to either of the voltage input terminals of the electronic device, a thermal fuse having characteristics that the flow of a current therethrough by applying the voltage exceeding the rated voltage causes a rise in temperature, resulting in the fusion thereof, of which an end is connected to the other voltage input terminal of the electronic device, a zener diode having characteristics that applying a voltage exceeding its breakdown voltage which is set to greater than the rated voltage results in an increase in current, which is connected to the other end of the posistor and the other end of the thermal fuse, and a configuration in which as the thermal fuse and the zener diode are provided to be able to conduct heat each other, applying an overvoltage greater than the rated voltage to the voltage input terminals of the electronic device makes a current resulting in the overvoltage flow through, so that the zener diode generates heat, which thereby accelerates the fusion of the thermal fuse, and the current resulting from the overvoltage is bypassed to the zener diode and the posistor to reduce the current flow through the electronic device, and further, when the electrical resistance of the posistor increases, the increased electrical resistance reduces the current flow through the zener diode and the posistor to less than their rated currents.

The electronic device protection circuit according to a second invention comprises a zener diode having characteristics that applying a voltage greater than its breakdown voltage which is set to greater than the rated voltage results in an increase in current, which is connected in parallel to the electronic device and a posistor having characteristics of inhibiting a current by an increase in its electrical resistance in response to at least either of an increase in current or a rise in temperature, which is connected in series to the zener diode.

The electronic device protection circuit is configured to be capable of protecting the electronic device from being damaged or degraded resulting from the application of an overvoltage, and even if the overvoltage is continuously applied to the external connection terminals, or an overvoltage which may result in an increase in current to greater than the maximum allowable current of the zener diode is applied, to be capable of coping with a wide range of the overvoltage without overheating or damaging the zener diode.

Further, another electronic device protection circuit according to the first invention comprises a zener diode having characteristics that applying a voltage exceeding its breakdown voltage which is set to greater than the rated voltage results in an increase in a current, of which an end is connected to either of the voltage input terminals of an electronic device, a thermal fuse having characteristics that the flow of a current therethrough by applying the voltage exceeding the rated voltage causes a rise in temperature, resulting in the fusion thereof, of which an end is connected to the other voltage input terminal of the electronic device, a posistor having characteristics of making an increase in its electrical resistance in response to an increase in current, in which the Curie point, which is a temperature that the electrical resistance of the posistor nonlinearly and steeply increases, is set to higher than the fusion temperature of the thermal fuse, and which is connected to the other end of the zener diode and the other end of the thermal fuse, and a configuration in which as the thermal fuse, the posistor and the zener diode are provided to be able to conduct heat one another, applying an overvoltage greater than the rated voltage to the voltage input terminals of the electronic device makes a current resulting in the overvoltage flow through, so that the zener diode and the posistor generate heat, which thereby accelerates the fusion of the thermal fuse, and the current resulting from the overvoltage is bypassed through the zener diode and the posistor to reduce the current flow through the electronic device, and further, when the electrical resistance of the posistor increases, the increased electrical resistance reduces the current flow through the zener diode and the posistor to less than their rated currents.

In the electronic device protection circuit according to the first invention, when an overvoltage greater than the rated voltage is applied to the voltage input terminals of the electronic device, a current resulting from the overvoltage flows through the zener diode, so that the zener diode generates heat, which thereby accelerates the fusion of the thermal fuse, so the fusion of the thermal fuse is reliably carried out. Moreover, by bypassing the current resulting from the application of the overvoltage to the zener diode and the posistor, the flow of the current through the electronic device is reduced. Further, when the electrical resistance of the posistor increases by the continuous flow of the overcurrent resulting from the application of the overvoltage, the increased electrical resistance reduces the current flow through the zener diode and the posistor to less than their rated currents.

In still another electronic device protection circuit according to the first invention, when an overvoltage greater than the rated voltage is applied to the voltage input terminals of the electronic device, a current resulting from the overvoltage flows through the zener diode, so that the posistor and the zener diode generate heat, which thereby accelerates the fusion of the thermal fuse, so the fusion of the thermal fuse is reliably carried out. Moreover, by bypassing the current resulting from the application of the overvoltage to the zener diode and the posistor, the flow of the current through the electronic device is reduced. Further, when the electrical resistance of the posistor increases by the continuous flow of the overcurrent through the posistor, the increased electrical resistance reduces the current flow through the zener diode and the posistor to less than their rated currents.

Further, a thermal fuse of which the fusion temperature is higher than that of the thermal fuse may be also placed between the zener diode and the posistor, so that after the fusion of the thermal fuse, the fusion of the thermal fuse of which the fusion temperature is higher may be carried out to interrupt the current flow through the zener diode and the posistor.

Moreover, a thermostat may be provided instead of the thermal fuse. When the application of a voltage exceeding the rated voltage to positive and negative voltage input terminals of the electronic device causes beat generation in the zener diode and the posistor, which thereby results in a rise in the temperatures thereof to higher than predetermined temperatures, the thermostat interrupts the current flow. When the temperatures drop after the interruption of the current flow, for example, due to no application of the overvoltage, the thermostat automatically returns to the initial conduction state, so that the thermostat can be repeatedly used.

Alternatively, a thermostat of which the fusion temperature is higher than that of the thermostat may be also provided instead of the thermal fuse of which the fusion temperature is higher, so that when the temperature drops due to no application of the overvoltage, the thermostat can return to the initial conduction state.

The electronic device protection circuit according to the first invention is suitable for, for example, lithium-ion secondary battery, lithium polymer secondary battery, lithium metal secondary battery, NiCad secondary battery, nickel metal hydride battery and so on. However, it is obvious that it is suitable not only for those described above but also for the use of protecting an electronic device such as a semiconductor device and a display device which, when a voltage greater than its rated voltage is applied thereto, may result in performance degradation or damage.

The electronic device protection circuit according to the second invention for inhibiting a voltage exceeding the rated voltage of an electronic device from being applied thereto, comprises a zener diode having characteristics that applying a voltage greater than its breakdown voltage which is set to greater than the rated voltage results in an increase in current, which is connected in parallel to the electronic device and a posistor having characteristics of inhibiting a current by an increase in its electrical resistance in response to at least either of an increase in current or a rise in temperature, which is connected in series to the zener diode.

In the electronic device protection circuit according to the second invention, when an overvoltage exceeding the rated voltage of the electronic device is applied, a zener diode which has been virtually out of conduction changes into a state that current flows therethrough, and most of a large current resulting from the application of the overvoltage flows through the zener diode so as to reduce the current flow through the electronic device. At this time, due to the basic characteristic of the zener diode, when a voltage greater than the breakdown voltage is applied, in spite of the application of a voltage greater than the voltage, the voltage between the terminals of the zener diode is locked on at the value of the breakdown voltage so as to maintain almost constant, and consequently the voltage between the terminals of the electronic device connected in parallel to the zener diode maintains almost constant at the value of the breakdown voltage so as to inhibit the voltage from becoming a greater overvoltage.

When a higher voltage is applied, a higher current flows through the zener diode, and when the overvoltage is continuously applied, the zener diode continuously generates heat. However, as a posistor is connected in series to the zener diode, the electrical resistance of the posistor increases in response to an increase in current so as to reduce the current to less than the maximum allowable current. Alternatively, when the zener diode generates heat, the heat raises the temperature of the posistor, resulting in an increase in the electrical resistance of the posistor, so the current is reduced to less than the maximum allowable current of the zener diode.

In order to reduce the current to less than the maximum allowable current of the zener diode as described above, it is preferable to set the rated current of the posistor to less than the maximum allowable current of the zener diode. Further, the posistor and the zener diode may be provided to be able to conduct heat each other, so that when an overvoltage exceeding the rated voltage is applied to the electronic device, the heat generated in the zener diode accelerates an increase in the electrical resistance of the posistor to more reliably prevent overheating or damage resulting from the current flow through the zener diode.

Other and further objects, features and advantages of the invention will appear more fully from the following description.

DETAILED DESCRIPTION OF THE PREFERRED EMBODIMENTS

Preferred embodiments of the present invention will now be described in detail with reference to the accompanying drawings.

[First Invention]
[First Embodiment]

Figure 1:
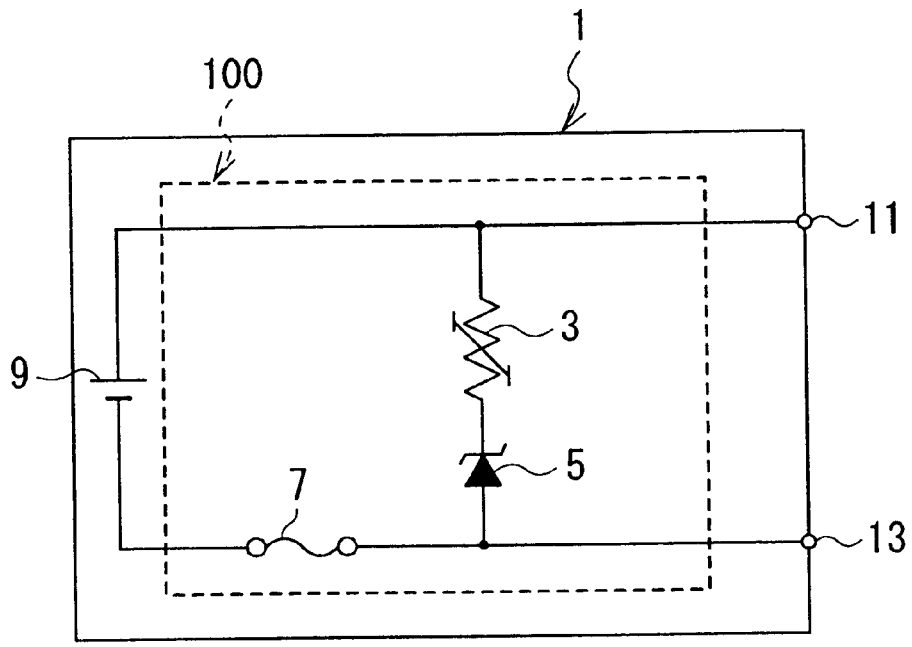
FIG. 1 is a schematic circuit diagram showing an electronic device protection circuit according to a first embodiment of the present invention.

FIG. 1 is a schematic circuit diagram showing an electronic device protection circuit according to a first embodiment. An electronic device protection circuit 100 comprises a posistor 3, a zener diode 5 and a thermal fuse 7 mounted in its main part, for example, in the battery pack of a lithium-ion secondary battery in order to inhibit a charge voltage greater than the rated voltage from being applied to a cathode and an anode of a battery/cell 9.

More specifically, the posistor 3 has characteristics that its electrical resistance increases as current increases, and when a voltage exceeds a detecting voltage, the electrical resistance steeply increases further. An end of the posistor 3 is connected to the cathode of the battery/cell 9, and the other end is connected to an end of the zener diode 5.

The thermal fuse 7 has characteristics that a large current flow therethrough results in heat generation therein so as to rise its temperature, and when the temperature rises to higher than a predetermined temperature, the fusion thereof occurs. An end of the thermal fuse 7 is connected to the anode of the battery/cell 9, the other end is connected to an anode side external connection terminal and the other end, which is not the one described, of the zener diode 5. Therefore, the thermal fuse 7 and the battery/cell 9 are connected in series, so that a circuit connected from a cathode side external connection terminal 11 to an anode side external connection terminal 13 via the battery/cell 9 and the thermal fuse 7 is formed.

The zener diode 5 has characteristics that when the applied voltage exceeds the rated voltage (breakdown voltage), the current steeply increases. An end of the zener diode 5 is connected to the posistor 3 (the foregoing other end therof), and the other end is connected to the anode side external connection terminal 13 and the thermal fuse 7 (the foregoing other end thereof). As the zener diode 5 and the posistor 3 are connected in series, a circuit connected from the cathode side external connection terminal 11 to the anode side external connection terminal 13 via the zener diode 5 and the posistor 3 is formed. The zener diode 5 is mounted to be able to carry out good thermal conduction between the thermal fuse 7 and the posistor 3 (the details will be described later).

In the electronic device protection circuit 100, the circuit composed of the zener diode 5 and the posistor 3 is connected in parallel to the foregoing circuit composed of the thermal fuse 7 and the battery/cell 9. Therefore, when applying a voltage between the cathode side external connection terminal 11 and the anode side external connection terminal 13, the flow of a current from the cathode to the anode is divided into the circuit passing through the battery/cell 9 and the thermal fuse 7 and the circuit passing through the zener diode 5 and the posistor 3. At this time, the ratio of the current flow divided into each circuit is basically (theoretically) determined from an inverse proportional relationship between the electrical resistances of the battery/cell 9 and the thermal fuse 7 and the electrical resistances of the zener diode 5 and the posistor 3. Therefore, when the voltage applied to the cathode side external connection terminal 11 and the anode side external connection terminal 13 is lower than the rated voltage of the zener diode 5, the zener diode 5 is substantially brought out of conduction. Thereby, as most of the current flows into the battery/cell 9 through the thermal fuse 7, the battery/cell 9 can be charged without any problem. When the applied voltage exceeds the rated voltage of the zener diode 5, the zener diode 5 is brought into conduction, so that the current flows through the circuit formed of the zener diode 5 and the posistor 3 connected in series. Thus, when an overvoltage is applied, all of the overcurrent resulting from the overvoltage does not flow into the battery/cell 9, and can be bypassed to the zener diode 5 and the posistor 3. Moreover, when the overcurrent resulting from the application of the overvoltage continuously flows, or a much higher voltage is applied, the thermal fuse 7 and the zener diode 5 generate heat, which thereby resulting in the fusion of the thermal fuse 7, so that the application of the overvoltage to the battery/cell 9 can be interrupted completely.

Despite the fusion of the thermal fuse 7, the overvoltage is continuously applied to the circuit formed of the zener diode 5 and the posistor 3 connected in series. Therefore, in this state, the zener diode 5 will be damaged due to the overcurrent or its temperature rise. The posistor 3, however, has an electrical resistance ranging from several ohms to several tenth of ohms over a wide temperature range from −30° C. to 60° C. around room temperature, and the electrical resistance has characteristics that when the temperature exceeds its detection temperature, the electrical resistance will steeply increase. Therefore, as the application of the overvoltage brings the zener diode 5 into conduction, when the current flows through the posistor 3 connected in series thereto, the electrical resistance of the posistor 3 will steeply increase, so that the overcurrent can be inhibited from flowing through the zener diode 5 and the posistor 3 to prevent damage to the zener diode 5.

In this case, it is preferable that the breakdown voltage of the zener diode 5 is set to be at least greater than the rated charge voltage of the battery/cell 9. For example, in a case that the rated charge voltage of the battery/cell 9 is 4.2 V, the breakdown voltage of the zener diode is set to be 6.0 V in consideration of a voltage drop by the posistor 3, a safety factor and so on. If the breakdown voltage of the zener diode 5 is set to be less than the rated charge voltage of the battery/cell 9, during the charge with the normal rated voltage or a long-term storage of a lithium-ion secondary battery, the current is bypassed to the circuit formed of the zener diode 5 and the posistor 3 connected in series, which may result in a decrease in the charge efficiency of the lithium-ion secondary battery or a significant reduction in the discharge capacity. For example, in a case where the rated charge voltage of the battery/cell 9 is 4.2 V and the breakdown voltage of the zener diode 5 is set to be between 4.2 V and 4.5 V or less, even when the lithium-ion secondary battery is not in use, a current of approximately 0.1 mA or over flows through the zener diode 5 and the posistor 3, thereby the power stored in the lithium-ion secondary battery is leaked like dark current, resulting in a significant reduction in the discharge capacity of the lithium-ion secondary battery. Further, even if the normal rated charge voltage is applied, the charge current resulting from the voltage will be bypassed to the zener diode 5 and the posistor 3, and will not flow into the battery/cell 9, resulting in a significant reduction in the charge efficiency. However, by setting the breakdown voltage of the zener diode 5 to be greater than the rated charge voltage of the battery/cell 9 such as 6.0 V, the battery/cell 9 can be efficiently charged when the rated charge voltage is applied, and the electrical power stored in the battery/cell 9 after the charge can be reliably held with no leakage. As an example, a dark current flow through the zener diode 5, of which breakdown voltage is set at 6.0 V, is extremely small such as approximately 50 $\mu$A or less.

It is obviously preferable that when applying the rated charge voltage, the fusion of the thermal fuse 7 is reliably carried out by the heat generated in the zener diode 5 and thermal fuse 7. A fusible device used for the thermal fuse 7 is preferably made of a low-melting alloy with a melting point of 90° C. to 130° C. Alternatively, when the melting point is required to be lower, a fusible device made of a low-melting alloy doped with cadmium (Cd) or made of a fuse resistance composition material including a thermal-expanding microcapsule may be used. Alternatively, the thermal fuse 7 with a typical configuration having a fuse element, a spring and a contact may be used.

Further, as the posistor 3, for example, the one with an electrical resistance ranging from 10Ω to 200Ω over a temperature range 0° C. to 60° C. having characteristics that when the temperature thereof rises to 100° C. to 150° C., the electrical resistance steeply increases, or the one that when a current of, for example, 20 mA to 100 mA or over flows therethrough, the temperature thereof rises, resulting in a steep increase in the electrical resistance, which thereby inhibits the current flow through the posistor 3 can be preferably used, but it is obviously not limited to the posistor with foregoing specifications. A PTC conductive polymer composite made of a polymer component and carbon black, a $BaTiO_3$ semiconductor composite or a ceramic composite is suitable for a material for the major part of the posistor 3. The temperature for maintaining the posistor 3 with high resistance (detection temperature) is preferably 100° C. to 150° C. For such posistor 3 having positive temperature sensitive resistance characteristics that the electrical resistance increases as the temperature rises, for example, a semiconductor having a temperature sensitive resistance material with a temperature sensitive function may be used. In this case, it is suitable that the change rate of the temperature sensitive resistance is, for example, 4000 ppm/° C.

Figure 2:
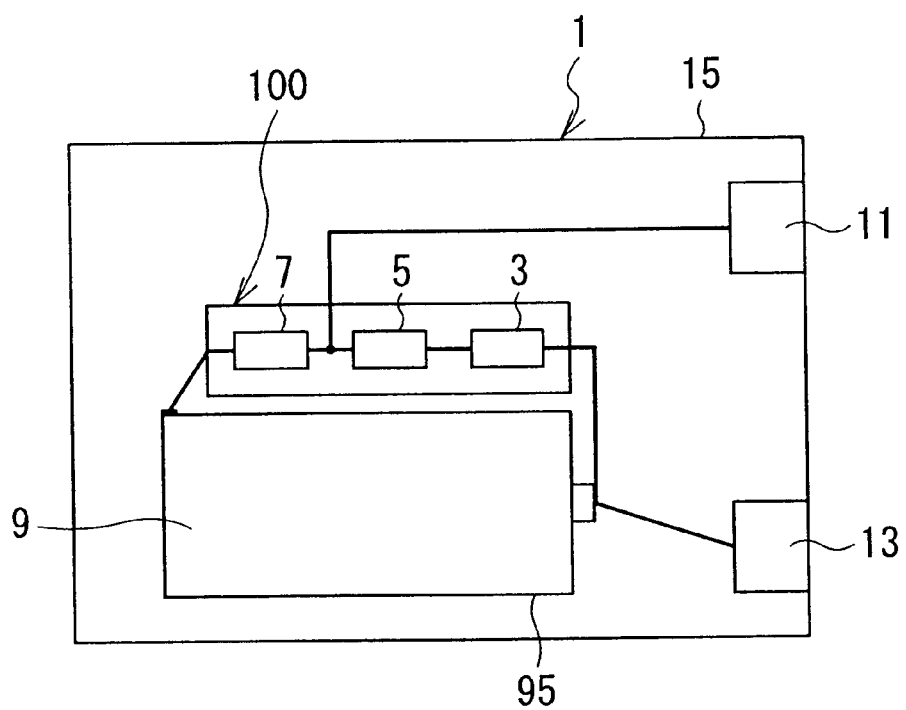
FIG. 2 is a schematic diagram of the electronic device protection circuit mounted to connect to a battery/cell in the battery pack of a lithium-ion secondary battery.

FIG. 2 schematically shows the electronic device protection circuit mounted to connect to the battery/cell in the battery pack of the lithium-ion secondary battery.

In the thin-type battery pack of a lithium-ion secondary battery for, for example, cellular phone, the cathode side external connection terminal 11 and the anode side external connection terminal 13 which are formed of copper alloy or stainless sheet are provided for ends on the outer surface of a package case 15 made of a insulating material such as plastic. The battery/cell 9, which is chargeable and rechargeable, is built in the package case 15. In a case where a battery/cell package can 95 of the battery/cell 9 is an anode, the battery/cell package can 95 is connected to the anode side external connection terminal 13 through the electronic device protection circuit 100, and a cathode of the battery/cell 9 is connected to the cathode side external connection terminal 11. On the other hand, in a case where the battery/cell package can 95 of the battery/cell 9 is a cathode, the battery/cell package can 95 is connected to the cathode side external connection terminal 11, and the anode of the battery/cell 9 is connected to the anode side external connection terminal 13 through the electronic device protection circuit 100.

The electronic device protection circuit 100 is built in the battery pack. The thermal fuse 7, the zener diode 5 and the posistor 3 are covered with an electrical insulating casing made of flame-retardant insulation papers, polyester tapes or thermosetting plastics, and mounted on a side of the battery/cell 9 as one unit. The casing preferably has some degree of heat insulation in order that when an overvoltage is applied, the heat insulation can reliably accelerate a rise in the temperature of the thermal fuse 7 without releasing heat generated in the zener diode 5 and posistor 3 to the outside. In addition, it is preferable that wiring between the zener diode 5 and the thermal fuse 7 is designed to have a shortest possible length and a widest possible cross-sectional area, and the wiring is made of a material with as good thermal conductivity as possible. Further, in order to prevent the heat in the casing from being conducted to the battery/cell 9, the casing is preferably made of a high thermal insulating material.

Figure 3:
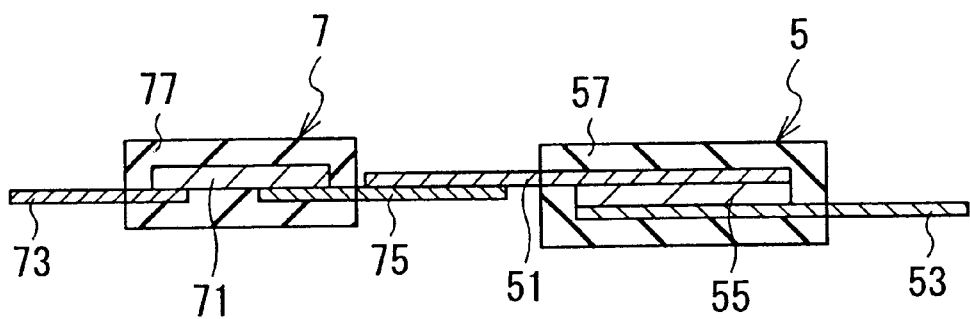
FIG. 3 is a cross-sectional view showing an example of the substantial configuration for connecting a thermal fuse with a zener diode.

FIG. 3 is a cross-sectional view showing an example of a substantial configuration for connecting a thermal fuse 7 with a zener diode 5. The main part of the thermal fuse 7 is composed of a fusible device 71 and two electrode terminals 73 and 75 made of metal sheets connected thereto, which are covered with an electrical insulating coating 77. The zener diode 5 is composed of two electrodes 51 and 53 made of metal sheets placed opposite to each other, and a semiconductor device 55 placed in between the electrodes 51 and 53 which are covered with an electrical insulating coating 57. Each part of the electrodes 51 and 53 has a part which is projected from the coating 57 as an electrode terminal for electrical connection.

The electrode terminal 73 of the thermal fuse 7 is connected to the battery/cell package can 95 of the battery/cell 9, and the electrode terminal 75 is connected to the electrode 51 of the zener diode 5. The electrode 53 of the zener diode 5 is connected to an end to the posistor 3 which is not shown in FIG. 3. The other end of the posistor 3 is electrically connected to the cathode of the battery/cell 9 and the cathode side external connection terminal 11.

In FIG. 3 to FIG. 13, the posistor 3 is not shown, but the electrode 53 of the zener diode 5 which is projected toward the right in each drawing is connected to an end of the posistor 3 in practice, while the other end of the posistor 3 is connected to the cathode of the battery/cell 9. The electrode terminal 75 and the electrode 51 which connect the thermal fuse 7 with the zener diode 5 are connected to the anode side external connection terminal 13 through connecting wiring, etc., which is not shown in FIG. 3 to FIG. 13.

In this case, the electrode terminals and electrodes described above are made of strap-shape metal sheets, which are preferably made of materials with good electrical conductivity such as copper-, brass- or nickel-based alloy. These metal sheets can be joined by, for example, electrical resistance welding or soldering.

The metal sheets connecting the zener diode 5 with the thermal fuse 7 are preferably designed to be thick and wide so as to have widest possible cross-sectional areas. The length of the wiring is preferably as short as possible. It is preferable to join the electrode terminal 75 of the thermal fuse 7 and the electrode 51 of the zener diode 5 with a widest possible part where they overlap one another so as to have better thermal conductivity. Thus, by having better thermal conductivity between the zener diode 5 and thermal fuse 7, the heat generated in the zener diode 5 can be efficiently conducted to the thermal fuse 7 so as to more reliably carry out the fusion of the thermal fuse 7.

Figure 4:
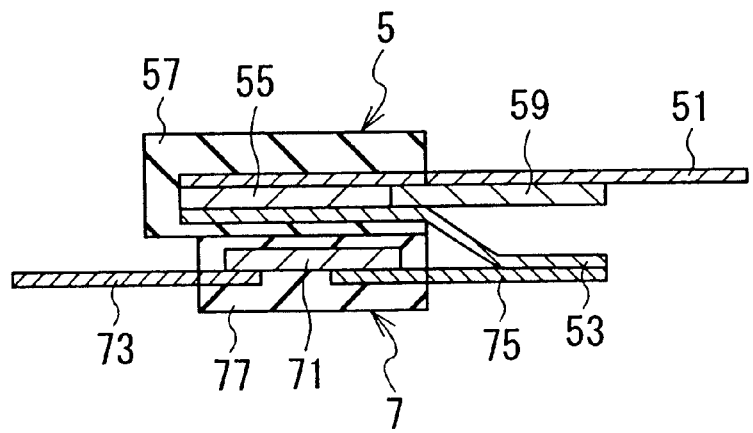
FIG. 4 is a cross-sectional view showing another example of the substantial configuration for connecting the thermal fuse with the zener diode.

FIG. 4 is a cross-sectional view showing another example of the substantial configuration for connecting the thermal fuse 7 with the zener diode 5. The thermal fuse 7 and the zener diode 5 are arranged to be stacked. The electrodes 51 and 53 of the zener diode 5 is arranged to be projected toward the outside in the same direction. In order to prevent a short circuit between the electrodes 51 and 53, an insulation film 59 is placed in between. The coating 77 of the thermal fuse 7 and the coating 57 of the zener diode 5 are made of electrical insulating materials, and the part where both coatings overlap one another is the thinnest possible to such an extent as not to lose their electrical insulation and dynamical strength.

In such configuration, as heat generated in the semiconductor device 55 of the zener diode 5 can be efficiently conducted to the fusible device 71 of the thermal fuse 7 through the thin coatings 57 and 77, the fusion of the thermal fuse 7 can be reliably carried out.

Figure 5:
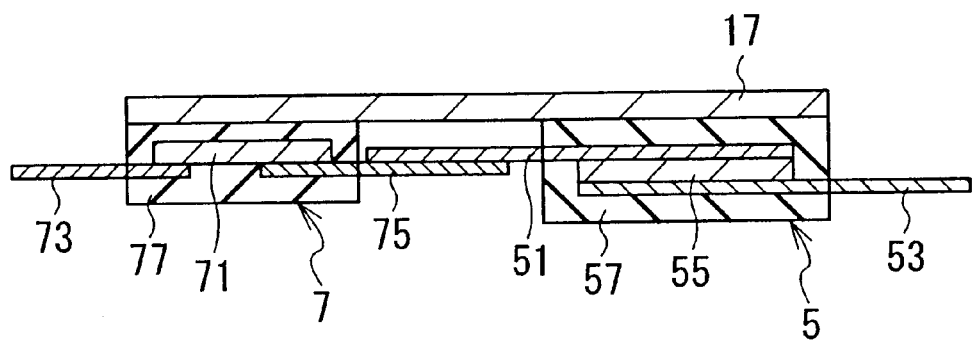
FIG. 5 is a cross-sectional view showing still another example of the substantial configuration for connecting the thermal fuse with the zener diode.

FIG. 5 is a cross-sectional view showing still another example of a substantial configuration for connecting the thermal fuse 7 with the zener diode 5. The thermal fuse 7 and the zener diode 5 are bonded with a high-thermal-conductivity sheet 17. An adhesive with good thermal conductivity (not shown) is used for bonding. The parts where the coating 77 of the thermal fuse 7 and the coating 57 of the zener diode 5 are bonded with the thermal conductivity sheet 17 are the thinnest possible to such an extent as not to lose their electrical insulation and dynamical strength. The thermal conductivity sheet 17 is preferably made of a metallic material with high thermal conductivity and good machinability such as copper, brass, aluminum and nickel.

In such configuration, as heat generated in the zener diode 5 can be efficiently conducted to the thermal fuse 7 through the thermal conductivity sheet 17, the fusion of the thermal fuse 7 can be reliably carried out.

Each drawing of FIG. 6 to FIG. 13 shows a substantial configuration in which the fusible device 71 of the thermal fuse 7 and the semiconductor device 55 of the zener diode 5 are covered with a coating made of an insulating material.

Figure 6:
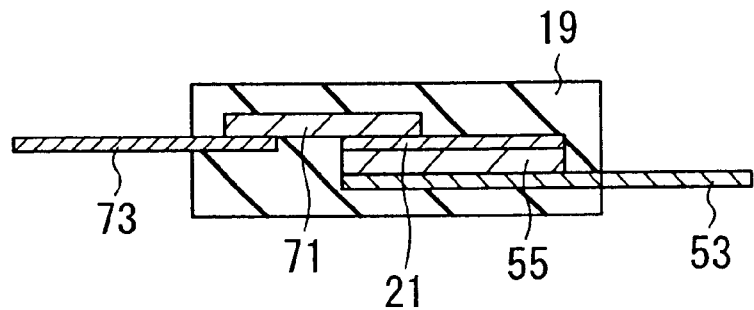
FIG. 6 is an example of a substantial configuration in which a fusible device of the thermal fuse and a semiconductor device of the zener diode are covered with a coating.

In the configuration shown in FIG. 6, the fusible device 71 of the thermal fuse 7 and the semiconductor device 55 of the zener diode 5 are placed on the head side and back side of an electrode 21, respectively. The fusible device 71 is offset to the left on the top surface of the electrode 21 in the drawing, and approximately half the length of the fusible device 71 is projected toward the left side. The electrode terminal 73 is joined on the undersurface of the projected part of the fusible device 71. The electrode terminal 73 is projected from the coating 19 to the left in the drawing to connect with the battery/cell package can 95 of the battery/cell 9 or the like. On almost the whole undersurface of the electrode 21, the semiconductor device 55 is joined. On the undersurface of the semiconductor device 55, the electrode 53 is joined, and is projected from the coating 19 to the right in the drawing to connect with the cathode of the battery/cell 9. In such configuration, as in the coating 19, heat generated in the semiconductor device 55 can be efficiently conducted to the fusible device 71 through the electrode 21 without releasing the heat to the outside, the fusion of the fusible device 71 can be reliably carried out, and the configuration of a combination of the fusible device 71 and the semiconductor 55 can be simpler.

Figure 7:
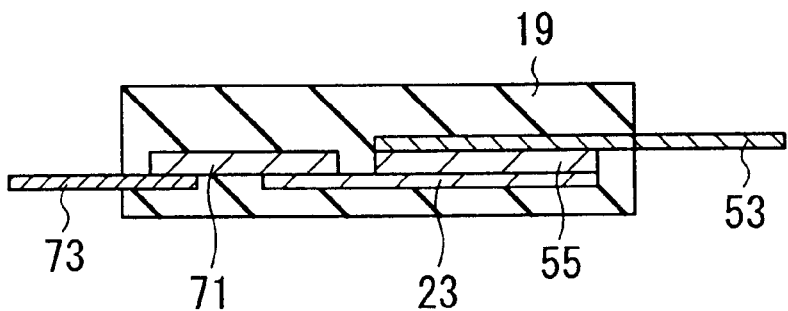
FIG. 7 is another example of a substantial configuration in which the fusible device of the thermal fuse and the semiconductor device of the zener diode are covered with a coating.

Alternatively, as shown in FIG. 7, the semiconductor device 55 together with the fusible device 71 may be placed on the top surface of the electrode 23.

Figure 8:
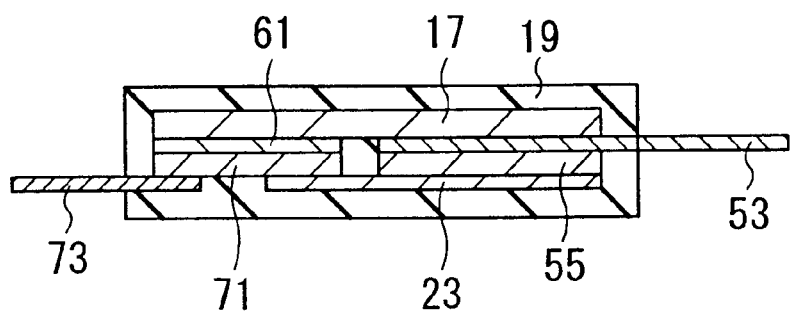
FIG. 8 is still another example of a substantial configuration in which the fusible device of the thermal fuse and the semiconductor device of the zener diode are covered with a coating.

In the configuration shown in FIG. 8, the thermal conductivity sheet 17 made of metal with good thermal conductivity such as aluminum and an insulation film 61 is additionally placed in the configuration shown in FIG. 7. In such configuration, heat generated in the semiconductor device 55 can be more efficiently conducted to the fusible device 71 through the thermal conductivity sheet 17 and the insulation film 61. As the fusible device 71 and the semiconductor device 55 are fixed on the thermal conductivity sheet 17, even if a mechanical impact or thermal stress is applied from the outside, damage to the fusible device 71 or the semiconductor device 55 or breakdown of electrical connection can be prevented by reinforcements to the mechanical strength of the thermal conductivity sheet 17. It is obvious that the insulation film 61 is placed between the thermal conductivity sheet 17 and the fusible device 71 so as to prevent an electrical short circuit in between.

Figure 9:
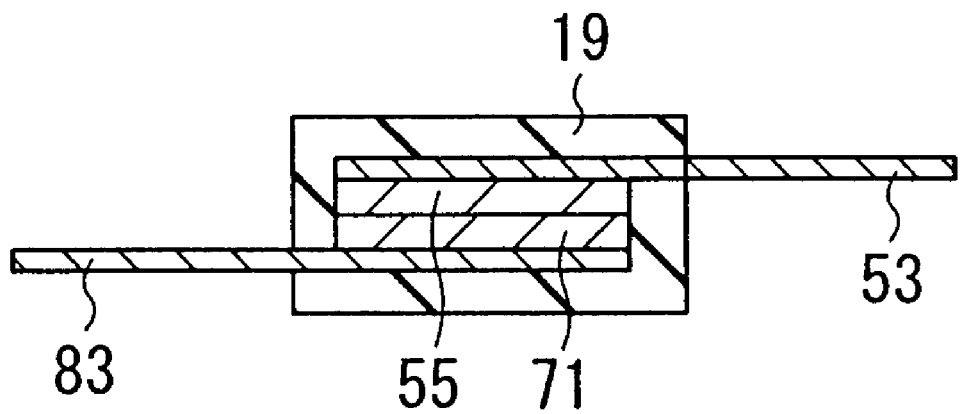
FIG. 9 is a further example of a substantial configuration in which the fusible device of the thermal fuse and the semiconductor device of the zener diode are covered with a coating.

In the configuration shown in FIG. 9, the semiconductor device 55 is directly stacked on the fusible device 71, while the top surface of the semiconductor device 55 and the undersurface of the fusible device 71 are joined with the electrode 53 and an electrode 83, respectively. In such configuration, heat generated in the semiconductor device 55 can be directly conducted to the fusible device 71 to carry out the most efficient thermal conduction.

Figure 10:
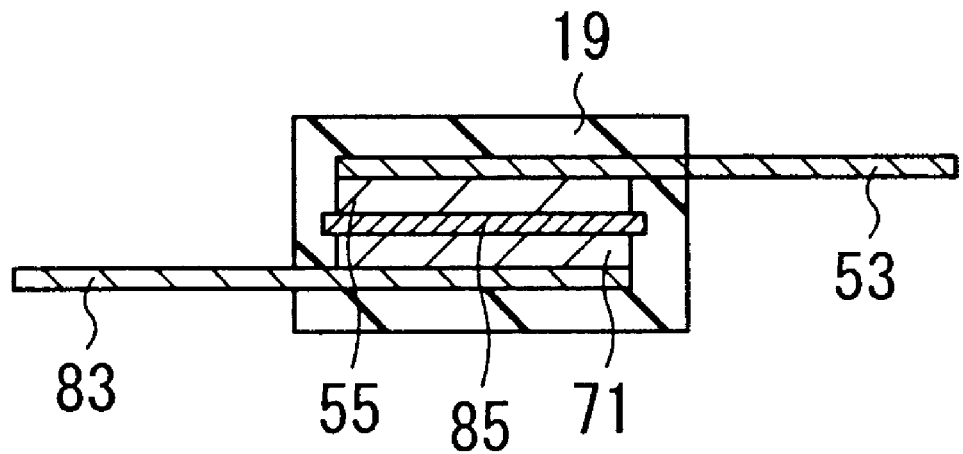
FIG. 10 is a still further example of a substantial configuration in which the fusible device of the thermal fuse and the semiconductor device of the zener diode are covered with a coating.

Alternatively, for example, as shown in FIG. 10, an electrode 85 may be placed between the semiconductor device 55 and the fusible device 71 as an electrode.

Figure 11:
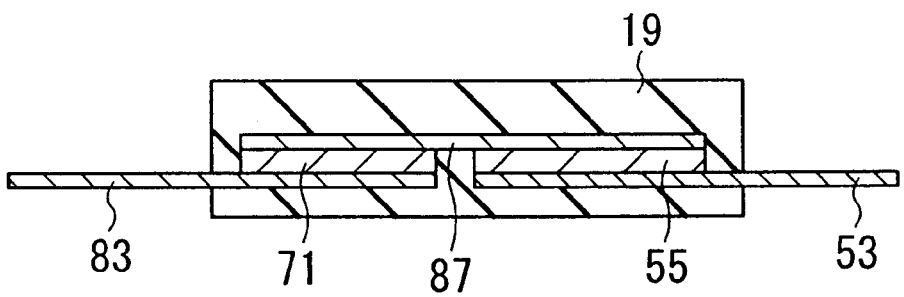
FIG. 11 is a still example of a substantial configuration in which the fusible device of the thermal fuse and the semiconductor device of the zener diode are covered with a coating.

In the configuration shown in FIG. 11, the semiconductor device 55 and the fusible device 71 are joined with an electrode 87, which is used not only as wiring for electrically connecting but also as a component for conducting heat. The semiconductor 55 is joined with the electrode 53, which is connected to the cathode of the battery/cell 9. The fusible device 71 is joined with the electrode 83, which is connected to the battery/cell package can 95 of the battery/cell 9. In such configuration, as the fusible device 71 is connected to the semiconductor device 55 in series through the electrode 87, good thermal conduction between the fusible device 71 and the semiconductor device 55 through the electrode 87 can be achieved. Further, the configuration can be simpler.

Figure 12:
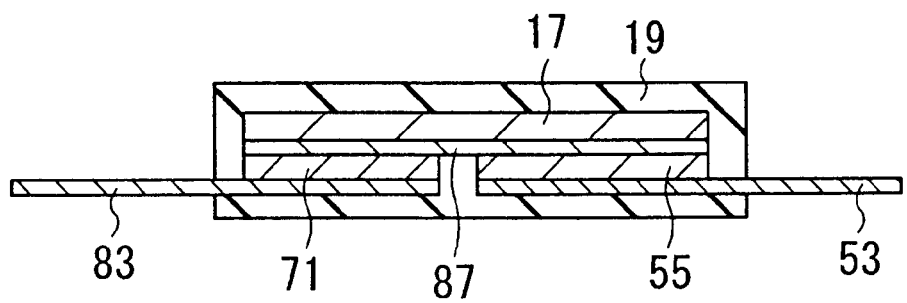
FIG. 12 is a still example of a substantial configuration in which the fusible device of the thermal fuse and the semiconductor device of the zener diode are covered with a coating.

Alternatively, for example, as shown in FIG. 12, by the thermal conductivity sheet 17 additionally bonded on the surface of an electrode 87, better thermal conduction between the fusible device 71 and the semiconductor 55 can be achieved, and the mechanical strength can be reinforced.

Figure 13:
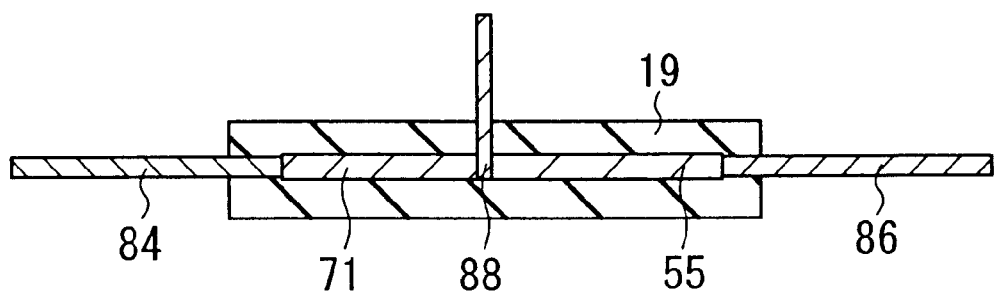
FIG. 13 is a still example of a substantial configuration in which the fusible device of the thermal fuse and the semiconductor device of the zener diode are covered with a coating.

In the configuration shown in FIG. 13, two electrodes 84 and 86, the fusible device 71 and the semiconductor device 55 are horizontally arranged, and the ends adjacent to each other are joined by, for example, a welding method. An electrode 88 is placed between the fusible device 71 and the semiconductor device 55, and is connected to the anode side external connection terminal 13 through connection wiring which is not shown in the drawing. In such configuration, as heat generated in the semiconductor device 55 is directly conducted to the fusible device 71, more efficient thermal conduction can be achieved, and the configuration of the combination of the fusible device 71 and the semiconductor device 55 can be the most simplest and thinnest.

In each configuration shown in FIG. 6 to FIG. 13, a combination of the thermal fuse 7 and the zener diode 5 is covered with the coating 19 made of an insulating material, though a combination of the zener diode 5 and the posistor 3 may be covered with a coating. In such configuration, when the zener diode 5 generates heat resulting from the flow of a large current, by reliably conducting the heat to the posistor 3 to increase the electrical resistance, the overcurrent flow can be reduced, so that damage to the zener diode 5 can be reliably prevented.

Figure 14:
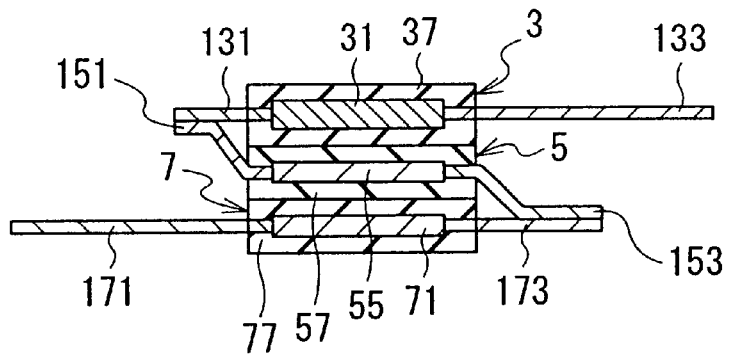
FIG. 14 is a cross sectional view of an example of a substantial configuration in which the thermal fuse, the zener diode and the posistor are covered with a casing.

FIG. 14 is a cross sectional view of an example of a substantial configuration in which the thermal fuse 7, the zener diode 5 and the posistor 3 are covered with a casing. The zener diode 5 is stacked on the thermal fuse 7, on which the posistor 3 is stacked. The thermal fuse 7 is the fusible device 71 covered with an exclusive coating 77. The zener diode 5 is substantially the semiconductor 55 covered with an exclusive coating 57. The posistor 3 is substantially a temperature sensitive device 31 covered with an exclusive coating 37. Each of there coatings 37, 57 and 77 is made of an electrical insulating material.

On the sides of the thermal fuse 7, the zener diode 5 and the posistor 3, electrode terminals 171, 173, 151, 153, 131 and 133 are provided, respectively. The electrode terminal 171 placed on the left side surface of the thermal fuse 7 in the drawing is connected to the anode of the battery/cell 9, while the electrode 173 on the right side surface is joined with the electrode terminal 153 on the right side surface of the zener diode 5. The electrode terminal 151 on the left side surface of the zener diode 5 is joined with the electrode terminal 131 on the left side surface of the posistor 3. The electrode terminal 133 on the right side surface of the posistor 3 is connected to the cathode side external connection terminal 11 and the cathode of the battery/cell 9. The electrode terminals 173 and 153 connecting the thermal fuse 7 and the zener diode 5, and the electrode terminals 151 and 131 connecting the zener diode 5 and the posistor 3 are preferably made of metal sheets with good electrical and thermal conductivities such as copper, brass, aluminum alloy and silver.

In such configuration, by efficiently conducting heat from the zener diode 5 to the thermal fuse 7, when an overvoltage is applied, the fusion of the thermal fuse 7 can be reliably carried out. Further, by efficiently conducting heat from the zener diode 5 to the posistor 3, when an overcurrent flows therethrough, the temperature of the posistor 3 rises, resulting in an increase in the electrical resistance, so that damage to the zener diode 5 resulting from the overcurrent can be prevented. The electrode terminal 171 connecting the thermal fuse 7 and the anode of the battery/cell 9 and the electrode terminal 133 connecting the posistor 3 and the cathode of the battery/cell 9 are preferably made of a material with high electrical conductivity and relatively low thermal conductivity such as nickel-based alloy and iron-based alloy. Thus, overheating of the battery/cell 9 resulting from heat generated in the zener diode 5 can be prevented.

Figure 15:
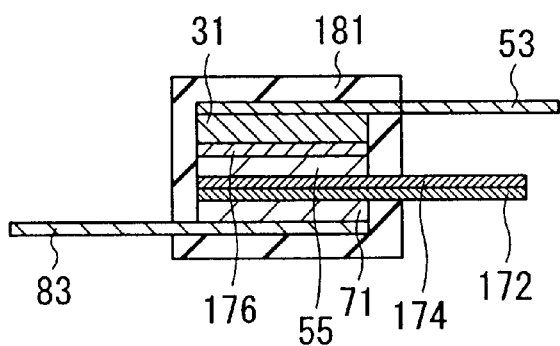
FIG. 15 is a cross sectional view of an example of a substantial configuration in which the fusible device of the thermal fuse, the semiconductor device of the zener diode and a temperature sensitive device of the posistor are joined through electrodes to form a combination.

In the configuration shown in FIG. 15, the fusible device 71 of the thermal fuse 7, the semiconductor device 55 of the zener diode 5 and the temperature sensitive device 31 of the posistor 3 are joined through electrodes 172, 174 and 176 to form a combination, which is covered with a coating 181. The electrode 83 joined with the undersurface of the fusible device 71 in the drawing is connected to the anode of the battery/cell 9. The electrode 83 is connected to the undersurface of the fusible device 71. The electrode 172 placed on the top surface of the fusible device 71 and the electrode 174 placed on the undersurface of the semiconductor device 55 are connected to the anode side external connection terminal 13 through connection wiring which is not shown in the drawing. The electrode 176 is placed between the top surface of the semiconductor device 55 and the undersurface of the temperature sensitive device 31. The electrode 53 is joined on the top surface of the temperature sensitive device 31, and is connected to the cathode side external connection terminal 11. In such configuration, by efficiently conducting heat from the semiconductor device 55 to the fusible device 71, when an overvoltage is applied, the fusion of the fusible device 71 can be reliably carried out. Further, by efficiently conducting heat from the semiconductor device 55 to the temperature sensitive device 31, when an overcurrent flows therethrough, the temperature of the temperature sensitive device 31 rises, resulting in an increase in the electrical resistance, so that damage to the semiconductor device 55 resulting from the overcurrent can be prevented.

Figure 16:
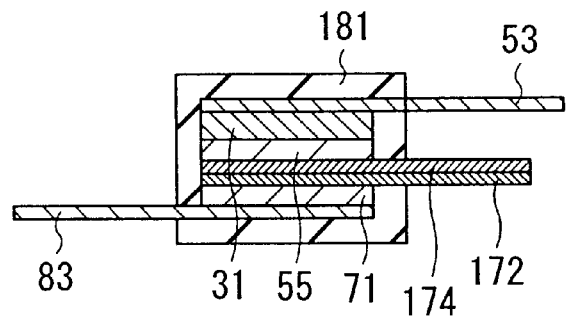
FIG. 16 is a cross sectional view of another example of the substantial configuration in which the fusible device of the thermal fuse, the semiconductor device of the zener diode and the temperature sensitive device of the posistor are joined through the electrodes to form a combination.

Alternatively, as shown in FIG. 16, the temperature sensitive device 31 and the semiconductor device 55 may be directly joined without the electrode 176 by a simpler configuration.

Further details of functions of the electronic device protection circuit 100 according to the first embodiment will be described below.

When an overvoltage greater than the rated voltage of the battery/cell 9 is applied to the anode side external connection terminal 13 and cathode side external connection terminal 11, for example, during a battery charge, the voltage is applied to a circuit formed of the zener diode 5 and the posistor 3 connected in series, too. At this time, as the electrical resistance of the posistor 3 has not yet increased, the amount of a voltage drop in the posistor 3 is small, so that an overvoltage determined by the subtraction of the voltage drop from the overvoltage is applied to the zener diode 5. If the applied voltage is greater than the breakdown voltage of the zener diode 5, a large current flows through the zener diode 5, which thereby generates heat. The heat is conducted to the thermal fuse 7 so that the thermal fuse 7 is heated. Consequently, the fusion of the thermal fuse 7 occurs to completely shut down the application of the overvoltage to the battery/cell 9. And, before that, most of the large current resulting from the overvoltage flows through the zener diode 5 and the posistor 3, but not through the battery/cell 9. Therefore, even before the fusion of the thermal fuse 7, the battery/cell 9 can be prevented from being damaged or degraded due to the application of the overvoltage.

At this time, the value of the current flow through the zener diode 5 and the posistor 3 is determined by the sum of the voltage applied to the anode side external connection terminal 13 and the cathode side external connection terminal 11 minus the breakdown voltage of the zener diode 5 divided by the value of the initial resistance of the posistor 3. Therefore, when the applied voltage is extremely excessive and the current in response to the applied voltage is greater than the rated current of the posistor 3, the electrical resistance of the posistor 3 increases to inhibit the current flow through the posistor 3 and the zener diode 5. Further, when heat generation continues due to the continuous flow of the large current and the zener diode 5 is overheated, due to the heat, the electrical resistance of the posistor 3 increases to inhibit the current flow through the posistor 3 and the zener diode 5. Consequently, the zener diode 5 can be prevented from damage, etc.

Figure 17:
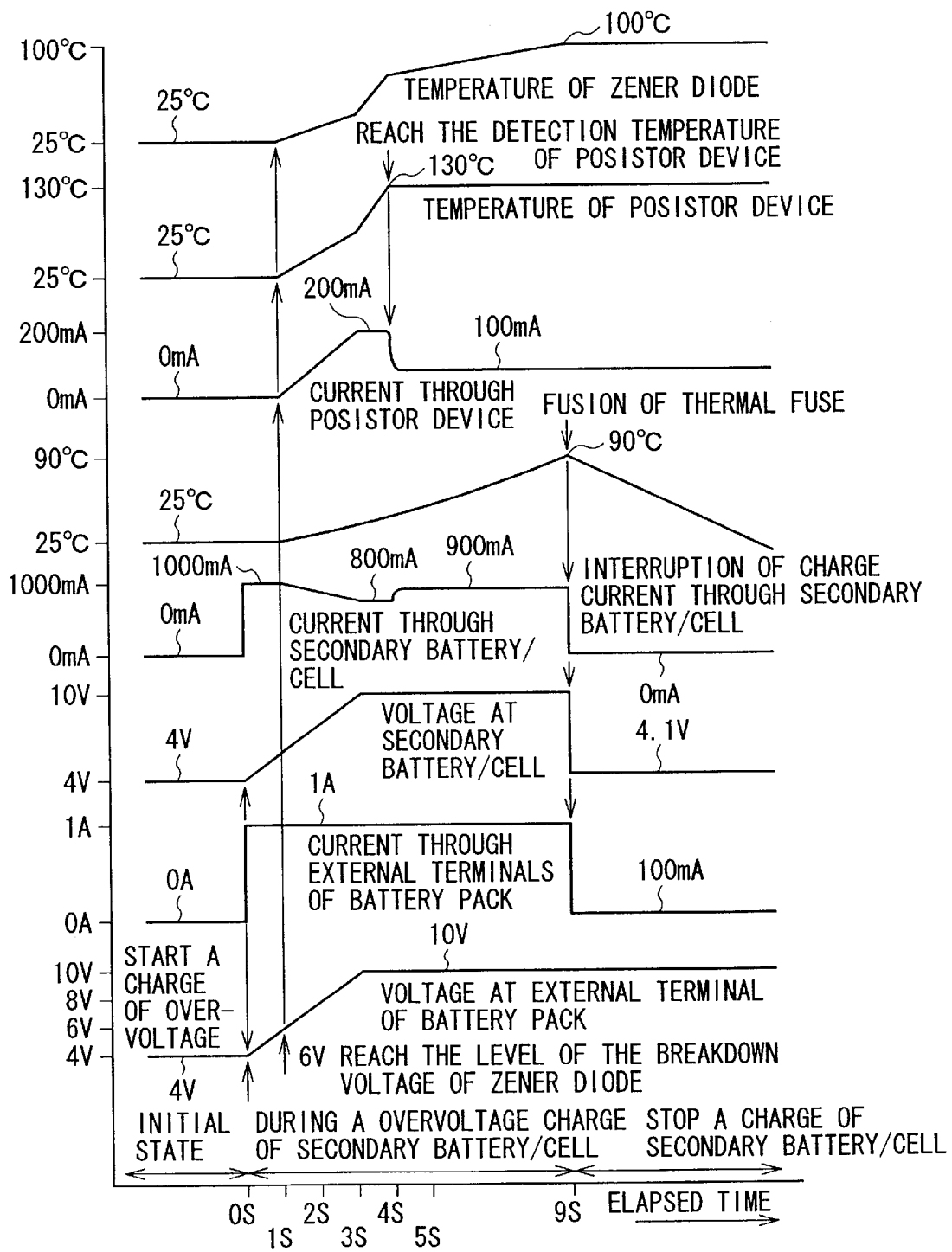
FIG. 17 is a graph showing each transient characteristic of current, voltage and temperature when an overvoltage is applied to a lithium-ion secondary battery containing an electronic device protection circuit.

FIG. 17 shows each transient characteristic of current, voltage and temperature when an overvoltage is applied to a lithium-ion secondary battery having the electronic device protection circuit 100 according to the first embodiment. As an example shown in the graph, in a case where the ambient temperature is 20° C., the rated charge voltage of the battery/cell 9 is 4.2 V, the fusion temperature of the thermal fuse 7 is 90° C., the breakdown voltage of the zener diode 5 is 6 V, the continuous rated of the output power is 600 mW, the maximum instant output power is 1200 mA, the rated current of the posistor 3 is 100 mW, the detection temperature is 130° C., and the resistance at 25° C. is 20Ω, transient characteristics when the lithium-ion secondary battery is connected to a charger with the rated charge power of 10 V, 1 A are shown.

When the lithium-ion secondary battery is connected to the charger, an applied voltage comes up, and a voltage greater than 6 V which is the breakdown voltage of the zener diode 5 is applied thereto, then a current starts to flow through the zener diode 5 and the posistor 3. When the applied voltage reaches 10 V after approximately 3 seconds, a voltage applied to the posistor 3 becomes 4 V. At this time, as the posistor 3 is not yet overheated and its temperature is less than the detection temperature, its electrical resistance is around 20Ω of the initial value, so the initial value of current through the posistor 3 is around 200 mA. At this time, as a voltage applied to the zener diode 5 is 6 V and the current through the zener diode 5 is the same 200 mA as that through the posistor 3, the power consumed by the heat generation is approximately 1200 mW, which is equal to or less than 1200 mW of the rated maximum instant power of the zener diode 5.

The current value of the posistor 3 continuously increases until the temperature of the posistor 3 reaches the detection temperature. The increase in current results in increases in the amount of heat generation in the zener diode 5 and the posistor 3. When the temperature of the posistor 3 reaches 130° C. which is the detection temperature, the electrical resistance of the posistor 3 steeply increases to approximately 40Ω, and the current is reduced from 200 mA to 100 mA. At this time, as the voltage applied to the zener diode 5 becomes 6 V due to a voltage drop resulting from 40Ω of the electrical resistance of the posistor 3, the power consumed by the heat generation of the zener diode 5 becomes 600 mW, which is equal to or less than the continuous rated of the power of 600 mW. When the heat generation continues, the temperature of the zener diode 5 gradually rises to approximately 100° C. The heat generated in the zener diode 5 is applied to the thermal fuse 7. When the temperature of thermal fuse 7 reaches 90° C., the fusion of the thermal fuse 7 occurs to completely shut down the application of the overvoltage to the battery/cell 9. Until the fusion of the thermal fuse 7 occurs, the current flow from the charger to the lithium-ion secondary battery is stable at approximately between 800 mA and 1,000 mA.

When the fusion of the thermal fuse 7 occurs, the current resulting from the application of the overvoltage flows not through a circuit comprising the battery/cell 9 but through a circuit formed of the zener diode 5 and the posistor 3 connected in series. At this time, as the electrical resistance of the posistor 3 has already increased, the current flow through the zener diode 5 is reduced to 100 mA, and the voltage applied to the zener diode 5 is reduced to 6 V by the voltage drop resulting from the electrical resistance of the posistor 3. Therefore, damage to or overheating of the zener diode 5 can be prevented.

Figure 18:
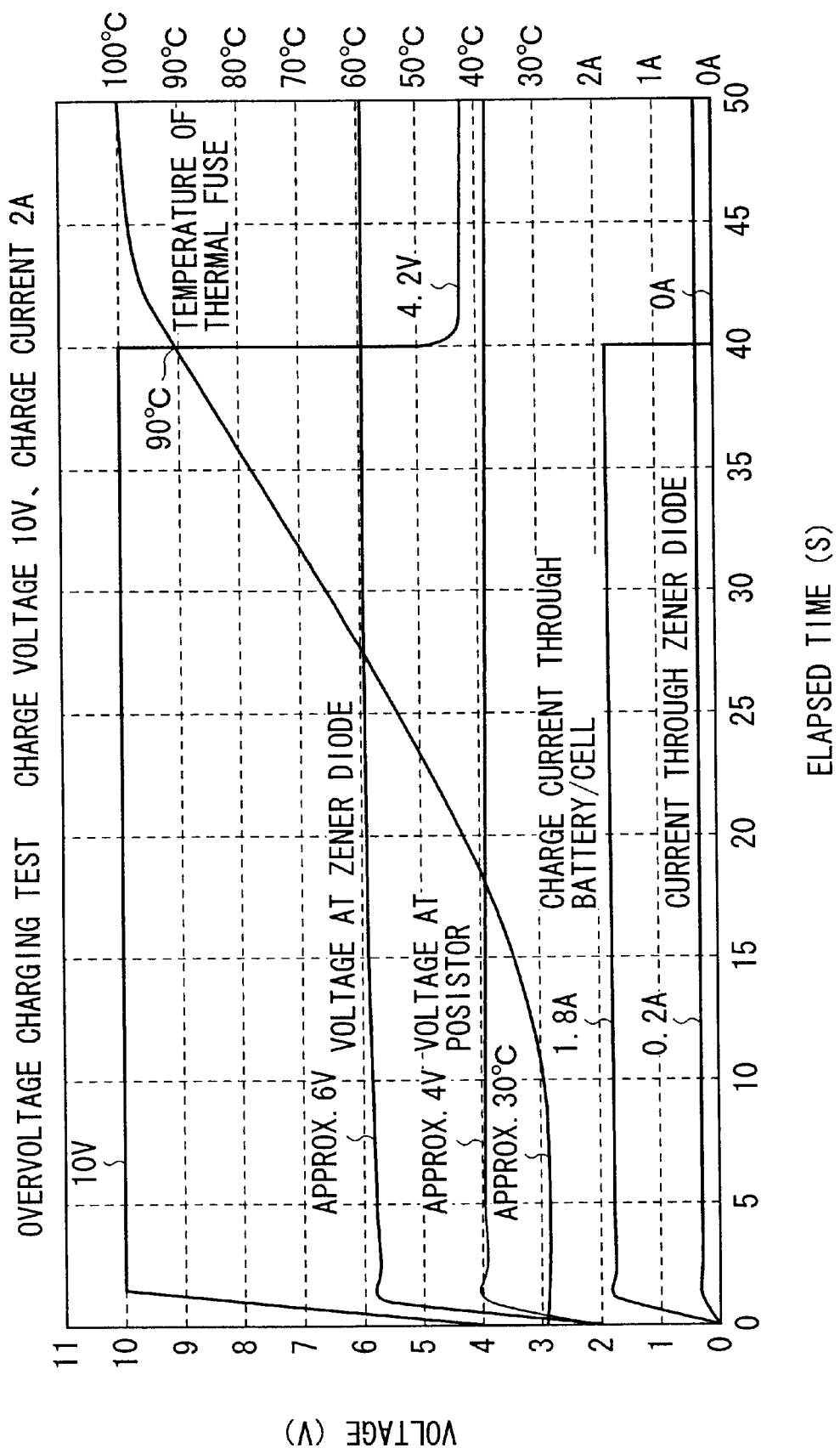
FIG. 18 is a graph of an example of experimental results in a case where an overvoltage greater than the rated charge voltage of a thin type lithium-ion secondary battery containing the electronic device protection circuit is applied thereto.

FIG. 18 shows a graph of an example of results from an experiment in a case where an overvoltage greater than the rated charge voltage is applied to a thin type lithium-ion secondary battery containing the electronic device protection circuit 100.

In the experiment, the thermal fuse 7 and the zener diode 5 were connected with a short strip-shaped metal sheet. The ambient temperature during the experiment was approximately 30° C. The output voltage of a charger which was a DC power source was 10 V, and the maximum current was 2 A. The electrical resistance of the posistor 3 at 30° C. was approximately 20Ω, and the detection temperature was 120° C. The breakdown voltage of the zener diode 5 was approximately 6 V, and the fusion temperature of the thermal fuse 7 was 90° C. In the graph shown in FIG. 18, the horizontal axis indicates the elapsed time from the application of the voltage, the vertical axis at the left indicates each voltage applied to the zener diode 5, posistor 3 and the battery/cell 9, and the vertical axis at the right indicates the charge current of the battery/cell 9 and the current flow through the zener diode 5 in ampere together with the temperature of the thermal fuse 7 in centigrade (° C.).

When the charger was connected, after a rise time of approximately one second (a delay in response), the voltage applied to the battery/cell 9 rose to 10 V, and the voltages of 4 V and 6 V were applied to the posistor 3 and zener diode 5, respectively. At that time, as the voltage greater than the breakdown voltage of the zener diode 5 was applied, the zener diode 5 was brought into a state of flowing a current therethrough, so a current of approximately 200 mA flew through the zener diode 5 and the posistor 3 which was connected in series to the zener diode 5. Therefore, the zener diode 5 generated heat with a power of approximately 1200 mW (=6 V×200 mA), which heated the zener diode 5, posistor 3 and the thermal fuse 7, resulting in rises in their temperatures. As the posistor 3 itself generated heat with the power of approximately 800 mW (=4 V×200 mA), the heat contributed to heating of thermal fuse 7, etc. Further, at that time, a voltage of 10 V was applied to the battery/cell 9, and the charge current of approximately 1.8 A stably flew therethrough.

If such charging condition had continued for, for example, a few minutes, the battery/cell 9 would have generated heat resulting from the charge with the overvoltage, which thereby might have resulted in degradation of or damage to the battery/cell 9. However, when such condition of charge with the overvoltage continued for approximately 40 seconds, the temperature of the thermal fuse 7 rose to its fusion temperature (90° C.), so the fusion of the thermal fuse 7 was carried out. Therefore, the application of the overvoltage to (in other word, an overcurrent flow through) the battery/cell 9 could be shut down. Thus, when the fusion of the thermal fuse 7 occurred, the voltage applied to the battery/cell 9 became 4.2 V of the rated output voltage or less amount of the voltage which was equal to the voltage during the charge.

However, even though the fusion of the thermal fuse 7 occurred, a current of approximately 200 mA continued to flow through the zener diode 5 and the posistor 3, so the zener diode 5 and the posistor 3 continuously generated heat. The heat was conducted to the thermal fuse 7, and the temperature of the thermal fuse 7 continuously rose even after the fusion, and reached approximately 100° C. 50 seconds after starting the application of the overvoltage. It indicated that the temperature of the zener diode 5 reached at least approximately 100° C. If such condition had further continued, the zener diode 5 as well as the posistor 3 might have been overheated, resulting in the degradation or damage. However, when the temperature of posistor 3 reached the detection temperature of 120° C. (not shown in FIG. 17, etc.), the electrical resistance of the posistor 3 steeply increased to reduce the current flow through the posistor 3 and the zener diode 5 to 100 mA, so that the amounts of the heat generation in the zener diode 5 and the posistor 3 were reduced to less than half after that. Thus, the zener diode 5 and the posistor 3 could be prevented from being degraded or damaged due to overheating.

Further, like this experiment, in a case where an overvoltage applied to the battery/cell 9 is less than double the breakdown voltage of the zener diode 5, the heat generation in the zener diode 5 becomes more dominant than that in the posistor 3. Therefore, by conducting the heat generated in the zener diode 5 to the thermal fuse 7, the fusion of the thermal fuse 7 can be reliably carried out.

[Second Embodiment]

Figure 19:
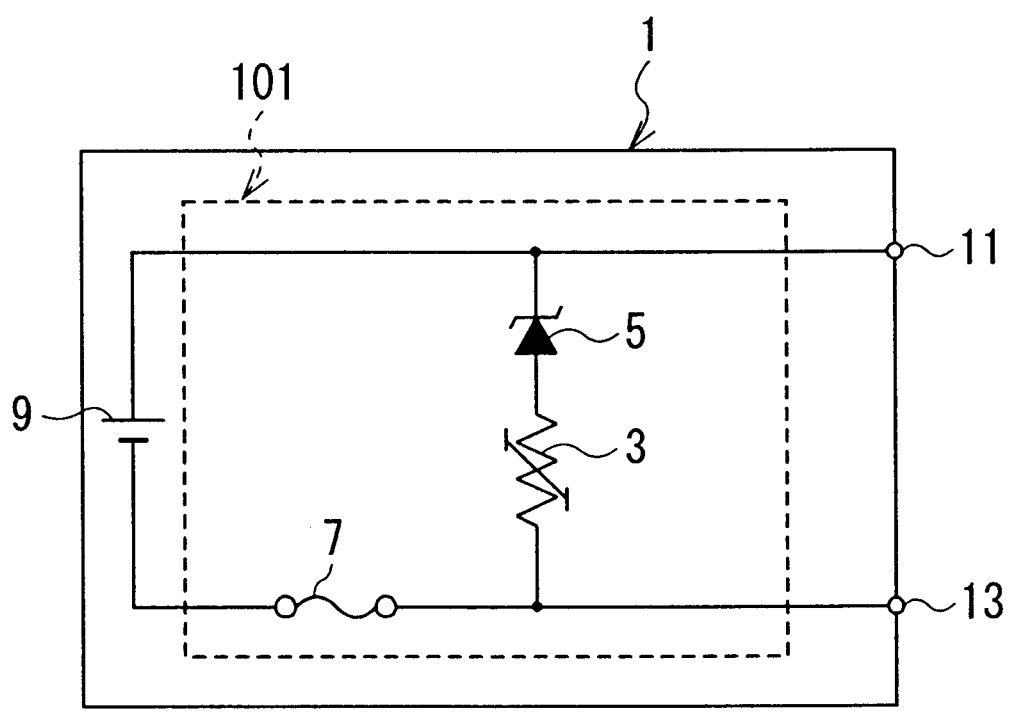
FIG. 19 is a schematic circuit diagram showing an electronic device protection circuit according to a second embodiment of the present invention.

FIG. 19 shows a schematic circuit diagram of an electronic device protection circuit 101 according to a second embodiment of the present invention. In an electronic device protection circuit 101, the posistor 3 and the zener diode 5 in the first embodiment shown in FIG. 1 are arranged to change places. Further, in the configuration of the second embodiment, the zener diode 5 in the configuration of the first embodiment shown in each drawing of FIG. 3 to FIG. 13 is replaced with the posistor 3, and the zener diode 5 and the posistor 3 in the configuration shown in each drawing of FIG. 14 to FIG. 16 are arranged to change places.

In the electronic device protection circuit 101, when an overvoltage is applied to the cathode side external connection terminal 11 and the anode side external connection terminal 13, a voltage greater than the breakdown voltage is applied to the zener diode 5, which then is brought into a state that a current flows therethrough, so the zener diode 5 as well as the posistor 3 generate heat. The posistor 3 and the zener diode 5 are arranged to be capable of efficiently conducting the heat to the thermal fuse 7. Therefore, by the heat generated in the posistor 3 and the zener diode 5 due to the application of the overvoltage, the fusion of the thermal fuse 7 is reliably carried out. Even after the fusion of the thermal fuse 7, the posistor 3 and the zener diode 5 continuously generate heat for a while. However, when the temperature reaches the detection temperature of the posistor 3, the electrical resistance of the posistor 3 steeply increases, and from then on, the current flow through the posistor 3 and the zener diode 5 is reduced, so that the zener diode 5 can be prevented from being degraded or damaged due to overheating.

In a case where the posistor 3 is placed close to the thermal fuse 7, when a voltage greater than approximately double the breakdown voltage of the zener diode 5 is applied, by the use of the posistor 3 with a great heating value, which efficiently generates heat, the fusion of the thermal fuse 7 can be reliably carried out.

Figure 20:
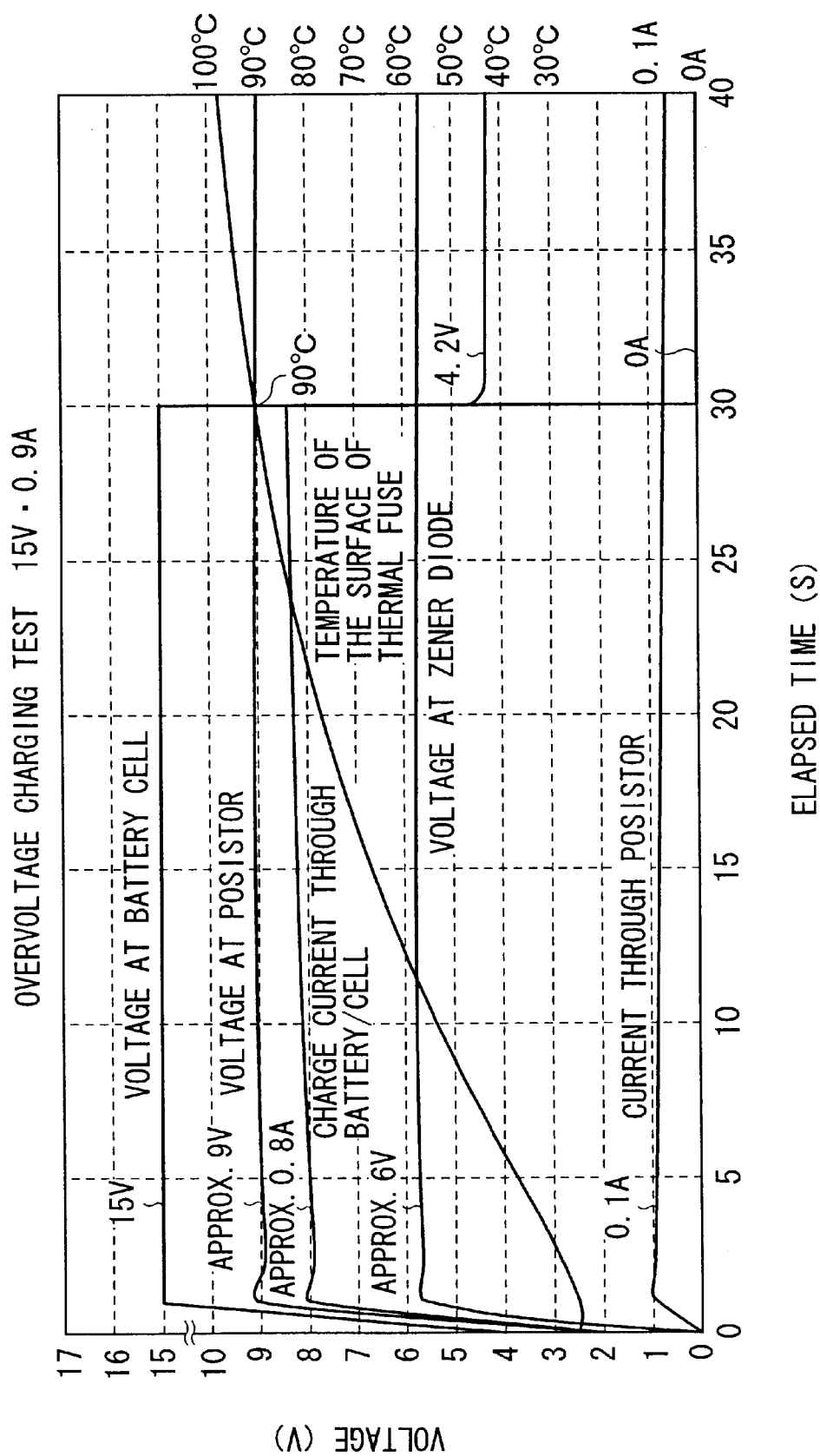
FIG. 20 is a graph of an example of experimental results in a case where an overvoltage greater than the rated charge voltage of a thin type lithium-ion secondary battery containing the electronic device protection circuit according to the second embodiment is applied thereto.

FIG. 20 shows a graph of an example of results from an experiment in a case where an overvoltage greater than the rated charge voltage is applied to a thin type lithium-ion secondary battery containing the electronic device protection circuit 101. In the experiment, the thermal fuse 7 and the posistor 3 were electrically and thermally connected with a short strip-shaped metal sheet. The ambient temperature during the experiment was approximately 30° C. The output voltage of a charger which was a DC power source was 15 V, and the maximum current was 0.9 A. The electrical resistance of the posistor 3 at 30° C. was approximately 20Ω, and the detection temperature was 120° C. The breakdown voltage of the zener diode 5 was approximately 6 V, and the fusion temperature of the thermal fuse 7 was 90° C. In the graph shown in FIG. 20, the horizontal axis indicates the elapsed time from the application of the voltage, the vertical axis at the left indicates each voltage of the zener diode 5, posistor 3 and the battery/cell 9, and the vertical axis at the right indicates the charge current of the battery/cell 9 and the current flow through the zener diode 5, as well as the temperature of the thermal fuse 7 in centigrade.

When the charger was connected, after a rise time of approximately one second, the voltage of the battery/cell 9 rose to 15 V, and the voltages of approximately 9 V and 6 V were applied to the posistor 3 and zener diode 5, respectively. At that time, as the voltage greater than the breakdown voltage of the zener diode 5 was applied, the zener diode 5 was brought into conduction, then a current of approximately 100 mA flew through the zener diode 5 and the posistor 3 which was connected in series to the zener diode 5. Therefore, the zener diode 5 generated heat with a power of approximately 600 mW (=6 V×100 mA). Also, with a power of approximately 900 mW (=9 V×100 mA), the posistor 3 generated heat, which was mainly applied to the thermal fuse 7. Further, at that time, a voltage of 15 V was applied to the battery/cell 9, the charge current of approximately 0.8 A stably flew therethrough.

When such condition continued, as the posistor 3 was heated by the heat generation in the posistor 3 itself and the thermal fuse 7, the electrical resistance of the posistor 3 increased, so the current flow through the posistor 3 and the zener diode 5 was gradually reduced. For example, the current value which was 0.1 A after approximately 1 second declined to 0.07 A after approximately 20 seconds, though the heat generation in the posistor 3 and the zener diode 5 continued without making a stop, so the thermal fuse 7 was heated more due to the heat. For example, after 20 seconds, the temperature of the posistor 3 reached nearly 120° C. (not shown). When such heat generation continued, the temperature of thermal fuse 7 reached the fusion temperature of 90° C., and then the fusion of the thermal fuse 7 occurred to shut down the application of the overvoltage to the battery/cell 9.

On the other hand, as a current of approximately 60 mA continuously flew through the zener diode 5 and the posistor 3, the heat generation in the zener diode 5 and the posistor 3 carried on even after the fusion of the thermal fuse 7, so the temperatures of the zener diode 5 and the posistor 3 rose still higher. Therefore, the temperature of the thermal fuse 7 reached approximately 98° C. 40 seconds after starting the application of the overvoltage. It indicated that the temperature of the posistor 3 reached at least approximately 98° C. If such condition had further continued, the posistor 3 as well as the zener diode 5 would have been further overheated, which might have resulted in degradation or damage. However, when the temperature of posistor 3 reached the detection temperature of 120° C., the electrical resistance of the posistor 3 steeply increased to abruptly reduce the current flow through the posistor 3 and the zener diode 5, so from then on, the heat generation in the zener diode 5 and the posistor 3 was reduced. Thus, the zener diode 5 and the posistor 3 could be prevented from being degraded or damaged due to overheating.

As confirmed in this experiment, in the configuration that the posistor 3 with a great heating value is placed close to the thermal fuse 7 to conduct heat from the posistor 3 to the thermal fuse 7, when an overvoltage applied to the battery/cell 9 is greater than double the breakdown voltage of the zener diode 5, the heat generation in the posistor 3 becomes more dominant than that in the zener diode 5. Therefore, by conducting the heat generated in the posistor 3 to the thermal fuse 7, the fusion of the thermal fuse 7 can be reliably carried out, and the time elapsed from the fusion of thermal fuse 7 to reduction of current by the posistor 3 can be shortened more.

[Third Embodiment]

Figure 21:
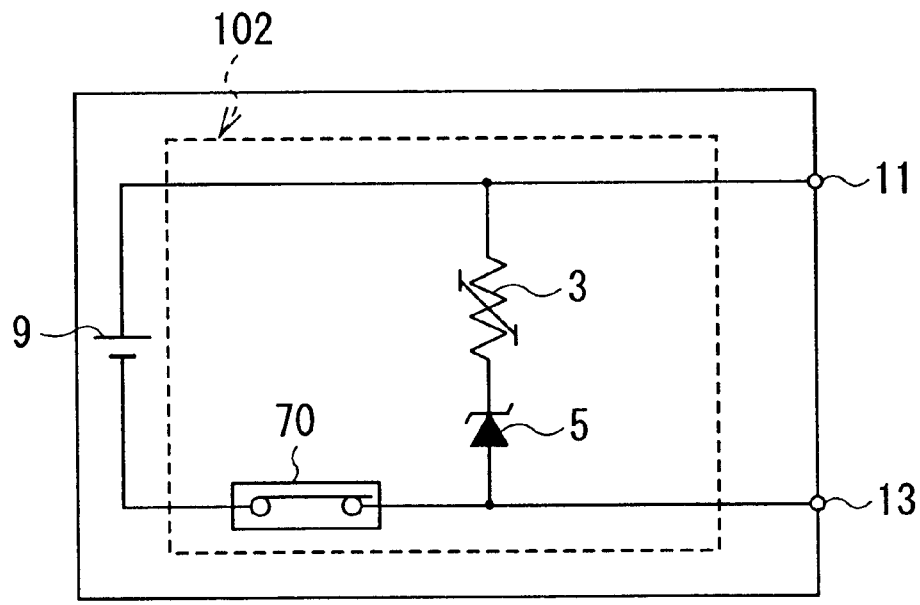
FIG. 21 is a schematic circuit diagram showing an electronic device protection circuit containing a thermostat instead of the thermal fuse.

FIG. 21 shows an electronic device protection circuit 102 according to a third embodiment of the present invention. The electronic device protection circuit 102 comprises a thermostat 70 instead of the thermal fuse 7 in the protection circuit of the first embodiment. The thermostat 70 is an electronic circuit device with a function that when the temperature of the thermostat 70 reaches higher than a interrupting threshold value by applying heat, the thermostat 70 interrupts the current, on the other hand, when the temperature drops to less than the interrupting threshold value, the thermostat 70 returns to a state that the current can flow therethrough. Therefore, by setting the interrupting temperature of the thermostat 70 as high as the fusion temperature of the thermal fuse 7, the function as a protection circuit similar to that of the first embodiment can be implemented. In addition, when the temperatures of the thermostat 70 and the zener diode 5 drop to normal room temperature, for example, due to suspending the application of an overvoltage from outside, the thermostat 70 is brought into original conduction again so by automatically returning the thermostat 70, an electronic device protection circuit 102 can be repeatedly used.

As the thermostat 70, for example, bimetal (not shown) which is designed that an electrical contact is placed at the end of two metal sheets with different thermal expansion coefficients laminated together in order to establish connection/disconnection between the electrical contact and a electrical contact at a fixed side depending on the temperature change is preferable because it can implement the function described above in a simple configuration. For example, in the case of the experiment described in the first embodiment, the interrupting threshold temperature of the thermostat 70 may be set to between 70° C. and 90° C.

Figure 22:
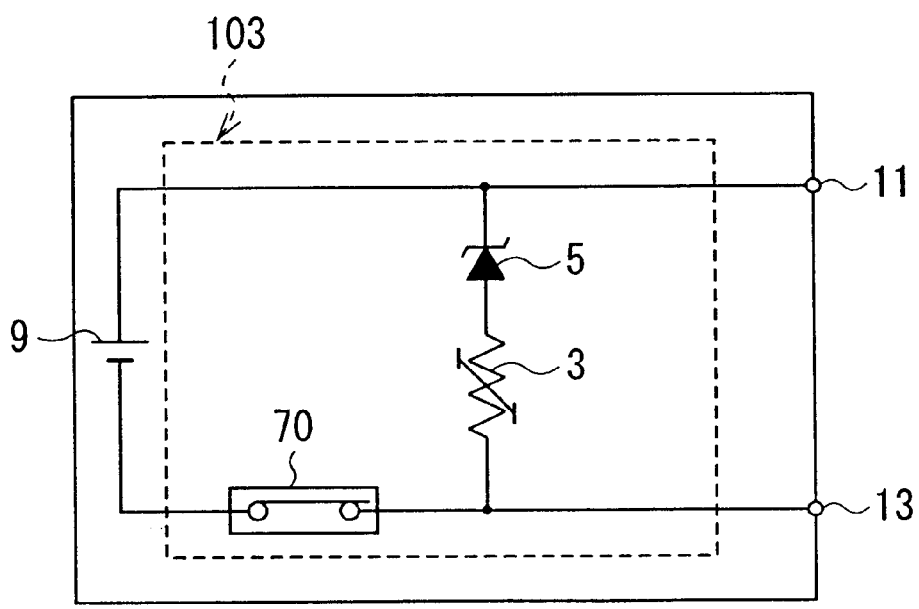
FIG. 22 is a schematic circuit diagram showing the circuit shown in FIG. 19 containing a thermostat instead of the thermal fuse.

Further, in the case of the circuit configuration and the substantial configuration as described in the second embodiment that the posistor 3 is arranged close to the thermal fuse 7, in an electronic device protection circuit 103 shown in FIG. 22, the thermostat 70 can be used instead of the thermal fuse 7.

[Forth Embodiment]

Figure 23:
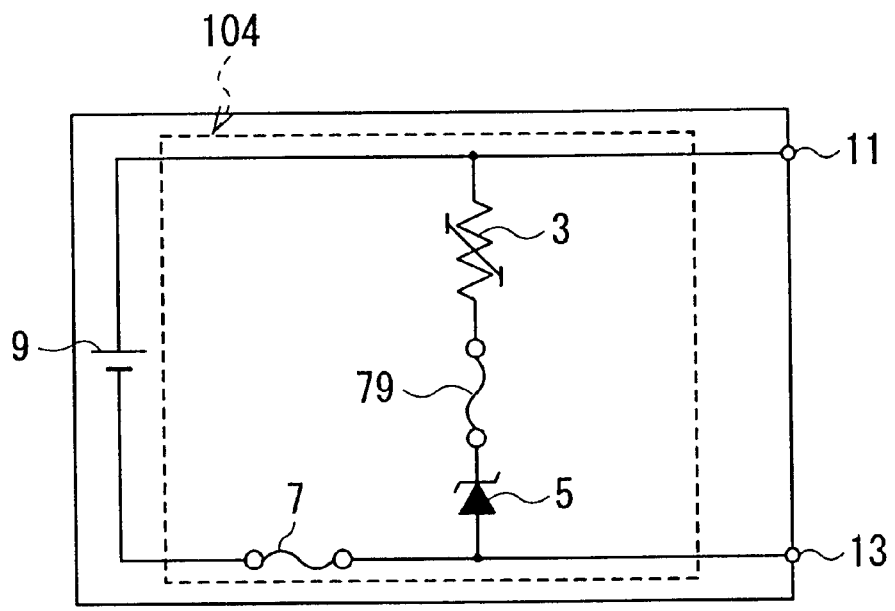
FIG. 23 is a schematic circuit diagram showing the electronic device protection circuit shown in FIG. 1 in which a high thermal fuse is provided between the posistor and the zener diode.

FIG. 23 shows a schematic circuit diagram of an electronic device protection circuit 104 according to a forth embodiment of the present invention. The electronic device protection circuit 104 comprises a thermal fuse of which the fusion temperature is higher (hereinafter referred to as high thermal fuse) placed between the posistor 3 and the zener diode 5 in the electronic device protection circuit 100 of the first embodiment. Except for this, the configuration is the same as that of the first embodiment.

In an electronic device protection circuit 104, when an overvoltage is applied, the zener diode 5 and the posistor 3 generate heat to carry out the fusion of the thermal fuse 7 placed between the anode side external connection terminal 13 and the anode of the battery/cell 9. The foregoing functions are the same as that of the first embodiment. Thus, even after the fusion of the thermal fuse 7, a current less than the detection current value of the posistor 3 continuously flows through the posistor 3, the zener diode 5 and a high thermal fuse 79. The current value at this time differs depending on the temperature and the heat radiation of the posistor 3, for example, in the same condition as that of the first embodiment, the current value is approximately between 20 mA and 100 mA. Thus, as the current continuously flows even after the fusion of the thermal fuse 7, the posistor 3 and the zener diode 5 continuously generate heat, resulting in the high thermal fuse 79 being further heated, and then the temperature of the high thermal fuse 79 reaches the fusion temperature, thereby, the fusion occurs. When an overvoltage is applied, at first, the fusion of the thermal fuse 7 connected to the battery/cell 9 occurs. Then, when the overvoltage is continuously applied, the fusion of the high thermal fuse 79 occurs. Thereby, the overvoltage can be reliably prevented from being applied to the battery/cell 9, and the fusion of the high thermal fuse 79 completely interrupts the current flow through the posistor 3 and the zener diode 5 even after the fusion of the thermal fuse 7, so the posistor 3, zener diode 5 and the battery/cell 9 can be more reliably prevented from being degraded or damaged due to overheating.

Figure 24:
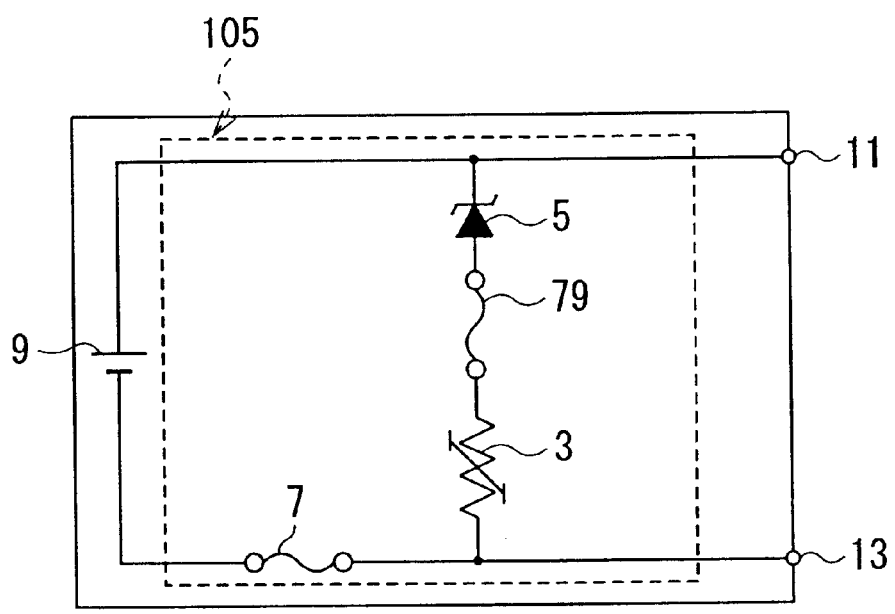
FIG. 24 is a schematic circuit diagram showing the electronic device protection circuit shown in FIG. 2 in which a high thermal fuse is provided between the zener diode and the posistor.

Further, in the case of the circuit configuration and the substantial configuration as described in the second embodiment that the posistor 3 is arranged close to the thermal fuse 7, as in an electronic device protection circuit 105 shown in FIG. 24, the high thermal fuse 79 can be placed between the zener diode 5 and the posistor 3 to completely interrupt the current flow through the posistor 3 and the zener diode 5 in the same manner of the above operations.

Still further, instead of the thermal fuse 7, a thermostat of which the interrupting threshold temperature is set to be equal to that of the thermal fuse 7 and, instead of the high thermal fuse 79, a high temperature thermostat of which the interrupting threshold temperature is set to be equal to that of the high thermal fuse 79 may be used. Thereby, the thermostat or the high temperature thermostat can automatically return to repeatedly use.

[Fifth Embodiment]

Figure 25:
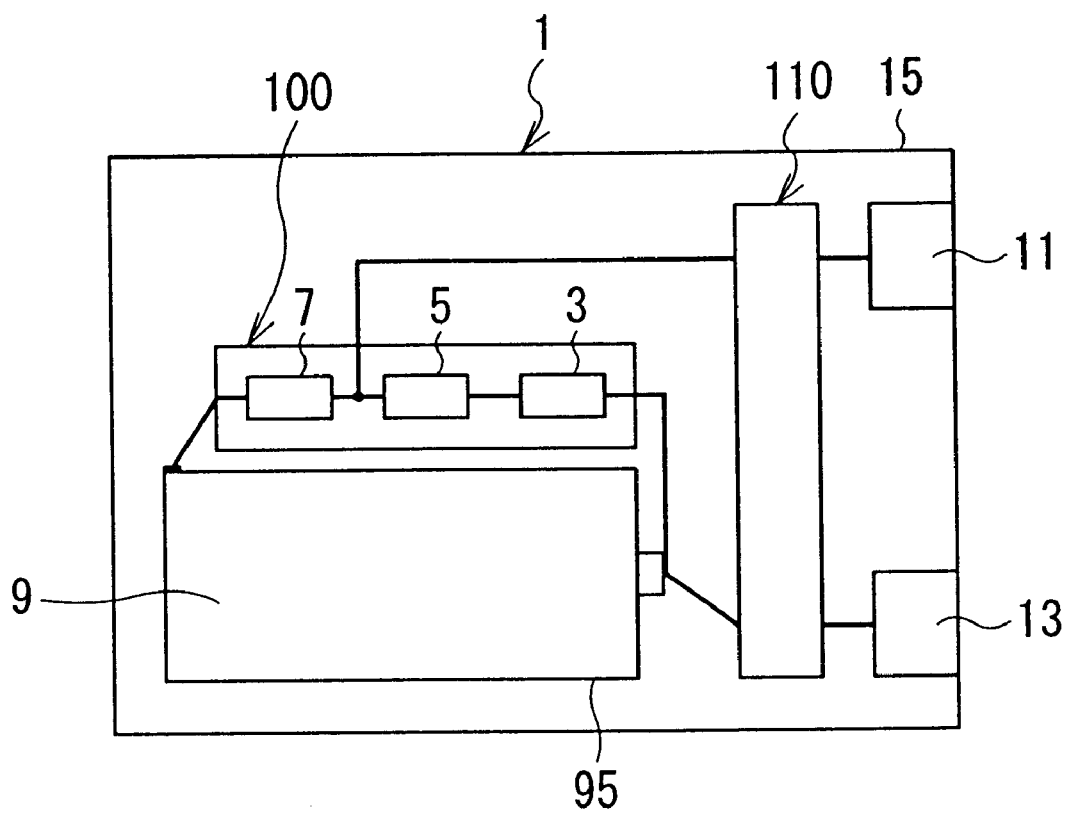
FIG. 25 is a schematic diagram of the inside of a lithium-ion secondary battery containing a typical overvoltage charge protection circuit having an IC for control, a field-effect transistor and so on together with the electronic device protection circuit.

FIG. 25 schematically shows the inside of a lithium-ion secondary battery containing a typical overvoltage charge protection circuit having an IC for control, a field-effect transistor and so on (not shown) together with the electronic device protection circuit as described in each of the above embodiments. By using an overvoltage charge protection circuit 110 together with the electronic device protection circuit 100, a higher level of safety can be achieved for preventing the battery/cell 9 from being damaged or degraded resulting from the application of an overvoltage to the lithium-ion secondary battery 1. For example, even if a malfunction in the overvoltage charge protection circuit 110 occurs due to an accidental breakdown such as electrostatic discharge destruction or damage of the circuit, the electronic device protection circuit 100 can reliably protect the battery/cell 9 from the application of the overvoltage.

It is obvious that electronic devices which can be protected by the application of the electronic device protection circuit according to the present invention are not limited to the battery/cell described in each of the above embodiments. The electronic device protection circuit is applicable for other electronic devices such as semiconductor integrated circuit and liquid crystal display device to which a voltage for drive, etc. is supplied from a power source.

[Second Invention]

[Sixth Embodiment]

Figure 26:
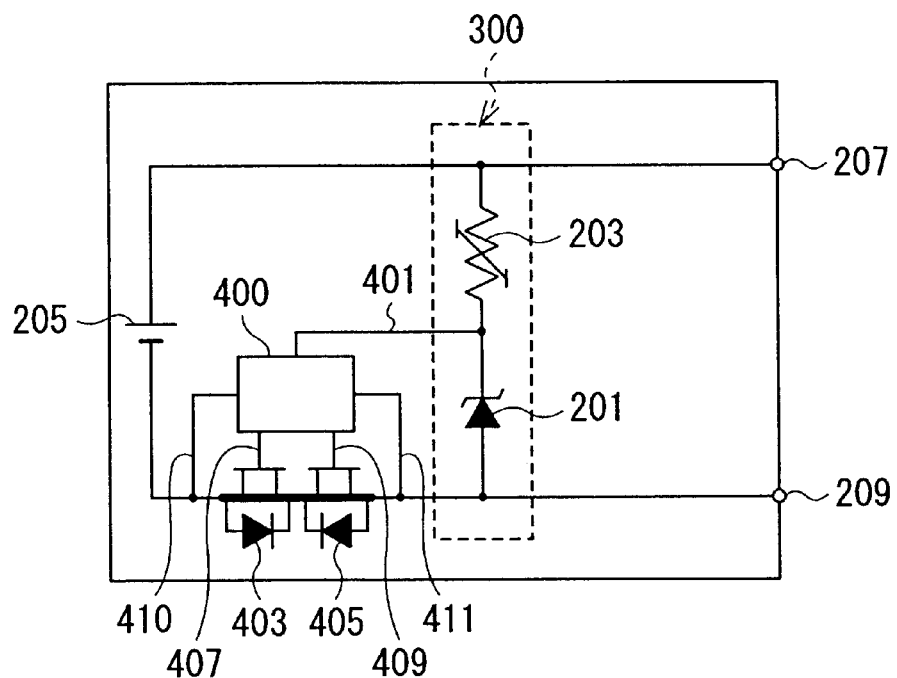
FIG. 26 is a schematic circuit diagram showing an electronic device protection circuit according to a sixth embodiment of the present invention.

FIG. 26 shows a schematic circuit diagram of an electronic device protection circuit 300 according to a sixth embodiment of the present invention. The electronic device protection circuit 300 comprises a zener diode 201 connected in parallel to a secondary battery protection integrated circuit (IC) 400, and a posistor 203 connected in series to the zener diode 201 as its main parts, which are mounted in, for example, the battery pack of a lithium-ion secondary battery. Thereby, when an excessive voltage is externally applied such as while charging the lithium-ion secondary battery, the secondary battery protection IC 400 is prevented from being damaged or degraded due to the application of the excessive voltage.

More specifically, the posistor 203 has characteristics that the electrical resistance increases in response to an increase in current, and when its temperature exceeds the detection temperature or current flow therethrough exceeds its rated current, the electrical resistance more steeply increases. The rated current is set to less than the maximum allowable current of the zener diode 201. An end of the posistor 203 is connected to a cathode side external connection terminal 207 and the cathode of a secondary battery/cell 205, and the other end is connected to an end (cathode side) of the zener diode 201. The electrical resistance of the posistor 203 under normal condition is generally approximately $1\Omega$ to $1000\Omega$, though it is obvious that the resistance is preferably set to the amount which may not cause any trouble in the voltage detection function of the secondary battery protection IC 400 when a voltage less than the rated maximum voltage is applied.

The zener diode 201 has characteristics that when a voltage less than its breakdown voltage is applied, little or no current flows therethrough, but the application of a voltage greater than the breakdown voltage results in steep increase in current flow therethrough. The breakdown voltage is set to greater than the rated voltage of the secondary battery protection IC 400. An end (cathode side) of the zener diode 201 is connected to a cathode side connection terminal 401 of the secondary battery protection IC 400 and an end of the posistor 203, while the other end (anode side) of the zener diode 201 is connected to an anode side connection terminals 407 and 409 via field effect transistors 403 and 405, and to an anode side external connection terminal 209.

The zener diode 201 is, therefore, connected in parallel to the secondary battery protection IC 400, and in series to the posistor 203. The zener diode 201 is mounted in order to be capable of carrying out good thermal conduction with the posistor 203 (details of mounting forms and configurations will be described hereinafter).

The secondary battery/cell 205 is a rechargeable secondary battery such as a lithium-ion secondary battery, and the cathode thereof is connected to a cathode side external connection terminal 207 and an end of the posistor 203, while the anode thereof is connected to an anode side terminal 411 of the secondary battery protection IC 400 via the field effect transistors 403 and 405, and the anode side external connection terminal 209, and an anode side terminal 410 of the secondary battery protection IC 400. The secondary battery/cell 205 is, therefore, connected in parallel to an electronic device protection circuit 300 formed of the posistor 203 and the zener diode 201 which are connected in series.

The secondary battery protection IC 400 detects a voltage applied to the cathode side external connection terminal 207 through the posistor 203, and, based on the detected voltage, detects that the secondary battery/cell 205 is charged with an excessive voltage or that the secondary battery/cell 205 discharges undervoltage, so that the secondary battery protection IC 400 functions to be capable of inhibiting such conditions. The secondary battery protection IC 400 comprises two field effect transistors 403 and 405. When it is detected that the secondary battery/cell 205 is discharging undervoltage, the field effect transistor 403 is controlled by the secondary battery protection IC 400 to turn its gate off for interrupting a current discharged from the secondary battery/cell 205. On the other hand, when it is detected that an excessive voltage is applied to the secondary battery/cell 205, the field effect transistor 405 is controlled to turn its gate off for interrupting a current charged to the secondary battery/cell 205. The secondary battery protection IC 400 is connected in parallel to the zener diode 201 which is connected in series to the posistor 203. In other words, the secondary battery protection IC 400 is connected in series to the posistor 203.

In the electronic device protection circuit 300, as described above, the zener diode 201 is connected in parallel to the secondary battery protection IC 400, and the posistor 203 is connected in series to the zener diode 201 and the secondary battery protection IC 400. Therefore, when a voltage applied to the cathode side external connection terminal 207 and the anode side external connection terminal 209 is less than the rated voltage of the secondary battery protection IC 400, a voltage applied to the zener diode 201 is less than its breakdown voltage so that the zener diode 201 is virtually brought out of conduction, thereby, a current resulting from the application of voltage from outside does not flow through the zener diode 201. Moreover, as the current at this time is less than the rated current of the posistor 203, the posistor 203 continuously maintains relatively low electrical resistance under normal condition, so that there is no trouble in the voltage detection function of the secondary battery protection IC 400. Thus, as long as a voltage externally applied is less than the rated voltage, the secondary battery protection IC 400 can detect the applied voltage via the posistor 203 so as to carry out normal functions without any trouble.

When a voltage applied to the cathode side external connection terminal 207 and the anode side external connection terminal 209 is greater than the rated voltage of the secondary battery protection IC 400, the voltage applied to the zener diode 201, even though a voltage drop in the posistor 203 is subtracted therefrom, is greater than its breakdown voltage, so that the zener diode 201 is brought into conduction, thereby, a large current resulting from the application of the excessive voltage is bypassed not to the secondary battery protection IC 400 but to the zener diode 201. Also, due to the characteristics of the zener diode 201, even if the voltage externally applied further increases, the voltage between the terminals of the zener diode 201 is locked on at the value of the breakdown voltage, so the voltage between the terminals of the secondary battery protection IC 400 which is connected in parallel to the zener diode 201 is locked on at the value of the breakdown voltage of the zener diode 201. Thus, when the voltage externally applied is an excessive voltage greater than the rated voltage, the zener diode 201 is brought into conduction to bypass the large current from the posistor 203 not to the secondary battery protection IC 400 but to the zener diode 201, and to reduce the voltage applied to the secondary battery protection IC 400 to the value of the breakdown voltage of the zener diode 201, so that the secondary battery protection IC 400 can be prevented from being damaged or degraded due to the application of the excessive voltage.

Further, when a large current continuously flows through the zener diode 201 due to continuation of the application of the excessive voltage, or a higher voltage is applied, the zener diode 201 generates heat. If such state continues for a long time, the zener diode 201 is overheated to cause damage to or degradation in the zener diode 201 itself or the secondary battery protection IC 400 mounted in the periphery thereof. However, in the electronic device protection circuit 300, by the heat generated in the zener diode 201, the posistor 203 is heated so that its temperature reaches its detection temperature, resulting in a steep increase in the electrical resistance of the posistor 203, which thereby reduces the current flow, and consequently inhibits the large current flow through the zener diode 201 connected in series to the posistor 203. Thus, even if the excessive voltage is continuously applied, or a higher voltage is applied, the secondary battery protection IC 400 can be prevented from being damaged or degraded and the zener diode 201 can be prevented from being overheated or damaged.

Figure 27:
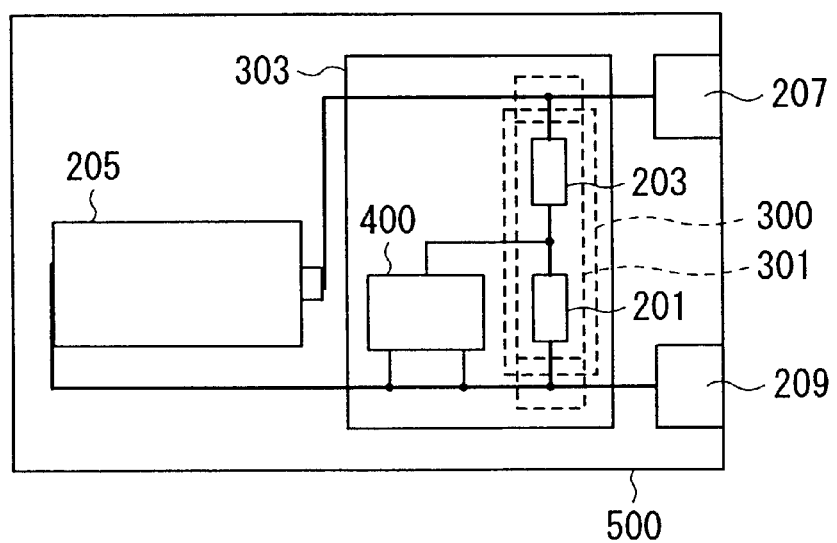
FIG. 27 is a schematic diagram of the inside of the battery pack of a lithium-ion secondary battery containing the electronic device protection circuit shown in FIG. 26 together with a secondary battery/cell and a secondary battery protection IC.

FIG. 27 schematically shows the inside of the battery pack of the lithium-ion secondary battery containing the electronic device protection circuit 300 together with a secondary battery/cell 205 and a secondary battery protection IC 400.

For example, in a thin box-shaped battery pack such as a lithium-ion secondary battery for cellular phone, on the surface of a package case 500 made of a insulating material such as plastic, the cathode side external connection terminal 207 and the anode side external connection terminal 209 which are made of thin plates of copper alloy or stainless with excellent electrical conductivity and high wear resistance are provided. In the package case 500, the rechargeable and dischargeable secondary battery/cell 205, the secondary battery protection IC 400 and the electronic device protection circuit 300 are contained.

In the electronic device protection circuit 300, the zener diode 201 and the posistor 203 are covered with an electrical insulating coating 301 made of, for example, a flame-resistant insulating paper, polyester tape, thermosetting plastic or silicon adhesive. The coating 301 preferably has high thermal insulation, so that when the excessive voltage is applied, the thermal insulation of the coating 301 prevents the secondary battery/cell 205 and the secondary battery protection IC 400 from being heated by the beat generated in the zener diode 201 and the posistor 203. Alternatively, a heat sink (not shown) may be attached to the electronic device protection circuit 300, and be extended to the surface or outside of the package case 500 of the battery pack to radiate heat generated in the electronic device protection circuit 300. The electronic device protection circuit 300 united with the secondary battery protection IC 400 is covered with a casing 303, and is mounted between the cathode side external connection terminal 207 and the anode side external connection terminal 209, and the secondary battery/cell 205 as a unit.

Figure 28:
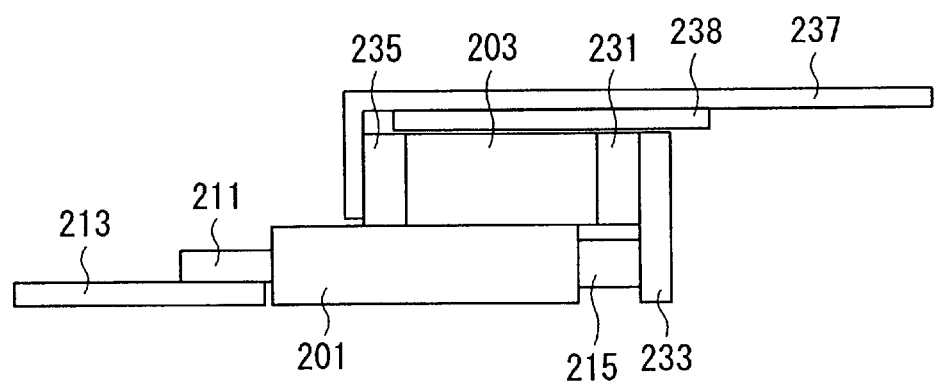
FIG. 28 is an example of the substantial configuration in which the posistor and the zener diode are joined.

FIG. 28 shows an example of the substantial configuration in which the posistor 203 and the zener diode 201 are joined.

The zener diode 201 is a semiconductor device enclosed in an electrical insulating coating with terminals 211 and 215 on each side thereof. The anode side terminal 211 of the zener diode 201 is connected to an electrode terminal 213. The electrode terminal 213 is further connected to the anode side external connection terminal 209 via the wiring pattern of a mounted circuit board which is not shown in FIG. 28, as well as to the secondary battery protection IC 400. For the connection of the electrode terminal 213 and the terminal 211, a low-melting-point metal with a melting point from 180° C. to 260° C. such as an alloy containing lead and tin and an alloy containing silver and copper can be used. Also, for a material of the electrode terminal 213, a metal with relatively high melting point and a good machinability such as nickel, brass, iron-based alloy and copper-based alloy is suitable. The cathode side terminal 215 of the zener diode 201 is joined with a metal plate 233. With the metal plate 233, the cathode side terminal 215 of the zener diode 201 is connected to a terminal 231 of the posistor 203. For the connection, the above low-melting-point metal can be used.

The posistor 203 has terminals 231 and 235 mounted on each end thereof, and is slightly offset to the right in the drawing in contact with the top surface of the zener diode 201, so as to well conduct heat generated in the zener diode 201 thereto. The terminal 231 is connected to the cathode side terminal 215 of the zener diode 201 via the metal plate 233 as described above, while the other terminal 235 is connected to the anode side external connection terminal 209 via the electrode terminal 237 which is bended into the form of the letter L and a wiring pattern, etc. which is not shown in FIG. 28, as well as to the cathode of the secondary battery/cell 205. For the connection of the terminal 231 of the posistor 203 and the metal plate 233, and the connection of the other terminal 235 and L-shaped electrode terminal 237, for example, soldering is applicable. Alternatively, it is obvious that an electrical resistance welding method or ultrasonic welding method may be used to directly connect them. In order to prevent a short-circuit between the L-shaped electrode terminal 237 and the metal plate 233 or the terminal 231 of the posistor 203, an insulation film 238 is affixed between the top surface of the posistor 203 and the L-shaped electrode terminal 237.

It is obvious that the above electrode terminal 237 and the metal plate 233 are preferably made of strip-shaped metal plates. In order to further improve the thermal conductivity from the zener diode 201 to the posistor 203, the width and thickness of the metal plate 233 is preferably wide and thick to some degree. For the same purpose as above, the area where the top surface of the zener diode 201 and the undersurface of the posistor 203 are overlapped is preferably as wide as possible.

According to such configuration, when a large current flows through, the posistor 203 generates heat, and the heat generated in the zener diode 201 is effectively conducted to the posistor 203, so that the electrical resistance of the posistor 203 reliably increases to prevent the zener diode 201 from being overheated or damaged. Further, the configuration of the electric device protection circuit 300 can be prevented from being complicated.

Figure 29:
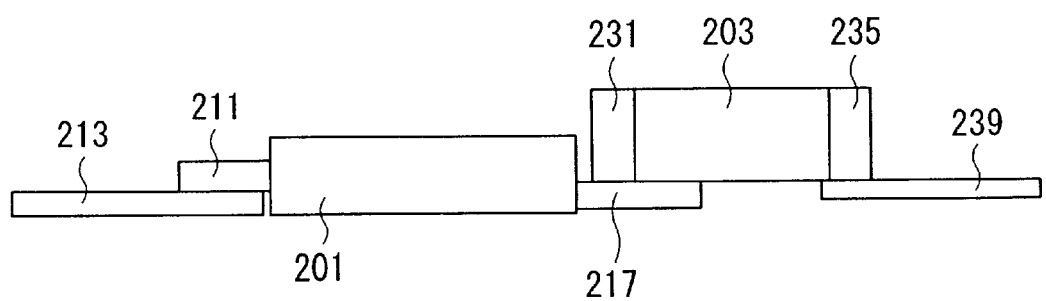
FIG. 29 is another example of the substantial configuration in which the posistor and the zener diode are connected.

FIG. 29 shows another example of the substantial configuration in which the posistor 203 and the zener diode 201 are connected.

In the configuration, as the posistor 203 and the zener diode 201 are not stacked but placed almost in line, the cathode side terminal 217 of the zener diode 201 is directly joined with a terminal 231 of the posistor 203. The anode side terminal 211 of the zener diode 201 is joined with the electrode terminal 213 like the configuration shown in FIG. 28. The other terminal 235 of the posistor 203 is joined with a flat electrode terminal 239.

In such configuration, as the heat generated in the zener diode 201 can be effectively conducted to the posistor 203 through the terminal 217, the electrical resistance of the posistor 203 can reliably increase to prevent the zener diode 201 from being overheated and damaged. Also, the configuration is so simple that the electronic device protection circuit 300 can be prevented from being complicated.

Figure 30:
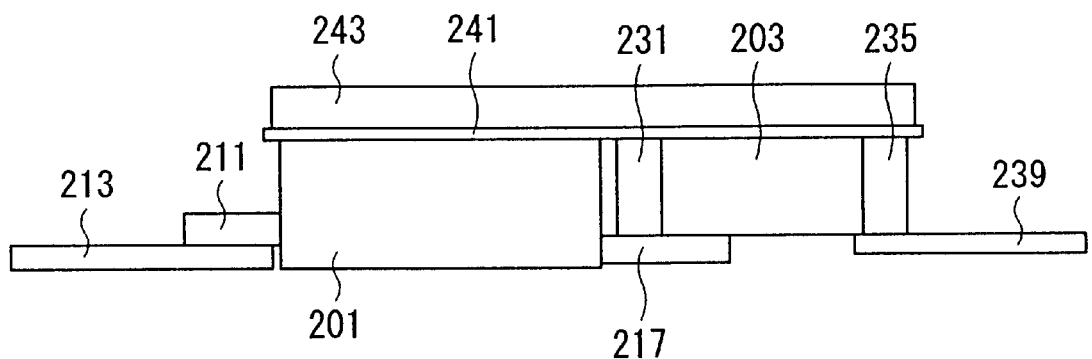
FIG. 30 is still another example of the substantial configuration in which the posistor and the zener diode are connected.

FIG. 30 shows still another example of the substantial configuration in which the posistor 203 and the zener diode 201 are connected.

On the top surfaces of the zener diode 201 and the posistor 203 through an electrical insulation plate 241, a thermal conduction plate 243 is placed. For the thermal conduction plate 243, a metal material with high thermal conductivity and a good machinability such as copper, brass, aluminum, nickel or silver is preferably used. For the electrical insulation plate 241, a thin plate made of, for example, polyethylene, polyimide or polyamide, glass-fiber fabric, pulp nonwoven or an insulation paper is suitable. Each thickness of the coating of the zener diode 201 and the coating of the posistor 203 is preferably as thin as possible to such an extent as not to lose their electrical insulation and dynamical strength.

In such configuration, the heat generated in the zener diode 201 can be more effectively conducted to the posistor 203 through the thermal conduction plate 243, so that the zener diode 201 can be more reliably prevent from being overheated or damaged.

It is obvious, but not shown in FIG. 28 to FIG. 30, that a component connecting the cathode side terminal 215 of the zener diode 201 and the terminal 231 of the posistor 203 like the metal plate 233 is also connected to the secondary battery protection IC 400 through wiring, etc.

Figure 31:
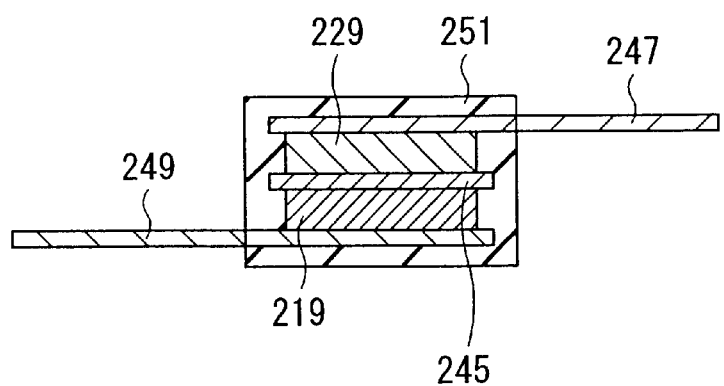
FIG. 31 is a further example of the substantial configuration in which the posistor and the zener diode are connected.

FIG. 31 is a cross-sectional view of a further example of the substantial configuration in which the posistor 203 and the zener diode 201 are connected.

In the configuration, a semiconductor device 219 of the zener diode 201 and a temperature sensitive device 229 which are stacked with an intermediate electrode 245 with good thermal conductivity placed therebetween, and electrodes 247 and 249 which are joined on the top surface of the temperature sensitive device 229 and the undersurface of the semiconductor device 219, respectively, are covered with a coating 251 made of an electrical insulating material. The intermediate electrode 245 is connected to the secondary battery protection IC 400 through wiring, etc. which is not shown.

In such configuration, the heat generated in the semiconductor device 219 can be the most effectively conducted to the temperature sensitive device 229 through the intermediate electrode 245, and further, the electronic device protection circuit 300 can be more compact and simpler.

Figure 52:
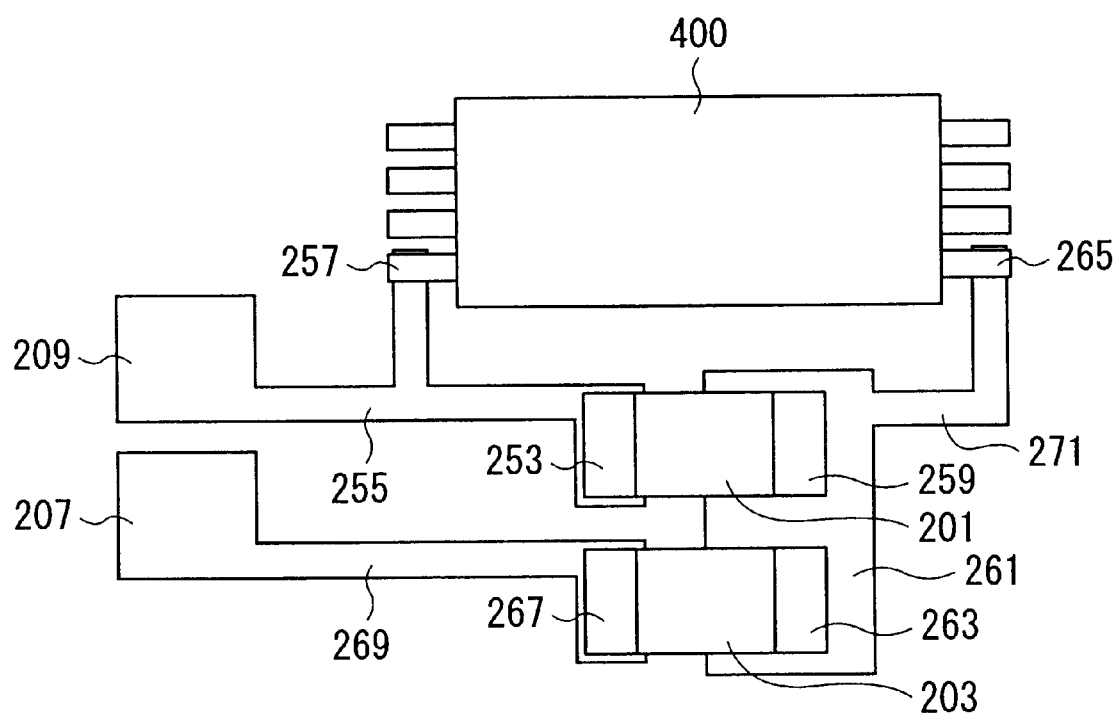
FIG. 52 is a plane view of a wiring pattern and an example of the packaging form in a case where the zener diode and the posistor are mounted on the surface of a printed wiring board.

FIG. 52 is a plane view of a wiring pattern and an example of the packaging form in a case where the zener diode and the posistor are mounted on the surface of a printed wiring board.

As a mounting form (packaging style) of each electronic component, the zener diode 201 and the posistor 203 are chip-type packages, and the secondary battery protection IC 400 is a dual inline flat package. All of them are designed for surface mounting. With a typical surface mount technology that soldering paste is put on a connection pad placed in a predetermined location on a printed wiring board for a reflow process, the zener diode 201 and the posistor 203 are mounted on the surface of the printed wiring board. For the printed wiring board, for example, a glass cloth impregnated with a thermosetting resin, such as polyimide and epoxy, which has high heat resistance is suitable.

An anode side terminal 253 of the zener diode 201 is connected to the anode side external connection terminal 209 via a conductor 255 formed on the surface of the printed wiring board, and to a terminal 257 for the anode connection (connection pin) of the secondary battery protection IC 400. A cathode side terminal 259 of the zener diode 201 is connected to a terminal 263 of the posistor 203 and a terminal 265 for the cathode connection of the secondary battery protection IC 400 via a conductor 261. The other terminal 267 of the posistor 203 is connected to the cathode side external connection terminal 207 via a conductor 269. By the wide conductor 261, the zener diode 201 and the posistor 203 are connected to have excellent thermal conductivity in between, so that the heat generated in the zener diode 201 can be efficiently conducted to the posistor 203. For example, the temperature differential between them can be equal to or less than 10° C.

In order to secure the thermal conductivity, the thickness of the conductor 261 is preferably but not limited to, for example, 35 μm or over. On the other hand, the conductor 255 which connects the anode side terminal 253 of the zener diode 201 and the terminal 257 for the anode connection of the secondary battery protection IC 400, and a conductor 271 which connects the wide conductor 261 and a terminal 265 for the cathode connection are formed in narrow patterns, so that they can inhibit the heat generated in the zener diode 201 and the posistor 203 from being conducted to the secondary battery protection IC 400.

More specific functions of the electronic device protection circuit 300 according to the sixth embodiment will be described hereinafter.

During a battery charge, if an overvoltage greater than the rated voltage of the secondary battery/cell 205 is applied to the anode side external connection terminal 209 and the cathode side external connection terminal 207, the overvoltage is also applied to the circuit formed of the zener diode 201 and the posistor 203 which are connected in series. At this time, an increase in the electrical resistance of the posistor 203 does not occur yet and a voltage drop in the posistor 203 is small, so a voltage exceeding the breakdown voltage is applied to the zener diode 201. Thereby, the zener diode 201 is substantially brought into a state to conduct a large current flow therethrough, and consequently generates heat. As the heat is efficiently conducted to the posistor 203 by either of the configurations shown in FIG. 28 through FIG. 31, the posistor 203 is heated to cause a rise in its temperature. When its temperature rises to higher than the detection temperature, the electrical resistance of the posistor 203 steeply increases to inhibit the current flow through the posistor 203 and the zener diode 201. At this time, by the voltage drop resulting from the increase in the electrical resistance of the posistor 203 and a lock-on operation of the voltage between the terminals of the zener diode 201, the voltage between the terminals of the secondary battery protection IC 400 connected in parallel to the zener diode 201 is kept at around the level of the breakdown voltage of the zener diode 201. Thus, even though the overvoltage is applied, damage to or degradation in the secondary battery protection IC 400 as well as overheating of or damage to the electronic device protection circuit 300 can be prevented.

Figure 32:
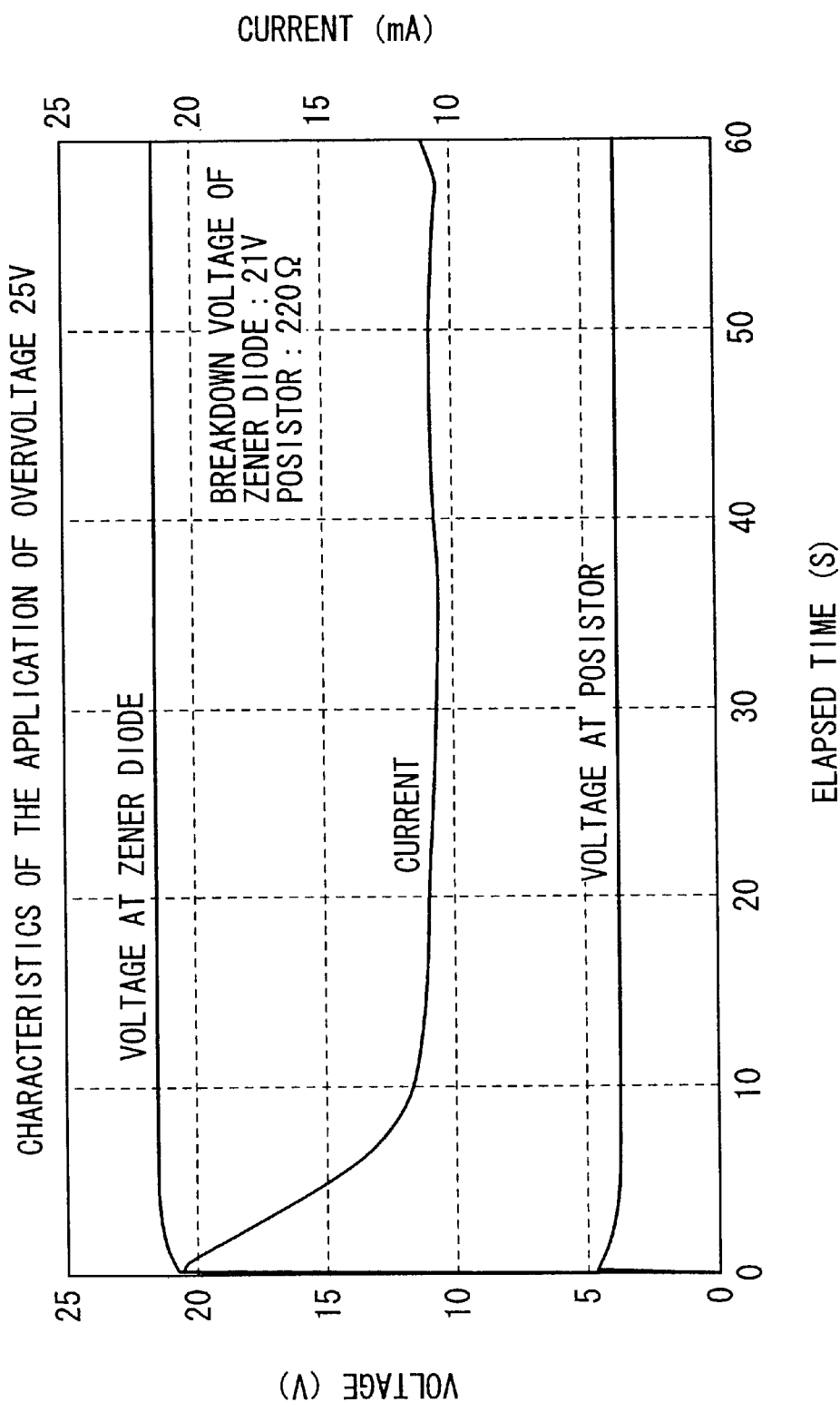
FIG. 32 is a graph showing the result of an experiment in a case where a voltage of 25 V is applied to the electronic device protection circuit according to the sixth embodiment.

FIG. 32 shows the result of an experiment in a case where a voltage of 25 V is applied to the electronic device protection circuit according to the sixth embodiment.

In this experiment, the electronic device protection circuit 300 as shown in FIG. 29 was used. In the specifications of the posistor 203, the initial resistance was 220Ω and the detection temperature was 120° C. In the specifications of the zener diode 201, the breakdown voltage was 21 V, the maximum power rating was 200 mW and the maximum allowable temperature was 150° C. The ambient temperature during the experiment was approximately 25° C. The voltage outputted from a DC power source was 25 V and the maximum current was 1 A. In the graph shown in FIG. 32, the horizontal axis indicates elapsed time from the start of the application of voltage, the vertical axis on the left indicates each voltage applied to the zener diode 201 and the posistor 203, and the vertical axis on the right indicates current flow through the posistor 203 and the zener diode 201 which are main parts of the electronic device protection circuit 300 in ampere [A].

At the instant following the connection of the DC power source, the voltage between the terminals of the posistor 203 became approximately 4 V, and the voltage between the terminals of the zener diode 201 was approximately 21 V. As the voltage of approximately 21 V which was greater than the breakdown voltage was applied, the zener diode 201 was brought into conduction, so a current of approximately 20 mA flew through the zener diode 201 and the posistor 203. By the flow of the current of approximately 20 mA resulting from the application of the voltage of 21 V, the zener diode 201 generated heat with a power of approximately 420 mW, which was conducted to the posistor 203 and caused a rise in its temperature. Also, the posistor 203 itself generated heat with a power of approximately 80 mW (=4 V×20 mA).

If such condition had continued, for example, for a few minutes, the zener diode 201 would have been overheated due to the heat generated therein and the heat generated in the posistor 203, so that the zener diode 201 might have been degraded or damaged. However, in the electronic device protection circuit 300, approximately 10 seconds after starting the application of the overvoltage of 25 V, the posistor 203 was heated by the heat generated in the zener diode 201 and the posistor 203 itself to reach higher than the detection temperature of 120° C. Then, as the electrical resistance of the posistor 203 steeply increased to approximately 400Ω, the current flow through the posistor 203 and the zener diode 201 could be reduced to approximately 10 mA to 12 mA which was approximately half of the earlier current. After that, even though the overvoltage (25 V) was continuously applied, the current could be held approximately at 10 mA to 12 mA. Therefore, the zener diode 201 and the posistor 203 could be prevented from being degraded or damaged due to overheating.

For comparison, when the same experiment as above was carried out with a fixed resistor instead of the posistor 203, it was verified that heat of 400 mW which was much greater than the maximum power rating of 200 mW continuously generated so as to overheat the zener diode 201, which was consequently damaged.

Figure 33:
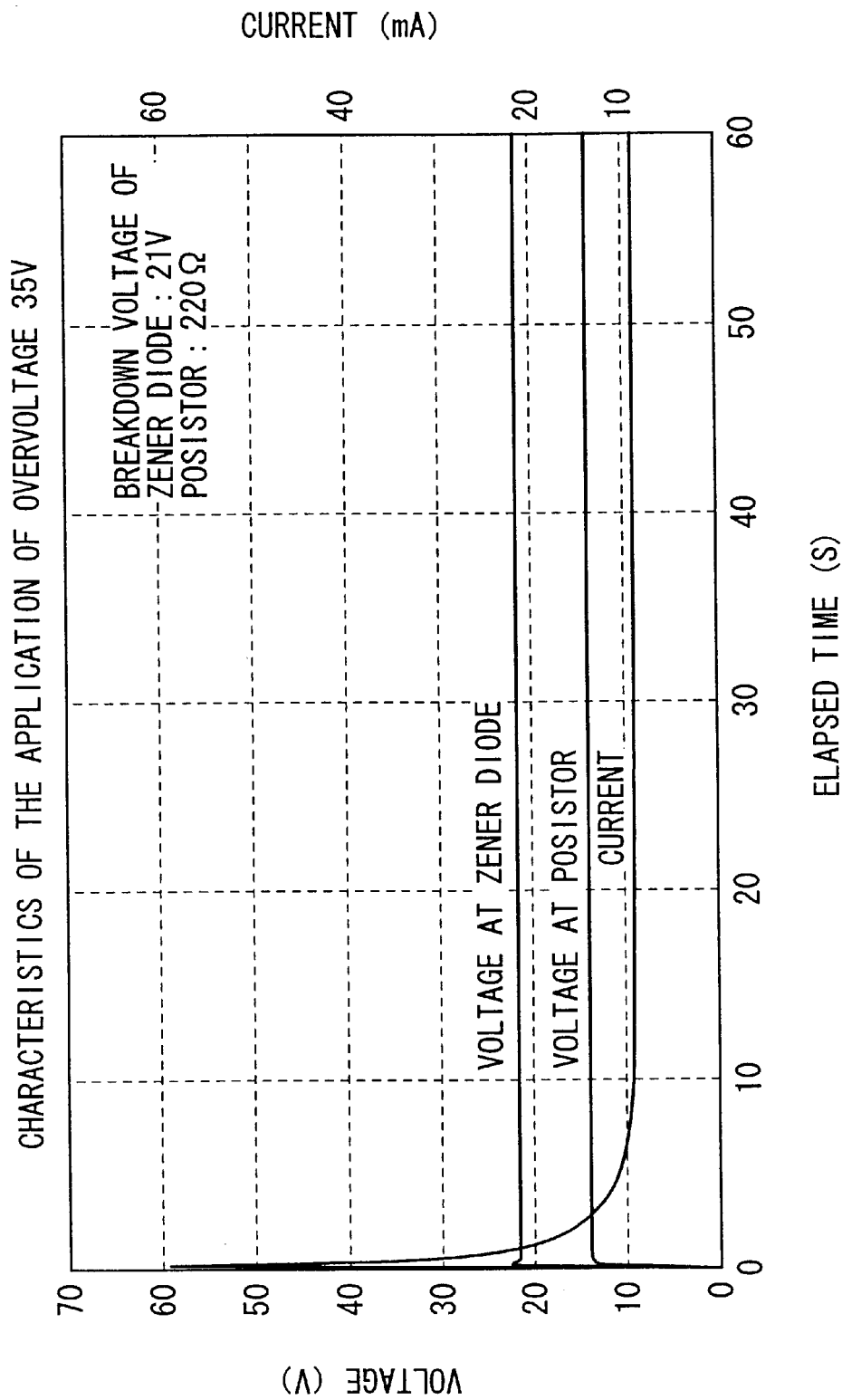
FIG. 33 is a graph showing the result of an experiment in a case where a further excessive voltage of 35 V is applied to the electronic device protection circuit according to the sixth embodiment.

FIG. 33 shows a result of an experiment in a case where a larger voltage of 35 V is applied to the electronic device protection circuit 300 according to the sixth embodiment. The conditions of this experiment were the same as that of the above experiment, except for using a DC power source with output characteristics of 35 V and 1 A.

Just after the DC power source was connected, the voltage between both of the terminals of the posistor 203 became approximately 14 V, while the voltage between both of the terminals of the zener diode 201 became approximately 21 V. Thus, as the voltage of approximately 21 V which was greater than the breakdown voltage was applied, the zener diode 201 was brought into conduction to let a current of approximately 60 mA flow therethrough and the current also flew through the posistor 203. By the current of approximately 60 mA resulting from the application of the voltage of 21 V, the zener diode 201 generated heat with a power of approximately 1260 mW, which was applied to the posistor 203, resulting in a rise in its temperature. Also, the posistor 203 itself generated heat with a power of approximately 840 mW by the current therethrough. Approximately 5 to 10 seconds after starting the application of such extremely excessive voltage as 35 V, the posistor 203 was rapidly heated by the heat generated in the zener diode 201 and the posistor 203 so that the temperature of the posistor 203 reached higher than the detection temperature of 120° C. Consequently the electrical resistance of the posistor 203 steeply increased to approximately 1700Ω, so that the current flow through the posistor 203 and the zener diode 201 could be reduced to 8 mA to 9 mA which was less than approximately one-sixth of the earlier current. After that, despite the continuous application of the overvoltage (25 V), the current could be held at around 8 mA to 9 mA.

Thus, when further excessive voltage was applied, the current flow through the zener diode 201 and the posistor 203 could be reduced more effectively and rapidly (in a short time).

Figure 34:
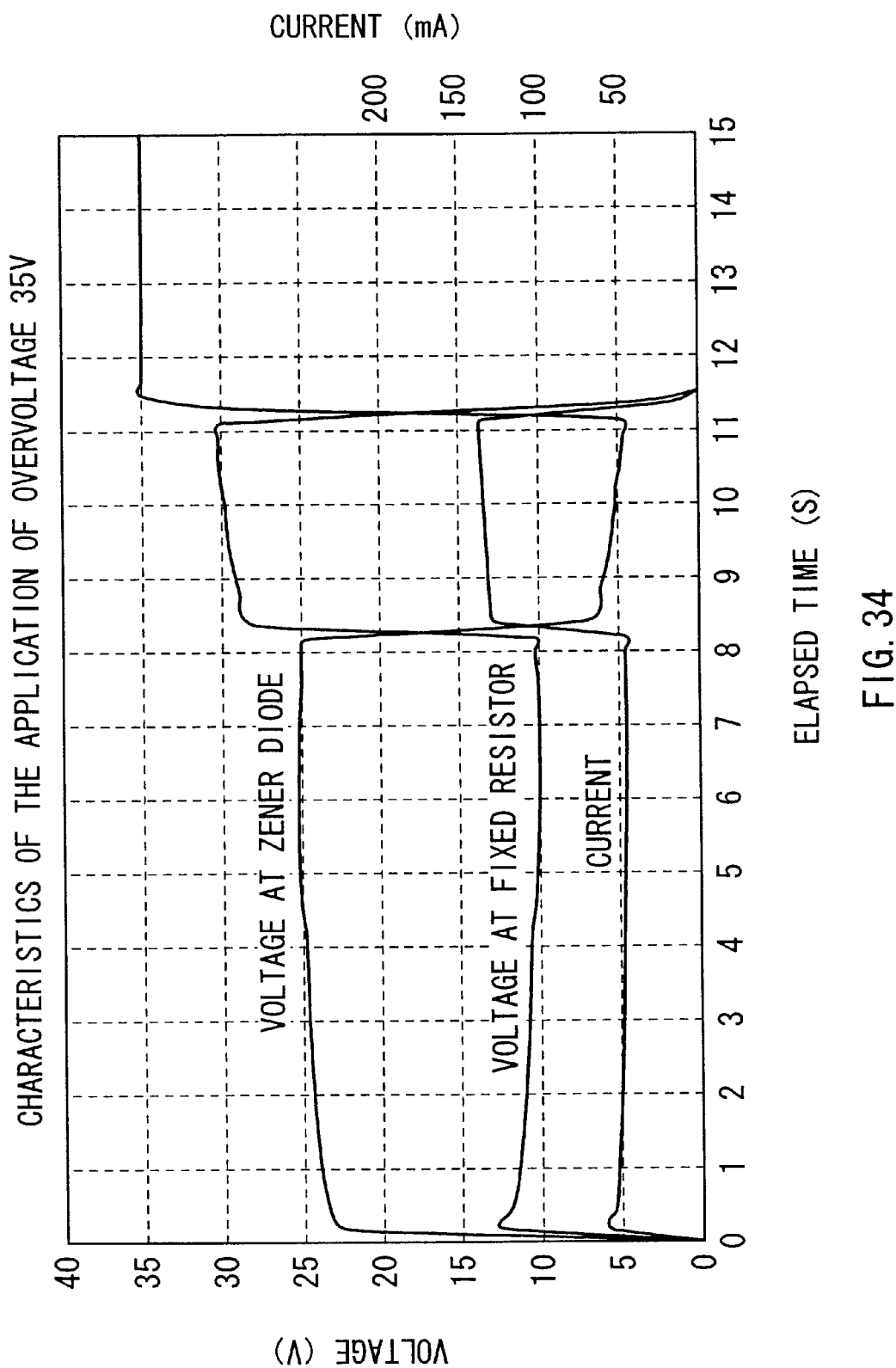
FIG. 34 is a graph showing the result of an experiment in a case where a fixed resistor with 220Ω and the maximum rated allowable power of 250 mW is used instead of the posistor for comparison.

For comparison, FIG. 34 shows the result of an experiment in a case where a fixed resistor with 220Ω and the maximum rating allowable power of 250 mW is used instead of the posistor. Just after the DC power source was connected, the voltage between the terminals of the fixed resistor was approximately 12.5 V, and the voltage between the terminals of the zener diode 201 was 22.5 V, so that the zener diode 201 was brought into conduction to let a current of approximately 60 mA flow therethrough, and the current flew through the fixed resistor. At that time, the zener diode 201 generated heat with a power of approximately 1300 mW to cause a rapid rise in its temperature. Also, the heat generated in the zener diode 201 was conducted to its periphery. Approximately 8 seconds after starting the application of the overvoltage, the zener diode 201 was overheated to higher than the maximum allowable temperature of 150° C., resulting in the damage (or destruction) of the zener diode 201. The voltage between the terminals of the damaged zener diode 201 was declined to approximately 7 V, though the current flow therethrough became a larger current of approximately 130 mA. It was considered that a short-circuit occurred in the zener diode 201 soon after the zener diode 201 had been damaged. Further, after a lapse of approximately 3 seconds from then, the inside of the zener diode 201 was fatally burnt out to become open. At that time, the inside of the zener diode 201 was overheated to the extent of burning out the zener diode 201, so it was apparent that the temperature of its periphery became very high. Thus, it was confirmed that when the fixed resistor was used instead of the posistor 203, the zener diode 201 was overheated, and consequently the zener diode 201 itself and circuit devices, the secondary battery protection IC 400 and so on mounted in its periphery were damaged.

Figure 35:
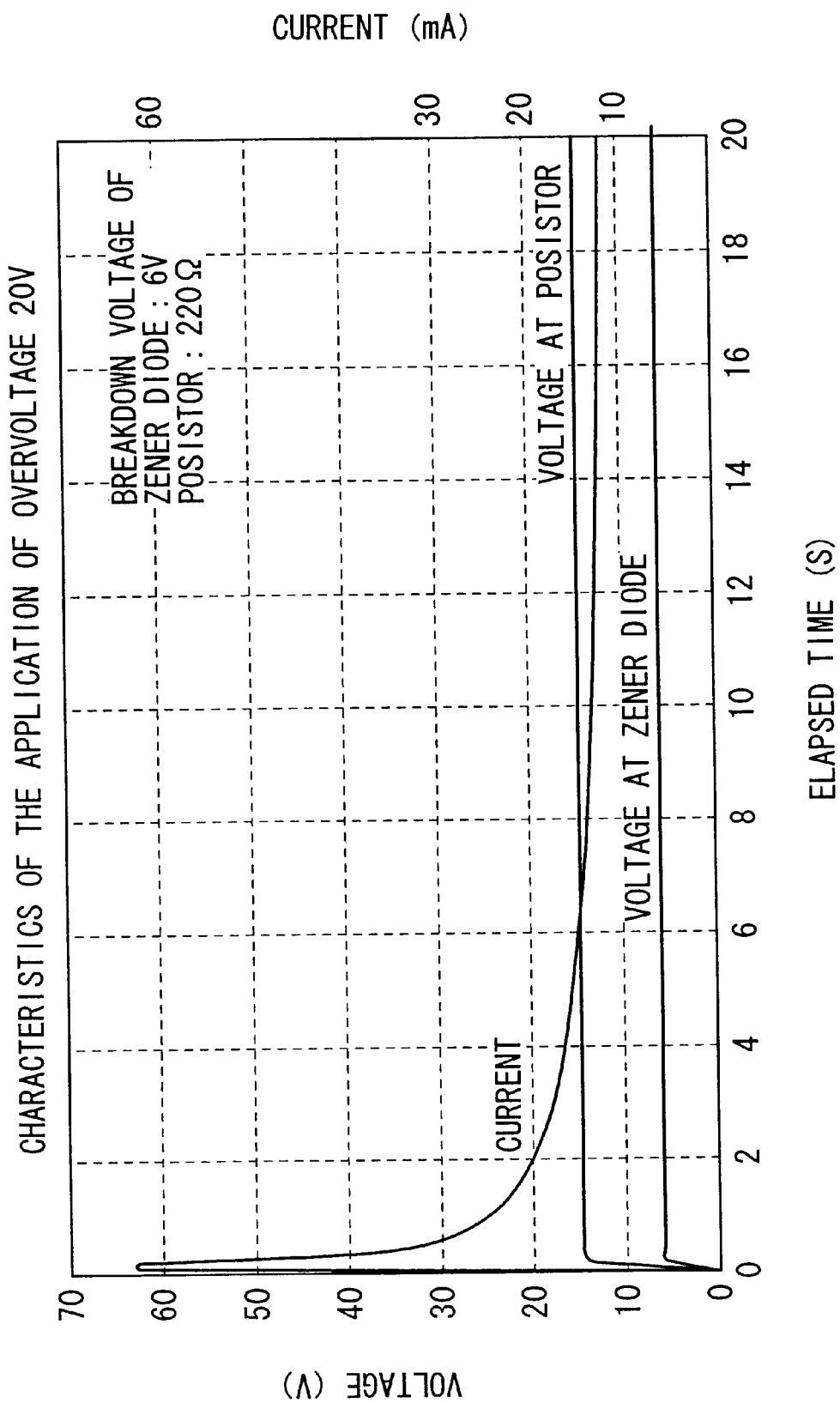
FIG. 35 is a graph showing the result of an experiment in a case where a voltage of 20 V is applied to the electronic device protection circuit according to the sixth embodiment.

FIG. 35 shows the result of an experiment in a case where a voltage of 20 V is applied to the electronic device protection circuit 300 according to the sixth embodiment.

In this experiment, the electronic device protection circuit 300 as shown in FIG. 29 was used. In the specifications of the posistor 203, the initial resistance at 25° C. was 220Ω and the detection temperature was 120° C. In the specifications of the zener diode 201, the breakdown voltage was 6 V, the maximum power rating was 200 mW, and the maximum allowable temperature was 150° C. The ambient temperature during the experiment was approximately 25° C. The voltage outputted from a DC power source was 20 V and the maximum current was 1 A.

Just after the DC power source was connected, the voltage between the terminals of the posistor 203 was approximately 14 V, and the voltage between the terminals of the zener diode 1 was approximately 6 V. As a voltage greater than the breakdown voltage of 6 V was applied, the zener diode 201 was brought into conduction so that a current of approximately 63 mA flew through the posistor 203 and the zener diode 201. As the current of approximately 63 mA flew through due to the voltage of 6 V, the zener diode 201 generated heat with a power of approximately 380 mW, which was applied to the posistor 203, resulting in a rise in temperature. Also, the posistor 203 itself generated heat with a power of approximately 880 mW.

The posistor 203 was heated by heat generated in the zener diode 201 and the posistor 203 itself, so the temperature of the posistor 203 reached over 120° C. approximately 16 seconds after starting the application of the overvoltage. Thereby, the electrical resistance of the posistor 203 steeply increased to approximately 1100Ω so as to reduce the current to approximately 12 mA, which was one-fifth of the earlier current. After that, even though the overvoltage (for example, 20 V) was continuously applied, the current was stably held at approximately 12 mA. Therefore, the zener diode 201 and the posistor 203 could be prevented from being degraded or damaged resulting from overheating.

For comparison, when the same experiment as above was carried out with a fixed resistor with an electrical resistance of 220Ω and the maximum power rating of 250 mW instead of the posistor 203, it was confirmed that heat was continuously generated in the zener diode 201 and the fixed resistor and caused overheating therein, which consequently resulted in damage.

[Seventh Embodiment]

Figure 36:
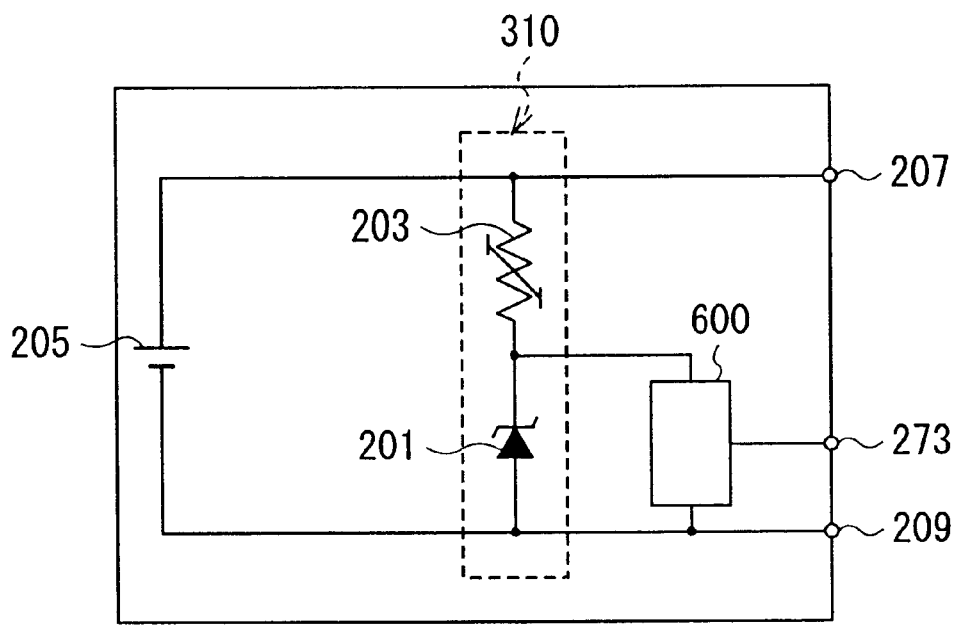
FIG. 36 is a schematic circuit diagram showing the electronic device protection circuit mounted in a lithium-ion secondary battery containing a communications IC.

FIG. 36 shows a schematic circuit diagram of the electronic device protection circuit mounted in a lithium-ion secondary battery containing a communications IC to protect the communications IC from overvoltage and overcurrent.

In a seventh embodiment, instead of the secondary battery protection IC 400 in the lithium-ion battery of the sixth embodiment, the communications IC 600 is provided. The communications IC 600 has a function for communicating various data such as the type or identifying information as a battery pack of the lithium-ion battery, or the voltage or remaining battery capacity of the secondary battery/cell 205 to the main body (not shown) in which the lithium-ion battery is mounted. As the communications means, either of radio or cable communications means may be adaptable. A communications terminal 273 for such communications with the outside is provided to be exposed to the surface of the lithium-ion battery.

An electronic device protection circuit 310 is connected to the communications IC 600 in almost the same manner of the sixth embodiment, that is, the zener diode 201 is connected in parallel to the communications IC 600, and the posistor 203 is connected in series to the zener diode 201. Except for this, the configuration is the same as that of the sixth embodiment. However, it is obvious that the breakdown voltage of the zener diode 201 and the detection temperature of the posistor 203 are set to appropriate values corresponding to the rated voltage and the maximum allowable temperature of the communications IC 600.

In such configuration of the electronic device protection circuit 310 according to the seventh embodiment, for example, when the voltage applied to the cathode side external connection terminal 207 and the anode side external connection terminal 209 is less than the rated voltage of the communications IC 600 during the charge of the secondary battery/cell 205, the voltage applied to the zener diode 201 is less than the breakdown voltage, so the zener diode 201 is substantially brought out of conduction. Thereby, a current resulting from the application of the voltage from outside does not flow through the zener diode 201. Also, the current at this time is less than the rated current of the posistor 203, so the posistor 203 continuously maintains relatively low electrical resistance under normal condition, which thereby does not cause any trouble in the communications capabilities, etc. of the communications IC 600 resulting from the voltage drop in the posistor 203. Thus, when the voltage applied from outside is equal to or less than the rated voltage, the communications IC 600 can function as usual without any trouble.

Further, when the voltage applied to the cathode side external connection terminal 207 and the anode side external connection terminal 209 is greater than the rated voltage of the communications IC 600, a voltage applied to the zener diode 201 determined by the subtraction of the voltage drop in the posistor 203 is greater than its breakdown voltage, so the zener diode 201 is substantially brought into conduction. Therefore, a large current resulting from the application of the overvoltage is bypassed not to the communications IC 600 but to the zener diode 201. Also, as the characteristics of the zener diode 201, even if the voltage applied from outside further increases, the voltage between the terminals of the zener diode 201 is locked on to the value of the breakdown voltage, so that the voltage between the terminals of the communications IC 600 connected in parallel to the zener diode 201 does not exceed the value of the breakdown voltage. Thus, when the voltage applied from outside is an overvoltage which exceeds the rated voltage, the zener diode 201 is brought into conduction to bypass the large current from the posistor 203 not to the communications IC 600 but to the zener diode 201, and to reduce the voltage applied to the communications IC 600 to around the value of the breakdown voltage of the zener diode 201, so that the communications IC 600 can be prevented from being damaged or degraded resulting from the application of the overvoltage.

Alternatively, on setting the lithium-ion secondary battery in the main body of an electronic apparatus, if an unplanned large current flows from the secondary battery/cell 205, or a pulse-wave like excessive voltage is applied to the cathode side external connection terminal 207 and the anode side external connection terminal 209, the electronic device protection circuit 310 can function as above to prevent the communications IC 600 from being damaged or degraded.

Moreover, when a large current continuously flows due to the continuous application of the overvoltage, or a higher voltage is applied, the zener diode 201 generates heat, which is applied to the posistor 203. When the temperature of the posistor 203 reaches its detection temperature, the posistor 203 itself generates heat, which causes a steep increase in the electrical resistance of the posistor 203 to inhibit the current flow therethrough as well as to inhibit the large current flow through the zener diode 201 which is connected in series thereto. Thus, even if the overvoltage is continuously applied or a higher voltage is applied, overheating of the zener diode 201 can be prevented, and consequently damage of the zener diode 201 resulting from the overheating, or overheating of or degradation to the communications IC 600 can be prevented. Electronic devices such as the communications IC 600 especially tend to be damaged by overvoltage or overcurrent, so it is suitable to use the electronic device protection circuit 310 for preventing such damage. However, it is not limited to such purpose.

[Eighth Embodiment]

Figure 37:
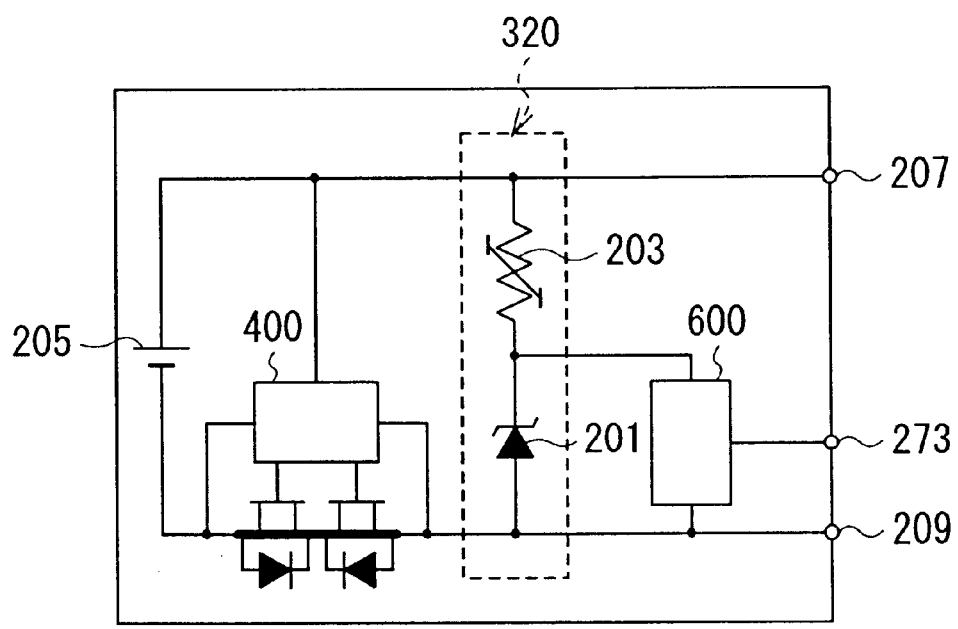
FIG. 37 is a schematic circuit diagram showing the electronic device protection circuit mounted in a lithium-ion secondary battery containing the communications IC and a secondary battery protection IC.

FIG. 37 shows a schematic circuit diagram of the electronic device protection circuit mounted in a lithium-ion secondary battery containing the communications IC and the secondary battery protection IC to protect the communications IC from overvoltage and overcurrent.

In the lithium-ion secondary battery of an eighth embodiment, the secondary battery protection IC 400 is also provided in the lithium-ion secondary battery of the seventh embodiment as shown in FIG. 36. More specifically, the secondary battery protection IC 400 is connected in parallel to the secondary battery/cell 205. An electronic device protection circuit 320 is connected to the communications IC 600 in the same way as the seventh embodiment. In other words, the secondary battery protection IC 400, the secondary battery/cell 205 and the electronic device protection circuit 320 are connected in parallel one another. The electronic device protection circuit 320 mounted in the lithium-ion secondary battery in such configuration can also protect the communications IC 600 from overvoltage or overcurrent, and can prevent the electronic device protection circuit 320 itself from being overheated or damaged. In parallel with this, the secondary battery protection IC 400 can prevent the application of overvoltage to the secondary battery/cell 205 or the leakage of discharge current in a condition of undervoltage of the secondary battery/cell 205.

[Ninth Embodiment]

Figure 38:
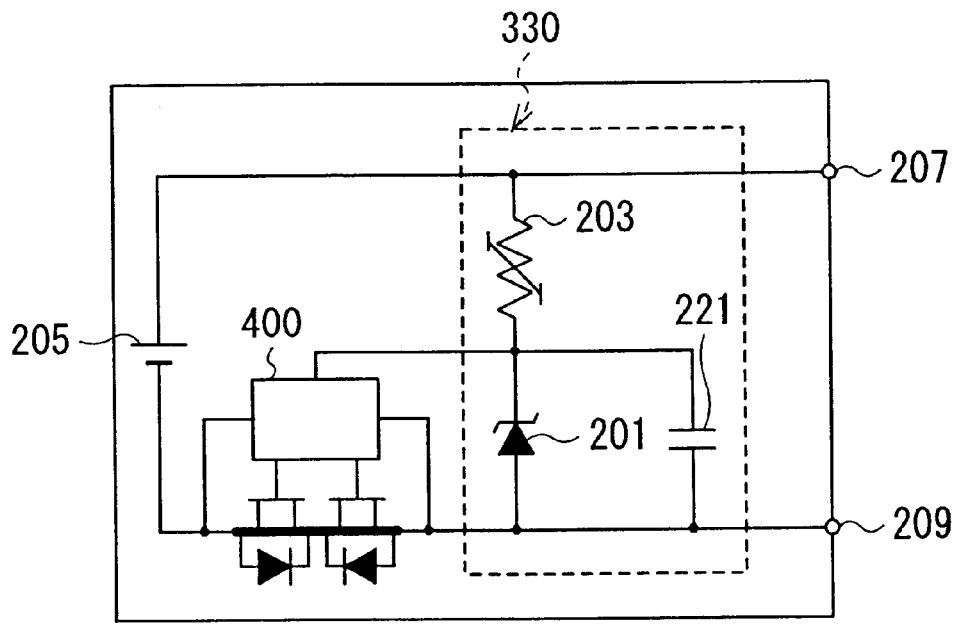
FIG. 38 is a schematic circuit diagram showing the electronic device protection circuit according to the sixth embodiment as shown in FIG. 26 which further contains a capacitor.

FIG. 38 shows a schematic circuit diagram of the electronic device protection circuit according to the sixth embodiment as shown in FIG. 26 which further contains a capacitor. In the electronic device protection circuit 330 of a ninth embodiment, a capacitor 221 is connected in parallel to the zener diode 201. When an overvoltage is externally applied to the cathode side external connection terminal 207 and anode side external connection terminal 209, by providing the capacitor 221, the crest value of a voltage (voltage waveform peak) at the instant of the application of the overvoltage can become smaller.

In other words, in general, it is substantially impossible to make a delay in response (delay time) for the application of the voltage to the zener diode 201 absolute zero, so the delay time unavoidably exists from the application of the overvoltage to the time when the zener diode 201 is broken down and brought into conduction. The delay time is generally 10 ns in minimum or over. Therefore, in 100 ns from the instant when the overvoltage is externally applied, the zener diode 201 does not fully respond, so the overvoltage may be applied to an electronic device such as the secondary battery protection IC 400, or a pulse of extremely high crest value of the voltage may be instantaneously applied just after starting the application of the voltage. Alternatively, in some reason, an overvoltage resulting from static electricity is applied to the cathode side external connection terminal 207 and the anode side external connection terminal 209, the overvoltage as a voltage pulse of the crest value which rises to the extremely high voltage may be applied to the secondary battery protection IC 400. However, when such instantaneous overvoltage of less than 100 ns which the zener diode 201 cannot fully respond is applied, the instantaneous overvoltage can be absorbed by the capacitor 221. Moreover, the capacitor 221 is connected in parallel to the zener diode 201 and the secondary battery protection IC 400, thereby, except for the case where an overvoltage is instantaneously applied, for example, when a DC rated charge voltage is applied during the charge of the secondary battery/cell 205, the capacitor 221 hardly ever functions. Therefore, the addition of the capacitor 221 does not cause any trouble with the zener diode 201 and the secondary battery protection IC 400.

The capacitor 221 of this kind, for example, if the secondary battery/cell 205 is nonaqueous lithium-ion secondary battery/cell of 4.2 V, requires a capacitance of approximately 6000 pF or over. However, it is obvious that the capacitance of the capacitor 221 is not limited to this range. The capacitance is preferably set corresponding to the specifications of the main circuit of an electronic apparatus using the lithium-ion secondary battery containing an electronic device to be protected or the electronic device protection circuit 330, as appropriate.

Figure 41A:
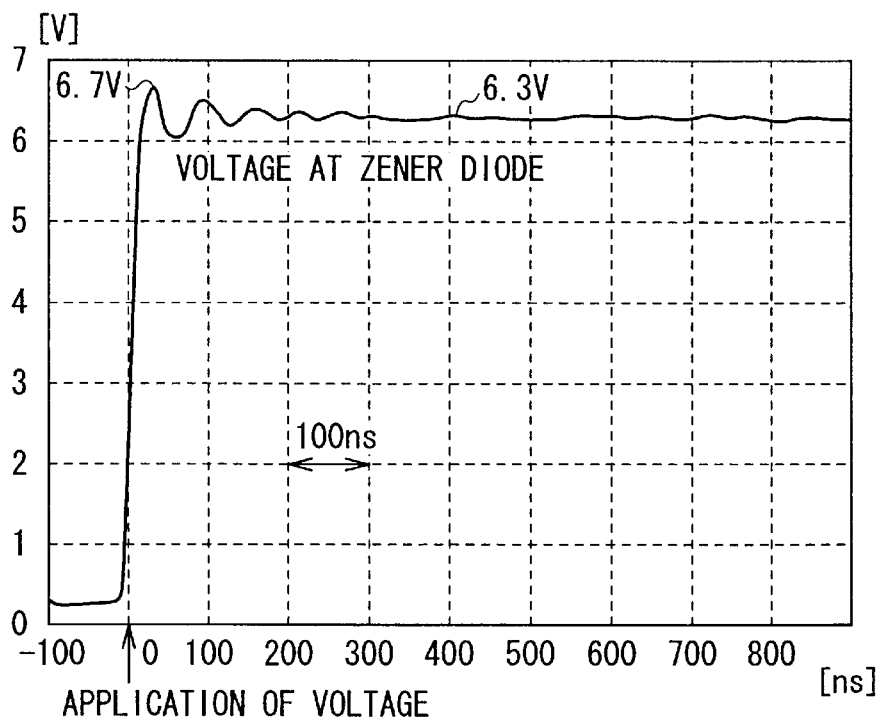
FIGS. 41A and FIG. 41B are graphs showing the results of measuring the progression of the voltage between the terminals of the zener diode from the time just after applying an overvoltage of 30 V to the time that the voltage is brought into a stable condition in a case where no capacitor is provided (FIG. 41A) and in a case where the capacitor is provided (FIG. 41B).
Figure 41B:
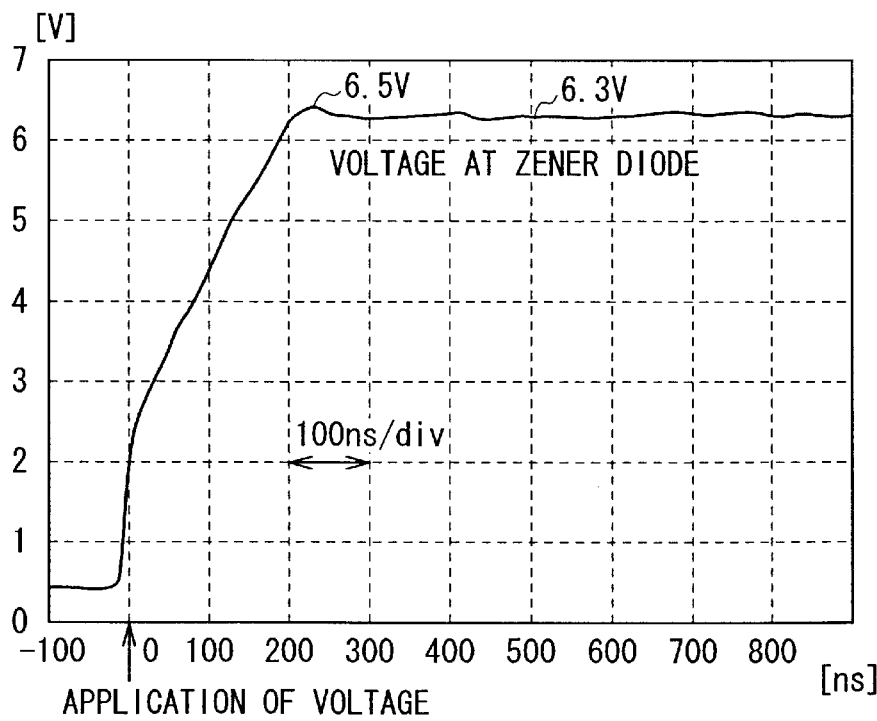

FIG. 41A and FIG. 41B show the results of measuring the progression of the voltage between the terminals of the zener diode from the time just after applying an overvoltage of 30 V to the time that the voltage is brought into a stable condition in a case where no capacitor is provided (FIG. 41A) and in a case where the capacitor is provided (FIG. 41B). In FIG. 41A and FIG. 41B, the horizontal axis indicates time in ns and the vertical axis indicates the voltage between the terminals of the zener diode 201 in V. The zener diode 201 which was used in this experiment had the breakdown voltage of 6.3 V, the maximum power rating of 200 mW and the maximum allowable temperature of 150° C. The posistor 203 had the initial resistance of 220Ω at 25° C. and the detection temperature of 120° C.

In the electronic device protection circuit 300 without the capacitor 221 shown in FIG. 26, as shown in FIG. 41A, 20 ns just after connecting a DC power source of 30 V with the maximum current of 1 A, the voltage between the terminals of the zener diode 201 steeply increased to approximately 6.7 V. The voltage of 6.7 V was a crest value of the voltage which was instantaneously projected. 200 ns after connecting the DC power source, the voltage between the terminals of the zener diode 201 became stable at approximately 6.3 V. Thus, just after starting the application of the overvoltage, the crest value of the voltage which was instantaneously projected occurred, and such high voltage might be applied to electronic devices such the secondary battery protection IC 400 and the communications IC 600 which were connected in parallel to the zener diode 201. If such high voltage had been instantaneously applied, an overcurrent might have flew through the electronic devices such as the communications IC 600, resulting in damage of the electronic devices. When the wiring of a power source circuit had been long and its inductance had been large, there would have been a higher possibility that a higher voltage was instantaneously developed, which led a higher possibility that the electronic devices were damaged.

In such case, for example, by using the electronic device protection circuit 330 with the capacitor 221 as shown in FIG. 38, an instantaneous high voltage can be absorbed immediately to protect the electronic devices such as the secondary battery protection IC 400 from being damaged. In practice, when an experiment was carried out with the same condition as above except that the capacitor 221 was attached, as shown in FIG. 41B, 220 ns after connecting the DC power source, the voltage between the terminals of the zener diode 201 gently rose compared with in the case of FIG. 41A, and the voltage was 6.5 V at the maximum, and from 500 ns, became stable at approximately 6.3 V. Thus, by adding the capacitor 221, the occurrence of a projected crest value of the voltage just after the application of the overvoltage could be prevented. Moreover, by using the capacitor 221 with a larger capacitance, a rapid change in the voltage or the occurrence of the projected crest value of the voltage just after the application of the overvoltage can be more effectively prevented. In addition to the above absorption purpose, for example, when an extremely high voltage resulting from static electricity is instantaneously applied, such function of the capacitor 221 as described above may be applicable for absorbing the high voltage.

[Tenth Embodiment]

Figure 39:
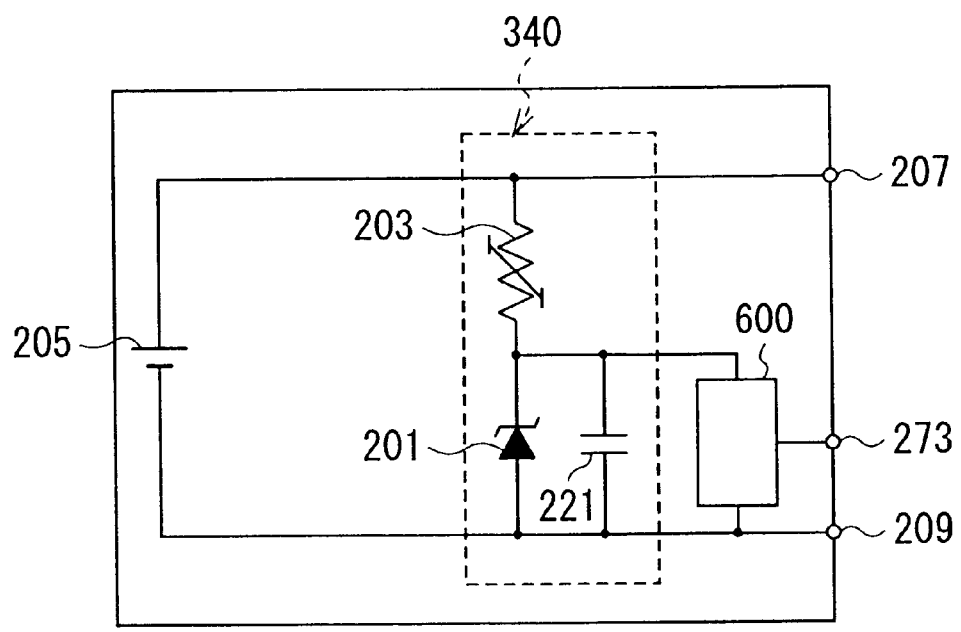
FIG. 39 is a schematic circuit diagram showing the electronic device protection circuit according to a seventh embodiment as shown in FIG. 36 which further contains a capacitor.

FIG. 39 shows a schematic circuit diagram of the electronic device protection circuit according to the seventh embodiment as shown in FIG. 36 which further contains a capacitor. In an electronic device protection circuit 340 for protecting the communications IC 600 as shown in FIG. 39, in the same manner of the ninth embodiment, the capacitor 221 is connected in parallel to the zener diode 201, so that when the overvoltage is externally applied to the cathode side external connection terminal 207 and the anode side external connection terminal 209, a crest value of the voltage which is instantaneously projected at the instant when the overvoltage is applied can be prevented from being applied to the communications IC 600.

[Eleventh Embodiment]

Figure 40:
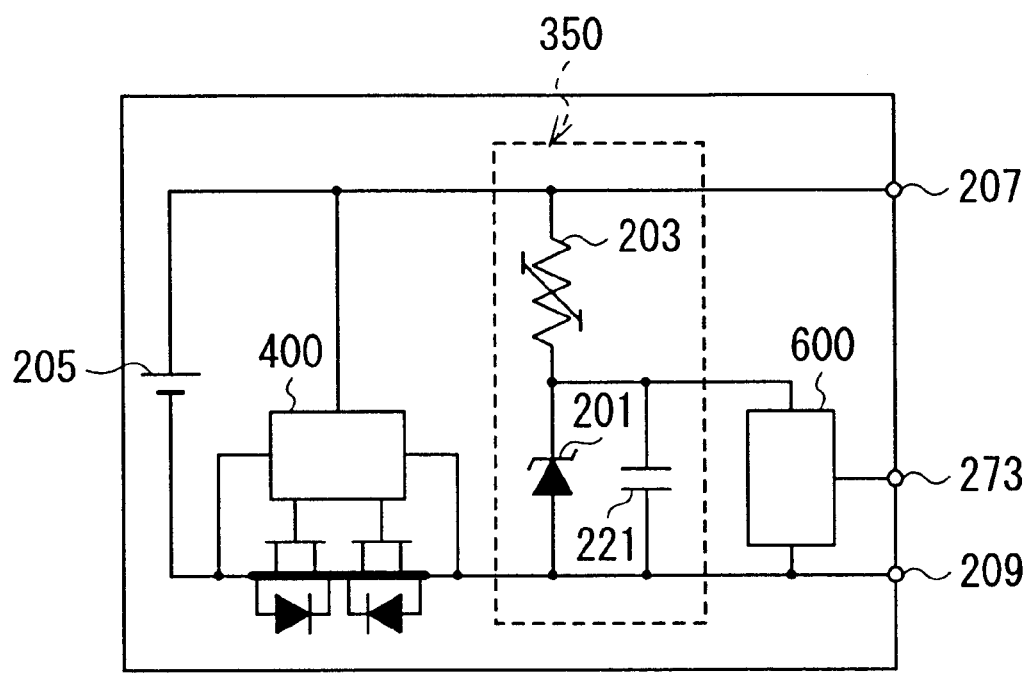
FIG. 40 is a schematic circuit diagram showing the electronic device protection circuit according to an eighth embodiment as shown in FIG. 37 which further contains a capacitor.

FIG. 40 shows a schematic circuit diagram of the electronic device protection circuit according to the eighth embodiment as shown in FIG. 37 which further contains a capacitor. In other words, an electronic device protection circuit 350 of a eleventh embodiment comprises the electronic device protection circuit 320 used for the lithium-ion secondary battery containing the secondary battery protection IC 400 and the communications IC 600 as shown in FIG. 37 with the capacitor 221 which is connected in parallel to the zener diode 201. Due to such configuration, when the overvoltage is externally applied to the cathode side external connection terminal 207 and the anode side external connection terminal 209, a crest value of the voltage which is projected at the instant when the overvoltage is applied can be prevented from being applied to the communications IC 600.

[Twelfth Embodiment]

Figure 42:
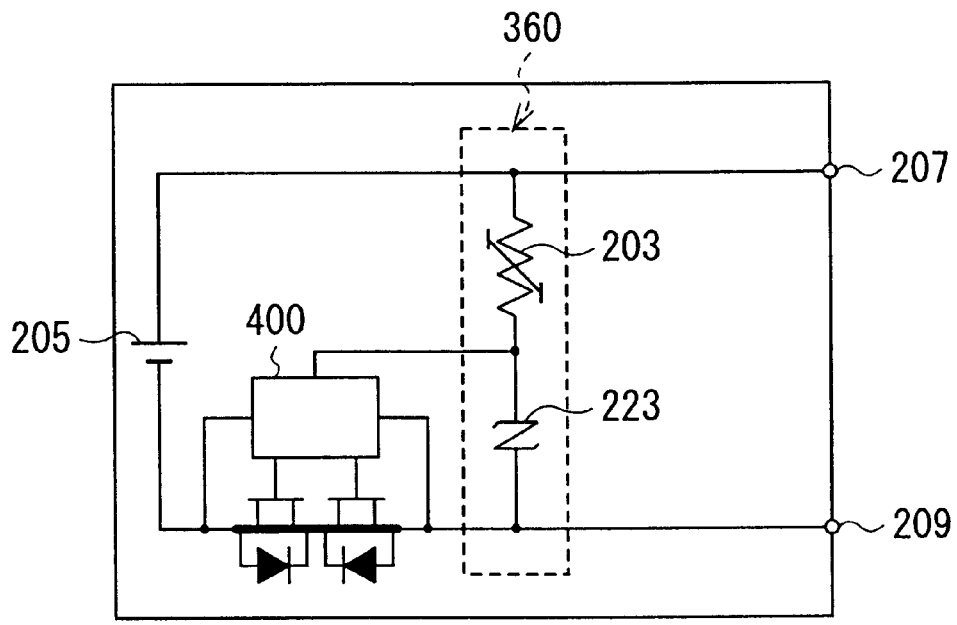
FIG. 42 is a schematic circuit diagram showing the electronic device protection circuit according to the sixth embodiment as shown in FIG. 26 containing a varistor instead of the zener diode.
Figure 43:
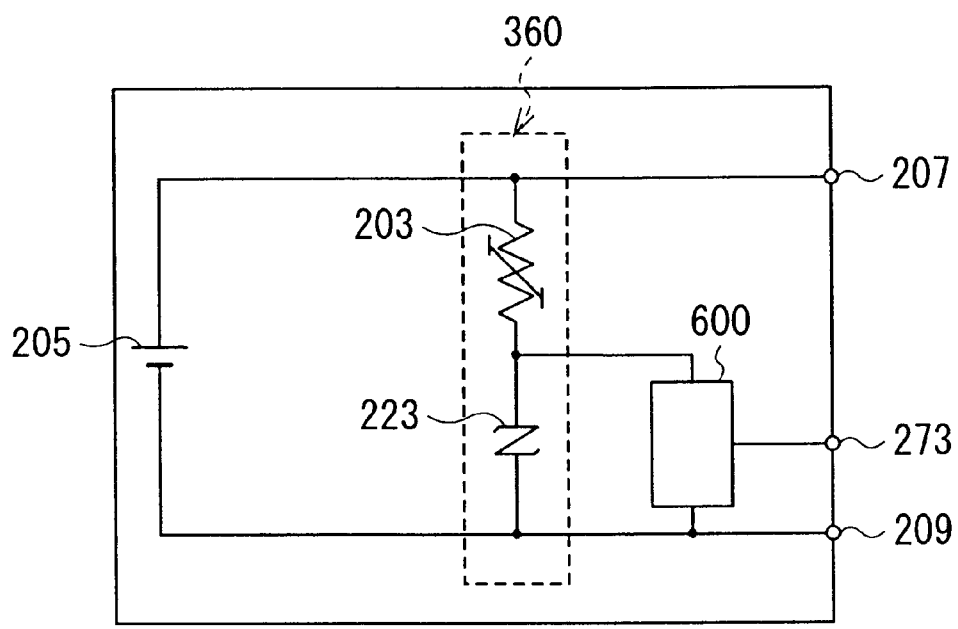
FIG. 43 is a schematic circuit diagram showing the electronic device protection circuit mounted in the lithium-ion secondary battery containing the communications IC.

FIG. 42 shows a schematic circuit diagram of the electronic device protection circuit according to the sixth embodiment as shown in FIG. 26 containing a varistor instead of the zener diode.

In an electronic device protection circuit 360 of a twelfth embodiment, except that the breakdown voltage of the varistor 223 is set to the same value of that of the zener diode 201, the setting and configuration is the same as that of the electronic device protection circuit 300 of the sixth embodiment. By using the varistor 223, in the same case of using the zener diode 201, overheating and damage of the secondary battery protection IC 400 resulting from the overvoltage and overcurrent, as well as overheating and damage of the electronic device protection circuit 360 itself can be prevented. The volt-ampere curve of the varistor 223 is generally gentler than that of the zener diode 201. Moreover, the varistor 223, in the same manner of the above capacitor 221 described in the ninth to eleventh embodiments, has a function of preventing or absorbing the crest value of the voltage which is projected at the instant when the overvoltage is applied. Therefore, by using the varistor 223 instead of the zener diode 201, in addition to the function when using the zener diode 201, it enables to prevent the crest value of the voltage from being instantaneously projected, and, when an extremely high voltage resulting from static electricity is applied, it enables to absorb the extremely high voltage.

Figure 44:
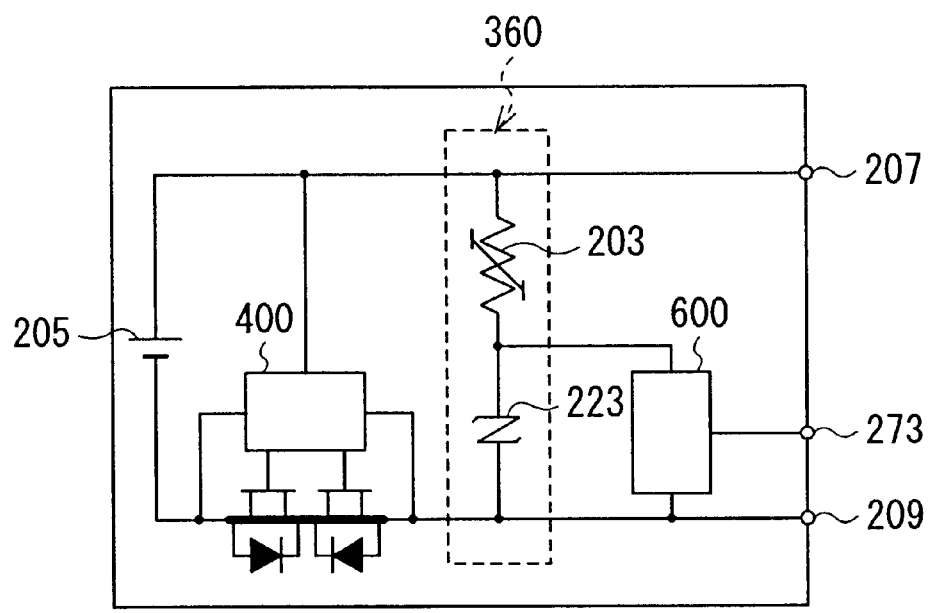
FIG. 44 is a schematic circuit diagram showing the electronic device protection circuit mounted in the lithium-ion secondary battery containing the secondary battery protection IC for secondary battery protection and the communications IC.

The electronic device protection circuit 360 using the varistor 223 instead of the zener diode 201 may be used in not only the lithium-ion secondary battery containing the secondary battery protection IC 400 as shown in FIG. 42 but also, for example, the lithium-ion secondary battery containing the communications IC 600 to protect the communications IC 600 from overvoltage and overcurrent. Alternatively, for example, the electronic device protection circuit 360 may be used in the lithium-ion secondary battery containing the secondary battery protection IC 400 and the communications IC 600 as shown in FIG. 44 to protect the communications IC 600 from overvoltage and overcurrent.

Figure 45:
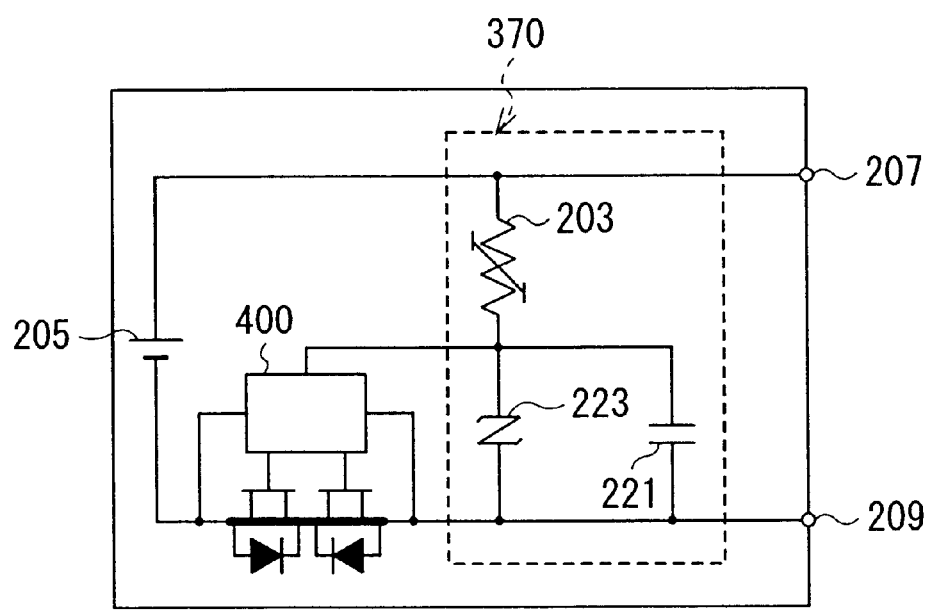
FIG. 45 is a schematic circuit diagram showing an electronic device protection circuit containing the varistor instead of the zener diode, to which the capacitor is connected in parallel, mounted in the lithium-ion secondary battery containing the secondary battery protection IC.

Alternatively, for example, like an electronic device protection circuit 370 shown in FIG. 45, the varistor 223 may be used instead of the zener diode 201, and the circuit may be formed of the capacitor 221 connected in parallel to the varistor 223. The electronic device protection circuit 370 can protect the secondary battery protection IC 400 from overvoltage and overcurrent, and can more reliably prevent the crest value of voltage from being instantaneously projected, and when an extremely high voltage resulting form static electricity is applied, can more reliably absorb the extremely high voltage.

Figure 46:
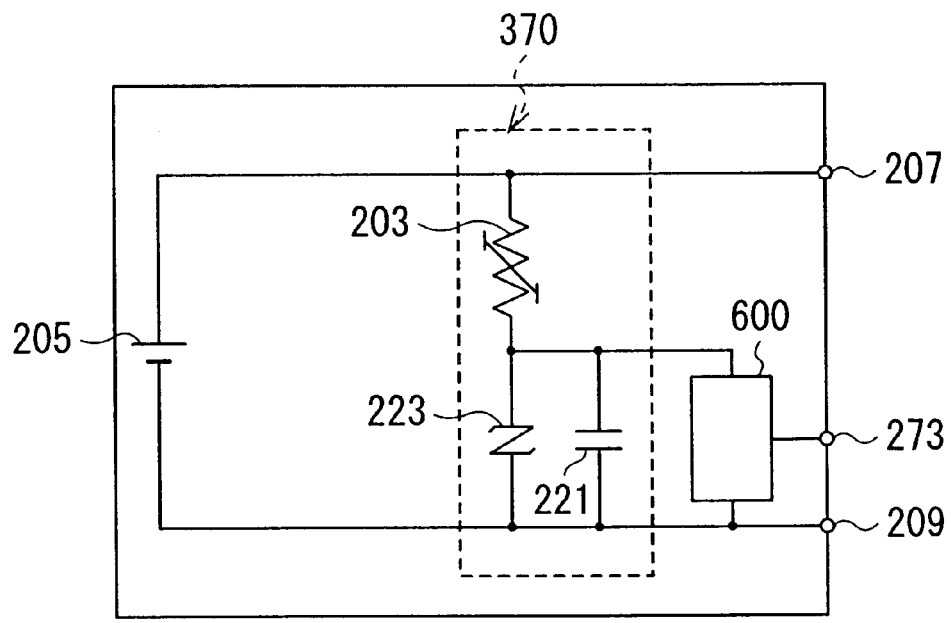
FIG. 46 is a schematic circuit diagram showing the electronic device protection circuit shown in FIG. 45 mounted in the lithium-ion secondary battery containing the communications IC.

Alternatively, for example, as shown in FIG. 46, an electronic device protection circuit 370 having the posistor 203, capacitor 221 and the varistor 223 can be provided for the lithium-ion secondary battery containing the communications IC 600 to protect the communications IC 600 from applying overvoltage and overcurrent.

Figure 47:
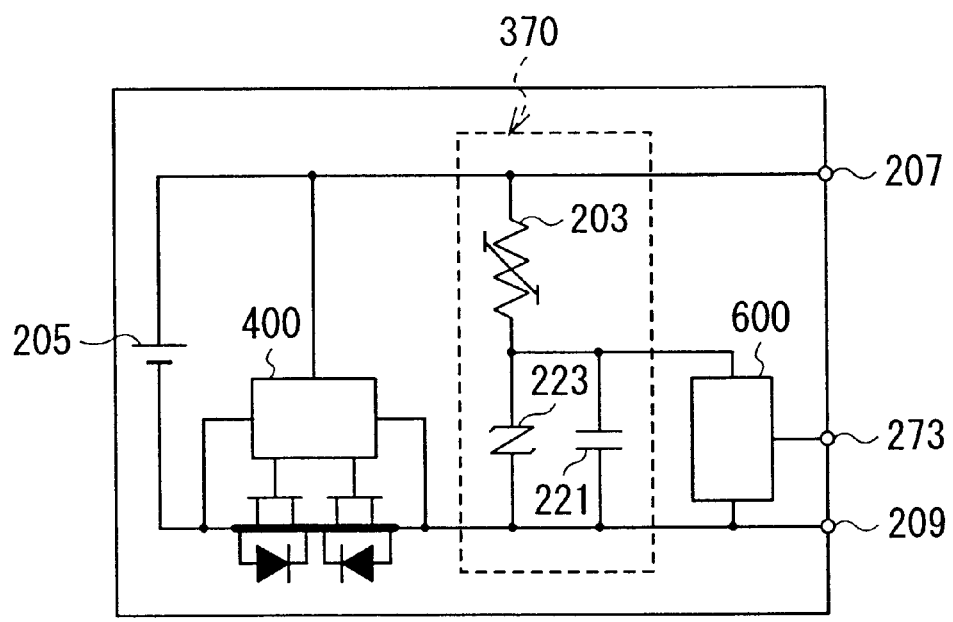
FIG. 47 is a schematic circuit diagram showing the electronic device protection circuit shown in FIG. 45 mounted in the lithium-ion secondary battery containing the secondary battery protection IC and the communications IC.

Alternatively, for example, as shown in FIG. 47, an electronic device protection circuit 370 containing the posistor 203, the capacitor 221 and the varistor 223 may be provided for the lithium-ion secondary battery containing the secondary battery protection IC 400 and the communications IC 600 to protect the communications IC 600 from overvoltage and overcurrent.

Figure 48:
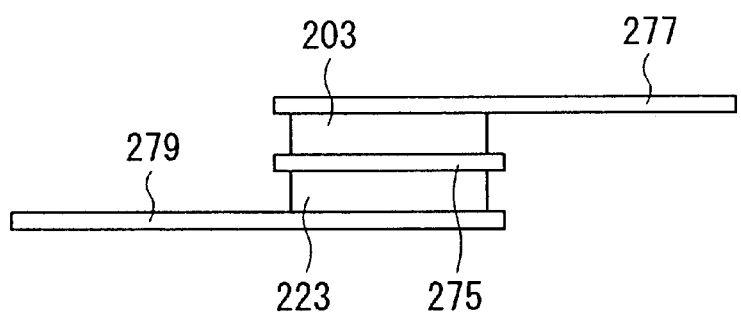
FIG. 48 is an example of the substantial configuration in which the posistor and the varistor are connected.

FIG. 48 shows an example of the substantial configuration in which the posistor and the varistor are connected.

In this configuration, the posistor 203 and the varistor 223 are stacked with an intermediate electrode 275 with good thermal conductivity placed therebetween, and the top surface of the posistor 203 is joined with an electrode 277, and the undersurface of the varistor 223 is joined with an electrode 279. The intermediate electrode 275 is connected to the positive terminal 401 of the secondary battery protection IC 400 through wiring, etc. which are not shown in the drawing. In the configuration, the heat generated in the varistor 223 can be efficiently conducted to the posistor 203. Further, the configuration is extremely compact and simple.

Figure 49:
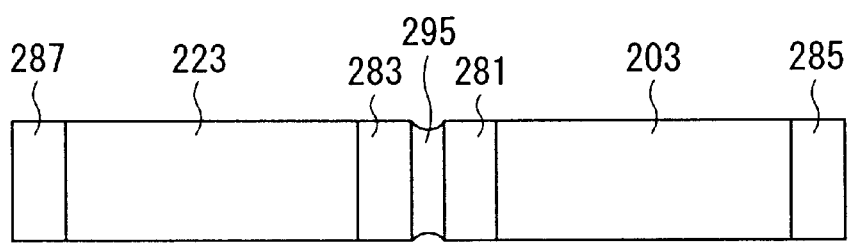
FIG. 49 is another example of the substantial configuration in which the posistor and the varistor are connected.

FIG. 49 shows another example of the substantial configuration in which the posistor and the varistor are connected.

A terminal 281 of the posistor 203 and a terminal 283 of the varistor 223 are joined with a low-melting-point metal 295. The terminals 281 and 283 and the low-melting-point metal 295 are preferably made of metal with high electrical and thermal conductivity. The other terminal 285 of the posistor 203 is connected to the cathode of the secondary battery/cell 205 and so on via wiring, etc. which is not shown. The other terminal 287 of the varistor 223 is connected to the anode of the secondary battery/cell 205 and so on via wiring, etc. which is not shown. As the materials of the terminals 281, 283, 285 and 287, for example, nickel-, iron- or copper-based alloy can be used. In the configuration, the heat generated in the varistor 223 can be efficiently conducted to the posistor 203. The posistor 203 and the varistor 223 can be mounted in one piece. Further, this configuration is the simplest and most compact. It is not shown in FIG. 49 but obvious that at the junction part of the terminal 281 of the posistor 203 and the terminal 283 of the varistor 223, wiring connected to the terminals of the secondary battery protection IC 400, etc. which is not shown in FIG. 49 is joined.

Figure 50:
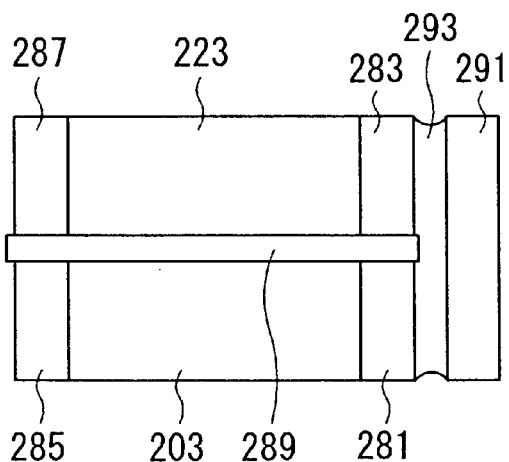
FIG. 50 is still another example of the substantial configuration in which the posistor and the varistor are connected.

FIG. 50 shows still another example of the substantial configuration in which the posistor and the varistor are connected.

In the configuration, the posistor 203 and the varistor 223 are stacked with an insulation plate 289 placed therebetween, and the posistor 203 and the varistor 223 are connected by using a metal plate 291. The terminal 281 of the posistor 203 on the right side in the drawing and the terminal 283 of the varistor 223 on the right in the drawing are joined with the metal plate 291 via a low-melting-point metal 293. The metal plate 291 makes the posistor 203 and the varistor 223 electrically connected in series, and provides good thermal conductivity in between. The insulation plate 289 is placed between the posistor 203 and the varistor 223 in order to provide electrical insulation in between. In such configuration, heat generated in the varistor 223 can be efficiently conducted to the posistor 203. The posistor 203 and the varistor 223 are mounted in one piece to have a simple and compact configuration.

Figure 51:
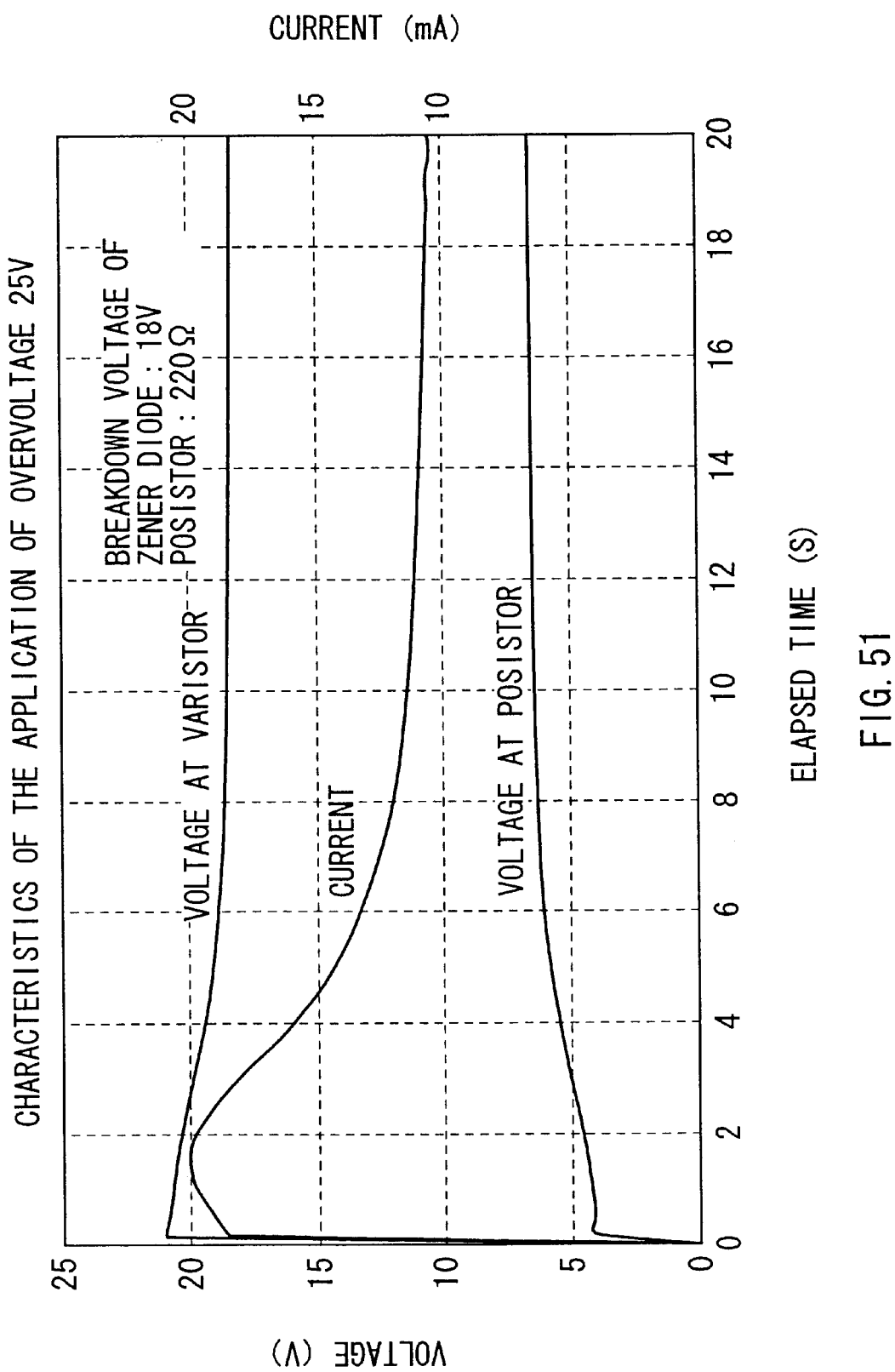
FIG. 51 is a graph showing the result of an experiment in a case where a voltage of 25 V is applied to the electronic device protection circuit according to a twelfth embodiment shown in FIG. 44.

FIG. 51 shows an example of the result of an experiment that a voltage of 25 V is applied to the electronic device protection circuit of the twelfth embodiment as shown in FIG. 44.

In this experiment, the electronic device protection circuit as shown in FIG. 49 was used. The posistor 203 had the initial resistance of 220Ω at 25° C. and the detection temperature of 120° C. The varistor 223 had the breakdown voltage of 18 V, the maximum power rating of 100 mW and the maximum allowable temperature of 150° C. The ambient temperature during the experiment was approximately 25° C. A DC power source had the output voltage of 25 V and the maximum current of 1 A.

When the DC power source was connected, the voltage between the terminals of the posistor 203 reached approximately 4 V and the voltage between the terminals of the varistor 223 steeply increased to approximately 21 V. However, at that time, no projected crest value of voltage in the varistor 223 occurred. As a voltage greater than the breakdown voltage was applied to the varistor 223, a current between 19 mA and 20 mA flew through the varistor 223 and the posistor 203, then the varistor 223 generated heat with a power of approximately 420 mW and the posistor 203 generated heat with a power of approximately 80 mW. When the temperature of the posistor 203 rose to higher than 120° C. due to the heat generation, the electrical resistance of the posistor 203 steeply increased to approximately 540Ω, which consequently caused a gentle decrease in current to approximately 11 mA. At that time, the voltage between the terminals of the posistor 203 rose to 7 V, while the voltage between the terminals of the varistor 223 dropped to approximately 18 V.

Thus, approximately 10 seconds after the DC power source was connected, the voltage between the terminals of the varistor 223 dropped and was held at approximately 18 V, and the current flow through the posistor 203 and the varistor 223 was reduced and held at approximately 11 mA. Thereby, overvoltage could be prevented from being applied to the electronic devices such as communications IC 600 and the secondary battery protection IC 400 connected in parallel to the varistor 223, and the posistor 203 and varistor 223 contained in the electronic device protection circuit 360 could be protected from being overheated or damaged. Moreover, the electronic devices such as communications IC 600 could be protected from being damaged or degraded resulting from a projected crest value of the voltage at the instant when the overvoltage was applied, or the application of an extremely high voltage due to static electricity.

In each of the above embodiments, it has been described in the case of using the electronic device protection circuit of the second invention for the lithium-ion secondary battery containing the secondary battery protection IC and/or the communications IC, though the electronic device protection circuit of the second invention is also applicable for not only such lithium-ion secondary battery but also, for example, a cellular phone apparatus containing a communications IC with a radio telephone function and a secondary battery/cell supplying a power thereto. In such case, for example, by applying the circuit configuration as shown in FIG. 36, the communications IC in the cellular phone apparatus can be protected from applying overvoltage and overcurrent.

Further, in the case of a circuit configuration that a power source voltage is externally applied to the communications IC with no secondary battery/cell, the electronic device protection circuit according to the second invention can be suitably used for protecting the communications IC from applying overvoltage and overcurrent.

[First Invention]

As described above, according to the electronic device protection circuit of one aspect of the invention, when an overvoltage greater than the rated voltage is applied to the voltage input terminals of the electronic device, a current in response to the overvoltage flows through the zener diode, which thereby generates heat so as to accelerate the fusion of the thermal fuse. Therefore, when the overvoltage is applied, the fusion of the thermal fuse can be reliably carried out. At this time, by bypassing the current resulting from the application of the overvoltage to the zener diode and the posistor, the current flow through the electronic device is reduced, so without the fusion of the thermal fuse, the overcurrent resulting from the application of the overvoltage can be prevented from flowing through the electronic device. Further, when the overcurrent continuously flows, resulting in an increase in the electrical resistance of the posistor, the increased electrical resistance reduces the current flow through the zener diode and the posistor to less than their rated currents, so that the zener diode and the posistor can be prevented from being overheated, destroyed or damaged resulting from the application of the overvoltage.

According to the electronic device protection circuit of another aspect of the invention, by placing the posistor and the thermal fuse in close proximity to each other, when an overvoltage greater than the rated voltage is applied to the voltage input terminals of the electronic device, the zener diode is brought into conduction, so that an overcurrent in response to the overvoltage flows therethrough and the posistor and the zener diode generate heat. The heat generated in the posistor mainly accelerates the fusion of the thermal fuse, so that when the overvoltage is applied, the fusion of the thermal fuse can be more reliably carried out. At this time, by bypassing the current resulting from the application of the overvoltage to the zener diode and the posistor, the current flow through the electronic device is reduced, so that without the fusion of the thermal fuse, the overcurrent resulting from the application of the overvoltage can be prevented from flowing through the electronic device. Further, when the overcurrent continuously flows, the electrical resistance of the posistor steeply increases due to the heat generated therein, and the increased electrical resistance reduces the current flow through the zener diode and the posistor to less than their rated currents, so that the zener diode and the posistor can be prevented from being overheated, destroyed or damaged resulting from the application of the overvoltage more rapidly and reliably.

According to the electronic device protection circuit of still another aspect of the invention, the thermostat is provided instead of the thermal fuse so that when the application of the overvoltage stops and the temperature of the thermostat drops, the thermostat can return to the normal state. Therefore, when the overvoltage is no longer applied but a proper voltage is applied, without the need to replace a part like the thermal fuse, the thermostat can be repeatedly used.

According to the electronic device protection circuit of a further aspect of the invention, a thermal fuse of which the fusion temperature is higher than that of the above thermal fuse is also provided between the zener diode and the posistor, and after the fusion of the above thermal fuse, the fusion of the thermal fuse of which the fusion temperature is higher is carried out to interrupt the current flow through the zener diode and the posistor, so that the zener diode, the posistor and the battery/cell can be more reliably prevented from being overheated, destroyed or damaged resulting from the application of the overvoltage.

According to the electronic device protection circuit of a still further aspect of the invention, a thermostat of which the interrupting temperature is higher than that of the above thermostat is also provided between the zener diode and the posistor, so that the zener diode and the posistor can be more reliably prevented from being overheated, destroyed or damaged resulting from the application of the overvoltage, and when returning from the state that the overvoltage is applied to the state that a proper voltage is applied, without the need to replace a part like the thermal fuse, by automatically bring the thermostat between the zener diode and the posistor back into conduction, the thermostat can be repeatedly used.

[Second Invention]

As described above, according to the electronic device protection circuit of a still aspect of the invention, when an overvoltage greater than the rated voltage of the electronic device is applied thereto, most of a large current resulting from the application of the overvoltage flows through the zener diode so that the current is inhibited from flowing through the electronic device, and the voltage between the terminals of the electronic device connected in parallel to the zener diode is locked on to the value of the breakdown voltage of the zener diode to maintain almost constant, so the electronic device can be protected from being damaged or degraded resulting from the application of the overvoltage. In addition, by connecting the posistor in series to the zener diode, the electrical resistance of the posistor increases due to a further increase in current or a rise in temperature to reduce the current to less than the maximum allowable current of the zener diode. Therefore, even if the overvoltage is continuously applied, or the overvoltage which causes a large current greater than maximum allowable current of the zener diode flow therethrough is applied, the zener diode can be reliably prevented from being overheated or damaged.

More specifically, according to the electronic device protection circuit of a still aspect of the invention, the zener diode and the posistor are arranged to be able to conduct heat each other, so that when an overvoltage greater than the rated voltage is applied to the electronic device, the zener diode generates heat to accelerate an increase in the electrical resistance of the posistor. Therefore, the zener diode can be more reliably prevented being overheated or damaged resulting from the overcurrent flow therethrough.

According to the electronic device protection circuit of a still aspect of the invention, a capacitor is connected in parallel to the electronic device so that the capacitor absorbs a change in voltage when an overvoltage greater than the rated voltage is instantaneously applied. Even at the moment before the voltage between the terminals of the zener diode reaches the breakdown voltage, for example, just after the overvoltage is applied, or when an instantaneous overvoltage due to electrostatic electricity is applied, the overvoltage can be more reliably prevented from being applied to the electronic device.

According to the electronic device protection circuit of a still aspect of the invention, a varistor device having characteristics that applying a voltage greater than a predetermined voltage, which is set to greater than the rated voltage of a electronic device, results in an increase in current, is provided instead of the zener diode in order to be capable of responding to the application of the overvoltage faster than the zener diode. For example, just after starting the application of the overvoltage, or when a high voltage resulting from static electricity is instantaneously applied, overvoltage can be more reliably prevented from being applied to the electronic device.

Obviously may modifications and variations of the present invention are possible in the light of the above teachings. It is therefore to be understood that within the scope of the appended claims the invention may be practiced otherwise than as specifically described.

What is claimed is:

1. An electronic device protection circuit for inhibiting a voltage exceeding a rated voltage of an electronic device from being applied to the electronic device, comprising:
    a current-increasing device that increases a current when the voltage applied to the current-increasing device is greater than the rated voltage;
    a current-inhibiting device that inhibits the current by increasing an electrical resistance in response to one of an increase in current and a rise in temperature, wherein the current-inhibiting device and the current-increasing device are connected in series and are connected in parallel with a battery on the protection circuit, and wherein
        the current-increasing device and the current-inhibiting device are arranged to conduct heat to each other, and applying an overvoltage greater than the rated voltage causes a current resulting from the overvoltage to flow through the current-increasing device, so that the current-increasing device generates heat, and the current resulting from the overvoltage is bypassed from the current-increasing device and the current-inhibiting device to reduce the current flow through the electronic device.

2. An electronic device protection circuit for inhibiting a voltage greater than a rated voltage of an electronic device from being applied to positive and negative voltage input terminals of the electronic device, comprising:
    a posistor that increases an electrical resistance in response to an increase in current, an end of the posistor being connected to one of the voltage input terminals of the electronic device;
    a thermal fuse having characteristics that a flow of current therethrough caused by applying a voltage exceeding a rated voltage causes a rise in temperature resulting in a fusion of the thermal fuse, an end of the thermal fuse being connected to an other voltage input terminal of the electronic device;
    a zener diode having characteristics that applying a voltage exceeding a breakdown voltage thereof that is set to greater than the rated voltage of said thermal fuse results in an increase in the current, the zener diode being connected to an other end of the posistor and to an other end of the thermal fuse, wherein
        the thermal fuse and the zener diode conduct heat to each other; applying an overvoltage greater than the rated voltage to the voltage input terminals of the electronic device causes the current resulting from the overvoltage to flow through the zener diode such that the zener diode generates heat that accelerates the fusion of the thermal fuse; the current resulting from the overvoltage is bypassed to the zener diode and the posistor to reduce the current through the electronic device; and when the electrical resistance of the posistor increases the increased electrical resistance reduces the current through the zener diode and the posistor to one of equal to and less than rated currents of the zener diode and the posistor.

3. The electronic device protection circuit according to claim 2, wherein the thermal fuse, the posistor, and the zener diode conduct heat to each other; a Curie point of the posistor is set higher than a fusion temperature of the thermal fuse; and the posistor and the zener diode generate heat to accelerate the fusion of the thermal fuse when the overvoltage exceeds the rated voltage and is applied to the voltage input terminals of the electronic device.

4. The electronic device protection circuit according to claim 2, wherein a length of a conductor electrically connecting the thermal fuse and the zener diode is shorter than a length of a conductor electrically connecting the thermal fuse and the battery such that a distance required for thermal conduction between the thermal fuse and the zener diode is shorter than a distance required for thermal conduction between the thermal fuse and the battery.

5. The electronic device protection circuit according to claim 2, wherein the zener diode and the thermal fuse are arranged to conduct heat through a thermal conduction component.

6. The electronic device protection circuit according to claim 2, further comprising a high-temperature thermal fuse having a fusion temperature higher than the thermal fuse fusion temperature, the high-temperature thermal fuse being connected between the zener diode and the posistor.

7. The electronic device protection circuit according to claim 6, wherein the high-temperature thermal fuse, the zener diode, and the posistor conduct heat to each other.

8. The electronic device protection circuit according to claim 2, wherein the electronic device is a lithium-ion secondary battery.

9. The electronic device protection circuit according to claim 2, further comprising a thermostat that interrupts the current when a temperature of the thermostat rises to higher than a predetermined temperature by applying a voltage greater than the rated voltage to the positive and negative voltage input terminals of the electronic device provided in place of the thermal fuse.

10. The electronic device protection circuit according to claim 3, further comprising a thermostat that interrupts the current when a temperature of the thermostat rises to higher than a predetermined temperature by applying a voltage greater than the rated voltage to the positive and negative voltage input terminals of the electronic device provided in place of the thermal fuse.

11. The electronic device protection circuit according to claim 4, further comprising a thermostat that interrupts current when a temperature of the thermostat rises to higher than a predetermined temperature by applying a voltage greater than the rated voltage to the positive and negative voltage input terminals of the electronic device provided in place of the thermal fuse.

12. The electronic device protection circuit according to claim 5, further comprising a thermostat that interrupts a current when a temperature of the thermostat rises to higher than a predetermined temperature by applying a voltage greater than the rated voltage to the positive and negative voltage input terminals of the electronic device provided in place of the thermal fuse.

13. The electronic device protection circuit according to claim 9, further comprising a high-temperature thermostat having an interrupting temperature higher than the interrupting temperature of the thermostat provided between the zener diode and the posistor.

14. The electronic device protection circuit according to claim 13, wherein said high-temperature thermostat, the zener diode, and the posistor conduct heat to each other.

15. An electronic device protection circuit for inhibiting a voltage greater than a rated voltage of an electronic device from being applied to positive and negative voltage input terminals of the electronic device, comprising:
  a zener diode having characteristics that applying a voltage exceeding a breakdown voltage thereof that is set to greater than a rated voltage results in an increase in a current, an end of the zener diode being connected to one of the positive and negative voltage input terminals of the electronic device;
  a thermal fuse having characteristics that a flow of current therethrough caused by applying a voltage exceeding a rated voltage causes a rise in temperature resulting in a fusion thereof, an end of the thermal fuse being connected to an other voltage input terminal of the electronic device;
  a posistor having characteristics of increasing an electrical resistance thereof in response to an increase in current, having a Curie point set higher than the thermal fuse fusion temperature and being connected to an other end of the zener diode and an other end of the thermal fuse, wherein
    the thermal fuse, the posistor, and the zener diode conduct heat to each other; applying an overvoltage greater than the rated voltage to the voltage input terminals of the electronic device causes the current resulting from the overvoltage to flow such that the zener diode and the posistor generate heat, thereby accelerating the fusion of the thermal fuse; the current resulting from the overvoltage is bypassed to the zener diode and the posistor to reduce the current through the electronic device; and when the electrical resistance of the posistor increases the increased electrical resistance reduces the current through the zener diode and the posistor to one of equal to and less than the rated currents of the zener diode and the posistor.

16. The electronic device protection circuit according to claim 15, wherein a length of a conductor electrically connecting the thermal fuse and the posistor is shorter than a length of a conductor electrically connecting the thermal fuse and the battery, and a distance required for thermal conduction between the thermal fuse and the posistor is shorter than a distance required for thermal conduction between the thermal fuse and the battery.

17. The electronic device protection circuit according to claim 15, wherein the posistor and the thermal fuse conduct heat through a thermal conduction component.

18. The electronic device protection circuit according to claim 15, further comprising a high-temperature thermal fuse having a fusion temperature higher than the thermal fuse fusion temperature, the high-temperature fuse located between the zener diode and the posistor.

19. The electronic device protection circuit according to claim 18, wherein the high-temperature thermal fuse, the zener diode, and the posistor conduct heat to each other.

20. The electronic device protection circuit according to claim 15, wherein the electronic device is a lithium-ion secondary battery.

21. The electronic device protection circuit according to claim 15, further comprising a thermostat that interrupts the current when the temperature of the thermostat rises to higher than a predetermined temperature by applying a voltage greater than the rated voltage to the positive and negative voltage input terminals of the electronic device provided in place of the thermal fuse.

22. The electronic device protection circuit according to claim 16, further comprising a thermostat interrupts current when a temperature of the thermostat rises to higher than a predetermined temperature by applying a voltage greater than the rated voltage to the positive and negative voltage input terminals of the electronic device provided in place of the thermal fuse.

23. The electronic device protection circuit according to claim 17, further comprising a thermostat interrupts current when the temperature of the thermostat rises to higher than a predetermined temperature by applying a voltage greater than the rated voltage to the positive and negative voltage input terminals of the electronic device provided in place of the thermal fuse.

24. The electronic device protection circuit according to claim 21, further comprising a high-temperature thermostat having an interrupting temperature higher than the interrupting temperature of the thermostat provided between said zener diode and said posistor.

25. The electronic device protection circuit according to claim 24, wherein the high-temperature thermostat, the zener diode, and the posistor are provided to conduct heat to one another.

26. An electronic device protection circuit for inhibiting a voltage exceeding a rated voltage of an electronic device from being applied to the electronic device, comprising:
  a zener diode having characteristics that applying a voltage greater than a breakdown voltage thereof that is set to greater than a rated voltage results in an increase in current and is connected in parallel to the electronic device; and
  a posistor connected in series with the zener diode and having characteristics of inhibiting a current by an increase in an electrical resistance thereof in response to one of an increase in current and a rise in temperature, and wherein the electrical resistance of the posistor increases in response to the rise in temperature; the zener diode increases the current when the voltage greater than the breakdown voltage is applied, causing the zener diode to generate heat; the zener diode and the posistor conduct heat to each other; and when an overvoltage greater than the rated voltage is applied to the electronic device the zener diode generates heat that accelerates an increase in the electrical resistance of the posistor.

27. The electronic device protection circuit according to claim 26, further comprising a capacitor connected in parallel with the electronic device, wherein when a voltage exceeding the rated voltage is instantaneously applied the capacitor accommodates a change in the voltage.

28. The electronic device protection circuit according to claim 26, wherein the zener diode and the posistor conduct heat through a thermal conduction component.

29. The electronic device protection circuit according to claim 26, further comprising a varistor device that increases the current when a voltage greater than a predetermined voltage that is greater than the rated voltage is applied provided in place of the zener diode.

30. The electronic device protection circuit according to claim 26, further comprising a varistor device that increases the current when a voltage greater than a predetermined voltage that is greater than the rated voltage is applied provided in place of the zener diode.

31. The electronic device protection circuit according to claim 27, further comprising a varistor device that increases the current when a voltage greater than a predetermined voltage that is greater than the rated voltage is applied provided in place of the zener diode.

32. The electronic device protection circuit according to claim 28, further comprising a varistor device that increases the current when a voltage greater than a predetermined voltage that is greater than the rated voltage is applied provided in place of the zener diode.

33. The electronic device protection circuit according to claim 26, further comprising a secondary battery/cell connected in parallel with a circuit formed of the posistor and the zener diode connected in series.

34. The electronic device protection circuit according to claim 33, wherein the electronic device is a semiconductor integrated circuit having functions for monitoring an overcharging of the secondary battery/cell.

35. The electronic device protection circuit according to claim 26, wherein the electronic device is a semiconductor integrated circuit having communication capabilities.

* * * * *